(12) United States Patent
Chao et al.

(10) Patent No.: US 12,046,712 B2
(45) Date of Patent: Jul. 23, 2024

(54) SOLID-STATE BATTERY

(71) Applicant: QuantumScape Battery, Inc., San Jose, CA (US)

(72) Inventors: Cheng-Chieh W. Chao, San Jose, CA (US); Christopher T. Dekmezian, Campbell, CA (US); Shuang Li, Sunnyvale, CA (US)

(73) Assignee: QUANTUMSCAPE BATTERY, INC., San Jose, CA (US)

(*) Notice: Subject to any disclaimer, the term of this patent is extended or adjusted under 35 U.S.C. 154(b) by 790 days.

(21) Appl. No.: 15/734,188

(22) PCT Filed: Jun. 6, 2019

(86) PCT No.: PCT/US2019/035867
§ 371 (c)(1),
(2) Date: Dec. 1, 2020

(87) PCT Pub. No.: WO2019/236904
PCT Pub. Date: Dec. 12, 2019

(65) Prior Publication Data
US 2021/0167417 A1     Jun. 3, 2021

Related U.S. Application Data

(60) Provisional application No. 62/681,576, filed on Jun. 6, 2018.

(51) Int. Cl.
*H01M 10/0562*    (2010.01)
*H01M 4/04*    (2006.01)
(Continued)

(52) U.S. Cl.
CPC ..... *H01M 10/0562* (2013.01); *H01M 4/0404* (2013.01); *H01M 4/366* (2013.01);
(Continued)

(58) Field of Classification Search
None
See application file for complete search history.

(56) References Cited

U.S. PATENT DOCUMENTS 4,259,061 A    3/1981   Dubetsky
4,492,783 A    1/1985   Tanaka et al.
(Continued)

FOREIGN PATENT DOCUMENTS

CN    101076915 A    11/2007
CN    101518164    8/2009
(Continued)

OTHER PUBLICATIONS

Maekawa et al., "Halide-Stabilized LiBH4, a Room-Temperature Lithium Fast-Ion Conductor", Journal of the American Chemical Society, 121 (3), pp. 894-895 (Year: 2009).*
(Continued)

*Primary Examiner* — Haroon S. Sheikh
*Assistant Examiner* — Aryana Y. Ortiz
(74) *Attorney, Agent, or Firm* — Squire Patton Boggs (US) LLP

(57) ABSTRACT

Provided herein solid-state battery architectures that include an oxide electrolyte in contact with the anode of an electrochemical cell and a sulfide electrolyte in contact with the cathode of an electrochemical cell.

14 Claims, 9 Drawing Sheets

(51) Int. Cl.
  *H01M 4/36* (2006.01)
  *H01M 4/38* (2006.01)
  *H01M 4/62* (2006.01)
  *H01M 10/052* (2010.01)
  *H01M 10/0585* (2010.01)

(52) U.S. Cl.
  CPC ............ *H01M 4/382* (2013.01); *H01M 4/62* (2013.01); *H01M 10/052* (2013.01); *H01M 10/0585* (2013.01); *H01M 2220/20* (2013.01); *H01M 2300/0071* (2013.01); *H01M 2300/0094* (2013.01)

(56) References Cited

U.S. PATENT DOCUMENTS

| | | |
|---|---|---|
| 5,014,763 A | 5/1991 | Frank |
| 5,130,067 A | 7/1992 | Flaitz et al. |
| 5,256,242 A | 10/1993 | Imaeda et al. |
| 5,279,994 A | 1/1994 | Kerkar |
| 5,296,318 A | 3/1994 | Gozdz et al. |
| 5,298,288 A | 3/1994 | Curry et al. |
| 5,385,700 A | 1/1995 | Denton |
| 5,456,000 A | 10/1995 | Gozdz et al. |
| 5,460,904 A | 10/1995 | Gozdz et al. |
| 5,538,814 A | 7/1996 | Kamauchi et al. |
| 5,620,637 A | 4/1997 | Kaga et al. |
| 5,856,045 A | 1/1999 | Fauteux et al. |
| 5,874,162 A | 2/1999 | Bastian et al. |
| 5,922,493 A | 7/1999 | Humphrey, Jr. et al. |
| 6,277,524 B1 | 8/2001 | Kanno |
| 6,306,535 B1 | 10/2001 | Tomimatsu et al. |
| 6,322,923 B1 | 11/2001 | Spotnitz et al. |
| 6,432,585 B1 | 8/2002 | Kawakami et al. |
| 6,447,712 B1 | 9/2002 | Dogan et al. |
| 6,656,641 B1 | 12/2003 | Kumar |
| 6,822,065 B1 | 11/2004 | Sanchez et al. |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,396,614 B2 | 7/2008 | Jouanneau et al. |
| 7,608,362 B2 | 10/2009 | Chpi et al. |
| 7,736,810 B2 | 6/2010 | Noh |
| 7,759,005 B2 | 7/2010 | Hosaka et al. |
| 7,794,557 B2 | 9/2010 | Hui et al. |
| 7,842,420 B2 | 11/2010 | Wixom et al. |
| 7,892,676 B2 | 2/2011 | Yang et al. |
| 7,901,658 B2 | 3/2011 | Weppner et al. |
| 7,923,149 B2 | 4/2011 | Hwang et al. |
| 7,923,154 B2 | 4/2011 | Audemer et al. |
| 7,939,198 B2 | 5/2011 | Mukherjee et al. |
| 7,972,899 B2 | 7/2011 | Oladeji |
| 8,076,021 B2 | 12/2011 | Shimamura et al. |
| 8,092,941 B2 | 1/2012 | Weppner et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,431,287 B2 | 4/2013 | Teramoto |
| 8,465,556 B2 | 6/2013 | Oladeji |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 9,350,047 B2 | 5/2016 | Yoshida et al. |
| 9,666,870 B2 | 5/2017 | Oladeji et al. |
| 9,720,299 B1 | 8/2017 | Timmerman et al. |
| 10,505,222 B2 | 12/2019 | Carignan et al. |
| 11,450,926 B2 | 9/2022 | Chen et al. |
| 2002/0068212 A1 | 6/2002 | Osenar et al. |
| 2002/0106447 A1 | 8/2002 | Lindstrom et al. |
| 2003/0049499 A1 | 3/2003 | Murakawa et al. |
| 2003/0072870 A1 | 4/2003 | Brandle et al. |
| 2003/0148179 A1 | 8/2003 | Uyama et al. |
| 2003/0180616 A1 | 9/2003 | Johnson et al. |
| 2003/0211397 A1 | 11/2003 | Ferla et al. |
| 2004/0126650 A1 | 7/2004 | Kim |
| 2004/0191617 A1 | 9/2004 | Visco et al. |
| 2005/0016839 A1 | 1/2005 | Horne et al. |
| 2005/0221163 A1 | 10/2005 | Yang et al. |
| 2006/0120160 A1 | 6/2006 | Park et al. |
| 2006/0186601 A1 | 8/2006 | Lopez |
| 2006/0197245 A1 | 9/2006 | Cheng et al. |
| 2006/0273758 A1 | 12/2006 | Sanada et al. |
| 2007/0015061 A1 | 1/2007 | Klaassen |
| 2007/0020385 A1 | 1/2007 | Naoi et al. |
| 2007/0037058 A1 | 2/2007 | Visco et al. |
| 2007/0148553 A1 | 6/2007 | Weppner et al. |
| 2007/0231704 A1 | 10/2007 | Inda |
| 2009/0068563 A1 | 3/2009 | Kanda et al. |
| 2009/0092747 A1 | 4/2009 | Zhamu et al. |
| 2009/0165933 A1 | 7/2009 | Loesch et al. |
| 2009/0197172 A1 | 8/2009 | Inda |
| 2009/0226790 A1 | 9/2009 | Kanamura et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0203383 A1 | 8/2010 | Weppner et al. |
| 2010/0263987 A1 | 10/2010 | Meyer et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0168327 A1 | 7/2011 | Oladeji |
| 2011/0171398 A1 | 7/2011 | Oladeji |
| 2011/0177398 A1 | 7/2011 | Affinito et al. |
| 2011/0223487 A1 | 9/2011 | Johnson et al. |
| 2011/0244337 A1 | 10/2011 | Ohta et al. |
| 2011/0262796 A1 | 10/2011 | Shimooka et al. |
| 2012/0085396 A1 | 4/2012 | Tsuda et al. |
| 2012/0263987 A1 | 5/2012 | Buckley et al. |
| 2012/0164553 A1 | 6/2012 | Gemba et al. |
| 2012/0196189 A1 | 8/2012 | Babic et al. |
| 2012/0208054 A1 | 8/2012 | Shirasawa et al. |
| 2012/0237834 A1 | 9/2012 | Ogasa |
| 2012/0251822 A1 | 10/2012 | Mao et al. |
| 2012/0276439 A1 | 11/2012 | Fujita et al. |
| 2013/0004814 A1 | 1/2013 | Ohashi et al. |
| 2013/0056998 A1 | 3/2013 | Chincarini et al. |
| 2013/0065135 A1 | 3/2013 | Takeda et al. |
| 2013/0085055 A1 | 4/2013 | Raj et al. |
| 2013/0108802 A1 | 5/2013 | Oladeji |
| 2013/0122380 A1 | 5/2013 | Visco et al. |
| 2013/0189562 A1 | 7/2013 | Dolle et al. |
| 2013/0216783 A1 | 8/2013 | Duan et al. |
| 2013/0260257 A1 | 10/2013 | Choi |
| 2013/0281175 A1 | 10/2013 | MacDonald et al. |
| 2013/0288875 A1 | 10/2013 | Miyagawa et al. |
| 2013/0344416 A1 | 12/2013 | Sakamoto et al. |
| 2014/0170480 A1 | 1/2014 | Oladeji |
| 2014/0057153 A1 | 2/2014 | Visco et al. |
| 2014/0057182 A1 | 2/2014 | DeJonghe et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0120409 A1 | 5/2014 | Ouchi et al. |
| 2014/0120421 A1 | 5/2014 | Ouchi et al. |
| 2014/0134483 A1 | 5/2014 | Ouchi et al. |
| 2014/0162113 A1 | 6/2014 | Ohta et al. |
| 2014/0170465 A1 | 6/2014 | Visco et al. |
| 2014/0170468 A1 | 6/2014 | Sasaoka |
| 2014/0170504 A1 | 6/2014 | Baek et al. |
| 2014/0186720 A1 | 7/2014 | Kintaka |
| 2014/0193695 A1 | 7/2014 | Hoshina et al. |
| 2014/0205910 A1 | 7/2014 | Weppner et al. |
| 2014/0234725 A1 | 8/2014 | Ogawa et al. |

(56) References Cited

U.S. PATENT DOCUMENTS

| | | |
|---|---|---|
| 2014/0287305 A1 | 9/2014 | Wachsman et al. |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0057824 A1 | 2/2015 | Gheerardyn et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0162641 A1 | 6/2015 | Visco et al. |
| 2015/0171398 A1 | 6/2015 | Roumi |
| 2015/0180001 A1 | 6/2015 | Johnson et al. |
| 2015/0200420 A1 | 7/2015 | Holme et al. |
| 2015/0236373 A1 | 8/2015 | Ohtomo et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2015/0333376 A1 | 11/2015 | Gaben |
| 2015/0380766 A1* | 12/2015 | Chao .......... H01M 4/5825 429/322 |
| 2016/0056500 A1 | 2/2016 | Holme et al. |
| 2016/0079631 A1 | 3/2016 | Flitsch et al. |
| 2016/0087321 A1 | 3/2016 | Wöhrle et al. |
| 2016/0111751 A1 | 4/2016 | Badding et al. |
| 2016/0149267 A1 | 5/2016 | Badding et al. |
| 2016/0190639 A1 | 6/2016 | Sung et al. |
| 2016/0204466 A1 | 7/2016 | Nogami et al. |
| 2016/0211547 A1 | 7/2016 | Hwang et al. |
| 2016/0244665 A1 | 8/2016 | Vosgroene et al. |
| 2016/0293988 A1 | 10/2016 | Sakamoto et al. |
| 2016/0308244 A1 | 10/2016 | Badding et al. |
| 2016/0315321 A1 | 10/2016 | Nose |
| 2016/0317305 A1 | 11/2016 | Pelled et al. |
| 2016/0329535 A1 | 11/2016 | Moomaw et al. |
| 2016/0380301 A1 | 12/2016 | Kosaka et al. |
| 2017/0005367 A1 | 1/2017 | Van Berkel et al. |
| 2017/0047586 A1 | 2/2017 | Kulisch et al. |
| 2017/0054139 A1 | 2/2017 | Kerkamm |
| 2017/0077545 A1 | 3/2017 | Shaffer, II et al. |
| 2017/0084949 A1 | 3/2017 | Yokoyama et al. |
| 2017/0149086 A1* | 5/2017 | Du .......... H01M 50/46 |
| 2017/0162901 A1 | 6/2017 | Chen et al. |
| 2017/0214048 A1 | 7/2017 | Qian et al. |
| 2017/0229731 A1 | 8/2017 | Visco et al. |
| 2017/0309943 A1 | 10/2017 | Angell et al. |
| 2017/0331092 A1 | 11/2017 | Chen et al. |
| 2017/0338522 A1* | 11/2017 | Hu .......... H01M 10/4235 |
| 2018/0261887 A1 | 9/2018 | Idikurt et al. |
| 2019/0006719 A1 | 1/2019 | Zhamu et al. |
| 2020/0067126 A1 | 2/2020 | Han et al. |

FOREIGN PATENT DOCUMENTS

| | | |
|---|---|---|
| CN | 102010183 | 4/2011 |
| CN | 102280659 A | 12/2011 |
| CN | 103117413 A | 5/2013 |
| CN | 104143652 A | 11/2014 |
| EP | 3 439 096 A1 | 2/2019 |
| JP | 10214638 A | 8/1998 |
| JP | 2000-128629 | 5/2000 |
| JP | 2004-63261 A | 2/2004 |
| JP | 2006-8488 A | 1/2006 |
| JP | 2012-38425 | 2/2012 |
| JP | 2012-224520 A | 11/2012 |
| JP | 2012-243743 | 12/2012 |
| JP | 2013-107779 | 6/2013 |
| JP | 2013-134852 | 7/2013 |
| JP | 5266634 B2 | 8/2013 |
| JP | 2013-214421 | 10/2013 |
| JP | 2015-215998 | 12/2015 |
| JP | 2016-134302 | 7/2016 |
| JP | 2016-535391 A | 11/2016 |
| JP | 2016212990 A | 12/2016 |
| JP | 2017004910 A * | 1/2017 |
| JP | 2017-098022 A | 6/2017 |
| KR | 20150128057 A | 11/2015 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2015/151144 A1 | 10/2015 |
| WO | WO 2016/044324 A1 | 3/2016 |
| WO | WO 2016/069749 | 5/2016 |
| WO | WO 2016/126610 | 8/2016 |
| WO | WO 2016/152565 A1 | 9/2016 |
| WO | WO 2017/171187 A1 | 10/2017 |
| WO | WO 2017/181266 | 10/2017 |
| WO | WO 2018/075972 A1 | 4/2018 |
| WO | WO 2019/108698 A1 | 6/2019 |
| WO | WO 2019/241745 A1 | 12/2019 |

OTHER PUBLICATIONS

JP2017004910A_Machine translation (Year: 2017).*
Communication pursuant to Article 94(3) EPC for the EP Application No. 18 819 429.4 dated Dec. 13, 2022, 8 pages.
International Search Report and Written Opinion mailed Apr. 15, 2016 in PCT/US2016/015209, 14 pages.
International Search Report and Written Opinion mailed Dec. 1, 2016 in PCT/US2016/043428, 11 pages.
International Search Report and Written Opinion mailed Mar. 10, 2015 in PCT/US2014/059578, 15 pages.
International Search Report and Written Opinion mailed Mar. 23, 2015 in PCT/US2014/059575, 16 pages.
International search report and written opinion of PCT/US2018/062915 dated Feb. 28, 2019, 11 pages.
English translation of Office Action of Chinese application No. 201480055387.9 mailed Dec. 22, 2016; 7 pages.
English translation of Office Action of Chinese application No. 201480055386.4 mailed Jan. 4, 2017; 9 pages.
Extended European Search Report dated Feb. 22, 2017 for European application No. 14864783.7; 9 pages.
Office Action mailed May 8, 2015 in U.S. Appl. No. 14/531,929, 12 pages.
Office Action of Japanese application No. 2016-520586 mailing date of Nov. 28, 2017 together with an English translation; 8 pages.
Second Office Action of Chinese Application No. 201480055386.4 mailing date of Nov. 1, 2017 together with an English translation, 10 pages.
Agrawal et al., "Solid polymer electrolytes: materials designing and all-solid-state battery applications: an overview", Journal of Physics D: Applied Physics 41, 2008, 223001, 18 pages.
Ahmad et al., "Concentration and mobility of mobile Li$^+$ ions in Li$_6$BaLa$_2$Ta$_2$O$_{12}$ and Li$_5$La$_3$Ta$_2$O$_{12}$ garnet lithium ion conductors," J Mater Sci: Mater Electron, 2015, vol. 26, pp. 8136-8142.
Ahmad, Mohamad M., "Lithium ionic conduction and relaxation dynamics of spark plasma sintered Li$_5$La$_3$Ta$_2$O$_{12}$ garnet nanoceramics," Ahmad Nanoscale Research Letters, 2015, 10:58, DOI 10.1186/s11671-015-0777-7; 10 pages.
Ahn et al., "Local impedance spectroscopic and microstructural analyses of Al-in-diffused Li$_7$La$_3$Zr$_2$O$_{12}$," Journal of Power Sources, 2014, vol. 254, pp. 287-292.
Aleman et al., "Definitions of Terms Relating to the Structure And Processing Of Sols, Gels, Networks, and Inorganic-Organic Hybrid Materials", Pure Appl. Chem., 2007, vol. 79, No. 10, pp. 1801-1829.
Allen et al., "Effect of substitution (Ta, Al, Ga) on the conductivity of Li$_7$La$_3$Zr$_2$O$_{12}$", issued on Journal of Power Sources 2012, vol. 206, pp. 315-319.
Arora et al., "Battery Separators", Chemical Reviews, 2004, vol. 104, pp. 4419-4462.
Baek et al., "Garnet related lithium ion conductor processed by spark plasma sintering for all solid state batteries," Journal of Power Sources, 2014, vol. 249, pp. 197-206.

(56) References Cited

OTHER PUBLICATIONS

Baggetto et al., "High Energy Density All-Solid-State Batteries: A Challenging Concept Towards 3D Integration", Advanced Functional Materials, 2008, vol. 18, pp. 1057-1066.

Bernuy-Lopez et al., "Atmosphere Controlled Processing of Ga-Substituted Garnets for High Li-Ion Conductivity Ceramics," Chem. Mater. 2014, vol. 26, pp. 3610-3617.

Bonderer et al., "Free-Standing Ultrathin Ceramic Foils", Journal of the American Ceramic Society, 2010, vol. 93, No. 11, pp. 3624-3631.

Bruce et al., "Li—$O_2$ and Li—S batteries with high energy storage", Nature Materials, Jan. 2012, vol. 11, pp. 19-29.

Buschmann et al. "Lithium metal electrode kinetics and ionic conductivity of the solid lithium ion conductors $Li_7La_3Zr_2O_{12}$ and $Li_7$, $La_3Zr_2$, $Ta_xO_{12}$ with garnet-type strucutre", Journal of Power Sources, 2012, vol. 206, pp. 236-244.

Buschmann et al., "Structure and dynamics of the fast lithium ion conductor: $Li_2La_3Zr_2O_{12}$", Phys. Chem. Chem. Phys., 2011, vol. 13, pp. 19378-19392.

Cao et al., "Effect of Sb—Ba codoping on the ionic conductivity of Li7 $La_3Zr_2O_{12}$ ceramic", Ceramics International, 2015, vol. 41, pp. 6232-6236.

Chen et al., "Origin of High Li+ Conduction in Doped $Li_7La_3Zr_2O_{12}$ Garnets," Chemistry of Materials, 2015, vol. 27, pp. 5491-5494.

Chen et al., "Sol-gel derived Li—La—Zr—O thin films as solid electrolytes for lithium-ion batteries", Journal of Materials Chemistry A, 2014, vol. 2, pp. 13277-13282.

Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.

Cheng et al., "Effect of Surface Microstructure on Electrochemical Performance of Garnet Solid Electrolytes", ACS Appl. Mater. Interfaces, 2015, vol. 7, pp. 2073-2081.

Cheng et al., "Interrelationships among Grain Size, Surface Composition Air Stability, and Interfacial Resistance of Al-Substituted $Li_7La_3Zr_2O_{12}$Solid Electrolytes," ACS Appl. Mater. Interfaces, 2015, vol. 7, pp. 17649-17655.

Cheng et al., "The origin of high electrolyte-electrode interfacial resistances in lithium cells containing garnet type solid electrolytes," Phys. Chem. Chem. Phys., 2014, vol. 16, pp. 18294-18300.

David et al., "Microstructure and Li-Ion Conductivity of Hot-Pressed Cubic $Li_7La_3Zr_2O_{12}$", J. Am. Cerami. Soc., 2015, pp. 1-6.

Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.

Dhivya et al., "Effect of Simultaneous Substitution of Y and Ta on the Stabilization of Cubic Phase, Microstructure, and $Li^+$ Conductivity of $Li_7La_3Zr_2O_{12}$Lithium Garnet," ACS Appl. Mater. Interfaces, 2014, vol. 6, pp. 17606-17615.

Dhivya et al., "$Li^+$ transport properties of W substituted $Li_7La_3Zr_2O_{12}$cubic lithium garnets," AIP Advances, 2013, vol. 3, No. 082115, 22 pages.

Djenadic, Ruzica et al., "Nebulized spray pyrolysis of Al-doped $Li_7La_3Zr_2O_{12}$solid electrolyte for battery applications," Solid State Ionics, 2014, vol. 263, pp. 49-56.

Dong et al., "Electrochemical perofmrance and lithium-ion insertion/extraction mechanism studies of the novel $Li_2ZrO_3$ anode materials," Electrochimica Acta, 2015, vol. 161, pp. 219-225.

Duvel, Andre, et al., "Mechanosynthesis of Solid Electrolytes: Preparation, Characterization, and Li Ion Transport Properties of Garnet-Type Al-Doped $Li_7La_3Zr_2O_{12}$Crystallizing with Cubic Symmetry," The Journal of Physical Chemistry, 2012, vol. 116, pp. 15192-15202.

Ferrese et al., "Lithium Redistribution in Lithium-Metal Batteries", Journal of The Electrochemical Society, vol. 159, 2012, pp. A1615-A1623.

Fries, R. et al., "Fabrication and properties of an anisotropic PZT/Polymer 0-3 composite," J. Mater. Sci.: Mater. in Electronics, 1994, vol. 5, pp. 238-243.

Geiger, Charles, A., et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Gorte et al., "Anodes for Direct Oxidation of Dry Hydrocarbons in a Solid-Oxide Fuel Cell", Advanced Materials, 2000, vol. 12, No. 19, pp. 1465-1469.

Gu et al., "Effects of penta-and trivalent dopants on structures and conductivity $Li_7La_3Zr_2O_{12}$," Solid State Ionics, 2015, vol. 274, pp. 100-105.

Han et a., "Experimental visualization of lithium conduction pathways in garnet-type $Li_7La_3Zr_2O_{12}$," Chem. Commun., 2012, vol. 48, pp. 9840-9842.

Hayashi et al., "All-solid-state rechargeable lithium battens with $Li_2S$ as a positive electrode material", J. Power Sources, vol. 183, 2008, pp. 422-426.

Hayashi et al., "New Phases in $La_2O_3$—$Li_2O$—$Ta_2O_5$ System," Mat. Res. Bull. 1986, vol. 21, No. 3, pp. 289-293.

Herrmann et al., "Micro-sgregations in liquid phase sintered silicon carbide ceramics," Journal of the European Ceramic Society, 2010, vol. 30, pp. 1495-1501.

Hitz et al., "Highly Li-Stuffed Garnet-Type $Li_{7+x}La_3Zr_{2-x}Y_xO_{12}$," Journal of The Electrochemical Society, 2013, vol. 160, No. 8, pp. A1248-A1255.

Hyooma et al., "Crystal Structures of $La_3Li_5M_2O_{12}$ (M=Nb, Ta)," Mat. Res. Bull. 1988, vol. 23, No. 10, pp. 1399-1407.

Inada et al., "Development of Lithium-Stuffed Garnet-Type Oxide Solid Electrolytes with High Ionic Conductivity for Application to All-Solid-State Batteries", Frontiers in Energy Research, vol. 4, article 26, Jul. 2016, pp. 1-12.

Ishiguro et al., "Stability of Nb-Doped Cubic $Li_2La_3Zr_2O_2$ with Lithium Metal," Journal of the Electrochemical Society, 2013, vol. 160, No. 10, pp. A1690-A1693.

Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 2014, vol. 248, pp. 943-950.

Jalem et al., "Effects of Gallium doping in Garnet-Type $Li_7La_3Zr_2O_{12}$ Solid Electrolytes," Chemistry of Materials, 2015, vol. 27, pp. 2821-2831.

Jalem, Randy et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.

Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace.13578.

Janani, Narayanasamy et al., "Influence of sintering additives on densification and $Li^+$ conductivity of Al doped $Li_7La_3Zr_2O_{12}$ lithium garnet," RSC Adv. 2014, vol. 4, pp. 51228-51238.

Jin et al., "Al-doped $Li_7La_3Zr_2O_2$ synthesized by a polymerized complex method," Journal of Power Sources, 2011, vol. 196, pp. 8683-8687.

Jung, Yun-Chae et al., "Ceramic separators based on Lip-conducting inorganic electrolyte for high-performance lithium-ion batteries with enhanced safety," Journal of Power Sources, 2015, vol. 293, pp. 675-683.

Kanamura et al., "Three dimensionally ordered composite solid materials for all solid-state rechargeable lithium batteries", Journal of Power Sources, vol. 146, Jun. 2005, pp. 86-89.

Kang et al., "First-Principles Study of Chemical Stability of Lithium Oxide Garnets $Li_7La_3M_2O_{12}$ (M=Zr, Sn, or Hf)," The Journal of Physical Chemistry C, 2014, vol. 118 (31), pp. 17402-17406.

Kato, Takehisa et al., "Preparation of thick-film electrode-solid electrolyte composites on $Li_7La_3Zr_2O_{12}$ and their electrochemical properties," Journal of Power Sources, 303, 2016, pp. 65-72.

(56) References Cited

OTHER PUBLICATIONS

Katsui et al., "Preparation of cubic and tetragonal $Li_7La_3Zr_2O_{12}$ flim by metal organic chemical vapor deposition," Thin Solid Films, vol. 584, Jun. 2015, pp. 130-134.

Kc, Santosh et al., "Point defects in garnet-type solid electrolyte (c-$Li_7La_3Zr_2O_{12}$) for Li-ion batteries," Solid State Ionics, 2014, vol. 261, pp. 100-105.

Kerman et al., "Complex oxide nanomembranes for energy conversion and storage: A review", Journal of Materials Research, vol. 29, No. 3, Feb. 14, 2014, pp. 320-337.

Kihira, Yuki et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.

Kim et al., "Epitaxial growth and lithium ion conductivity of lithium-oxide garnet for an all solid-state battery electrolyte", Dalton Transactions, 2013, vol. 42, pp. 13112-13117.

Kim et al., "The Effect of Relative Density on the Mechanical Properties of Hot-Pressed Cubic $Li_7La_3Zr_2O_{12}$," J. Am. Ceram. Soc., 2016, vol. 99, No. 4, pp. 1367-1374. DOI: 10.1111/jace.14084.

Kim, Ki Hyun et al., "Characterization of the interface between $LiCoO_2$ and $Li_7La_3Zr_2O_{12}$ in an all-solid-state rechargeable lithium battery," Journal of Power Sources, 196, 2011, pp. 764-767.

Kitaura et al., "Fabrication of electrode—electrolyte interfaces in all-solid-state rechargeable lithium batteries by using a supercooled liquid state of the glassy electrolytes", Journal of Materials Chemistry, vol. 21, No. 1, 2011, pp. 118-124.

Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.

Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.

Kokal et al., "Sol-gel synthesis and lithium ion conductivity of $Li_7La_3Zr_2O_{12}$ with garnet-related type structure," Solid State Ionics, 2011, vol. 185, pp. 42-46.

Kong et al., "Transparent Ceramics, Topics in Mining," Springer International Publishing Switzerland, 2015, pp. 29-91.

Kotobuki, Masashi et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.

Kotobuki, Masashi et al., "Fabrication of all-solid-state lithium battery with lithium metal anode using $Al_2O_3$-added $Li_7La_3Zr_2O_{12}$ solid electrolyte," Journal of Power Sources, 196, 2011, pp. 7750-7754.

Kotobuki, Masashi, et al., "Compatibility of Li2La3Zr2012 Solid Electrolyte to All-Solid-State Battery Using Li Metal Anode," Journal of the Electrochemical Society, 2010, vol. 157, No. 10, pp. A1076-A1079.

Lai, Wei et al., "Ultrahigh-Energy-Density Microbatteries Enabled by New Electrode Architecture and Micropackaging Design," Adv. Mater. 2010, vol. 22, E139-E144.

Lallemant et al., "Transparent polycrystalline alumina obtained by SPS: Green bodies processing effect," Journal of the European Ceramic Society, 2012, vol. 32, pp. 2909-2915.

Langer et al., "Syntheis of single phase cubic Al-substituted $Li_7La_3Zr_2O_{12}$ by solid state lithiation of mixed hydroxides, "Journal of Alloys and Compounds, 2015, vol. 645, pp. 64-69.

Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.

Lee et al., "High lithium ion conductivity of $Li_2La_3Zr_2O_{12}$ synthesized by solid state reaction," Solid State Ionics, 2014, vol. 258, pp. 13-17.

Li et al., "Optimizing Li conductivity in a garnet framework," J. Mater. Chem., 2012, vol. 22, pp. 15357-15361.

Li et al., "The reaction of $Li_{6.5}La_3Zr_{1.5}Ta_{0.5}O_{12}$ with water," Solid State Ionics, 2015, vol. 269, pp. 57-61.

Li et al., "W-Doped $Li_7La_3Zr_2O_{12}$ Ceramic Electrolytes for Solid State Li-ion Batteries," Electrochimica Acta, 2015, vol. 180, pp. 37-42.

Liu et al., "High Ion Conductivity in Garnet-type F-doped $Li_7La_3Zr_2O_{12}$," Journal of Inorganic Materials, Sep. 2015, vol. 30, No. 9, pp. 995-1001.

Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.

Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.

Matsuda et al., "Phase formation of a garnet-type lithium-ion conductor $Li_{7-3x}Al_xLa_3Zr_2O_{12}$," Solid State Ionics, 2015, vol. 277, pp. 23-29.

Matsui et al., "Phase stability of a garnet-type lithium ion conductor $Li_7La_3Zr_2O_{12}$," The Royal Society of Chemistry, Dalton Transactions, 2014, vol. 43, pp. 1019-1024.

Matsui et al., "Phase transformation of the garnet structured lithium ion conductor: $Li_7La_3Zr_2O_{12}$", Solid State Ionics, 2014, vol. 262, pp. 155-159.

McCloskey et al., "On the Mechanism of Nonaqueous $Li—O_2$ Electrochemistry on C and Its Kinetic Overpotentials: Some Implications for Li-Air Batteries", J. Phys. Chemistry C, 2012, vol. 116, pp. 23897-23905.

McKeen, Fluorinated Coatings and Finishes Handbook—The Definitive User's Guide and Databook, 2006, William Andrew Publishing/Plastics Design Library, Chapter 10, pp. 135-146.

Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \le x \le 0.375$, $0 \le y \le 1$) Superionic Conductor: A First Principles Investigation," Chem. Mater. 2013, vol. 25, pp. 3048-3055.

Miara et al., "First-Principles Studies on Cation Dopants and Electrolyte|Cathode Interphases for Lithium Garnets," Chemestry of Materials, 2015, vol. 27, pp. 4040-4047.

Minami et al., "Crystallization Process for Superionic $Li_7P_3S_{11}$ Glass—Ceramic Electrolytes", Journal of the American Ceramic Society, 2011, vol. 94, pp. 1779-1783.

Mitterdorfer et al., "Fabrication of thin electrolytes for second-generation solid oxide fuel cells," Solid State Ionics, 2000, vol. 131, pp. 79-96.

Miyauchi et al., "New Amorphous Thin Films of Lithium Ion Conductive Solid Electrolyte," Solid State Ionics 9 & 10, 1983, pp. 1469-1472.

Mizuno et al., "Environmentally Friendly Flux Growth of High-Quality, Idiomorphic $Li_5La_3Nb_2O_{12}$ Crystals," Cryst. Growth Des, 2013, vol. 13, pp. 479-484.

Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.

Mukhopadhyay et al., "Structure and Stoichiometry in Supervalent Doped $Li_7La_3Zr_2O_{12}$," Chem. Mater., 2015, vol. 27, pp. 3658-3665.

Murugan et al., "Schnelle Lithiumionenleitung in granatartigem $Li_7La_3Zr_2O_{12}$", Angew. Chem., 2007, vol. 119,7925-7928, with an English translation, "Fast Lithium Ion Conduction in Garnet-Type $Li_7La_3Zr_2O_{12}$," Angew. Chem. Int. Ed., 2007, 46, pp. 7778-7781.

Narayanan et al., "Dopant Concentration-Porosity-Li-Ion Conductivity Relationship in Garnet-Type $Li_{5+2x}La_3Ta_{2-x}Y_xO_{12}$ ($0.05 \le x \le 0.75$) and Their Stability in Water and 1 M LiCI," Inorganic Chemistry, 2015, vol. 54, pp. 6968-6977.

Nemori et al., "Stability of garnet-type solid electrolyte $Li_xLa_3A_{2-y}B_yO_{12}$ (A=Nb or Ta, B=Sc or Zr)," Solid State Ionics, 2015, vol. 282, pp. 7-12.

Neudecker et al., "'Lithium-Free' Thin-Film Battery with In Situ Plated Li Anode", Journal of The Electrochemical Society, 2000, vol. 147, No. 2, pp. 517-523.

Ni et al., "Room temperature elastic moduli and Vickers hardness of hot-pressed LLZO cubic garnet," J. Mater. Sci., 2012, vol. 47, pp. 7979-7985.

(56) References Cited

OTHER PUBLICATIONS

Nyman et al., "Alternative Approach to Increasing Li Mobility in Li—La—Nb/Ta Garnet Electrolytes," Chem. Mater., 2010, vol. 22, No. 19, pp. 5401-5410.

Ohta et al., "Co-sinterable lithium garnet-type oxide electrolyte with cathode for all-solid-state lithium ion battery," Journal of Power Sources, 2014, vol. 265, pp. 40-44.

Ohta et al., "High lithium ionic conductivity in the garnet-type oxide $Li_{7-x}La_3(Zr_{2-x}, Nb_x)O_{12}$(X=0-2)," Journal of Power Sources, 2011, vol. 196, pp. 3342-3345.

Ohta et al., "All-solid-state lithium ion battery using garnet-type oxide and Li3BO3 solid electrolytes fabricated by screen-printing," Journal of Power Sources, 2013, vol. 238, pp. 53-56.

Ohta et al., "Electrochemical performance of an all-solid-state lithium ion battery with garnet-type oxide electrolyte," Journal of Power Sources, 2012, vol. 202, pp. 332-335.

Onodera et al., "Flux Growth of Idiomorphic Garnet-Type Solid Electrolyte Crystals for All-Solid-State Lithium-Ion Rechargeable Batteries," 2012, The Electrochemical Society, Abstract #1198, 1 page.

Parashar et al., "Ethyl silicate binders for high performance coatings", 2001, Progress in Organic Coatings, 2001, vol. 42, pp. 1-14.

Park et al., "Effects of crystallinity and impurities on the electrical conductivity of Li—La—Zr—O thin films", Thin Solid Films, 2015, vol. 576, pp. 55-60.

Peng et al., "A Reversible and Higher-Rate Li—$O_2$ Battery", Science, Aug. 3, 2012, vol. 337, pp. 563-567.

Pierson, H.O., Handbook of "Carbon, Graphite, Diamond and Fullerenes"—Properties, Processing and Applications, 1993, William Andrew Publishing/Noyes, Chapter 3, Section 5.1, pp. 43-69.

Puech et al., "Elaboration and characterization of a free standing LiSICON membrane for aqueous lithiumeair battery," Journal of Power Sources, vol. 214, 2012, pp. 330-336.

Quartarone et al., "Electrolytes for solid-state lithium rechargeable batteries: recent advances and perspectives", Chemical Society Reviews, vol. 40, 2011, pp. 2525-2540.

Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.

Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.

Rangasamy et al., "A High Conducting Oxide—Sulfide Composite Lithium Superionic Conductor," J. Mater. Chem. A, published 2014, vol. 2, pp. 4111-4116.

Rangasamy, E., et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.

Rangasamy, E., et al., "The role of Al and Li concentration on the formation of cubic garnet solid electrolyte of nominal composition $Li_7La_3Zr_2O_{12}$," Solid State Ionics, 2012, vol. 206, pp. 28-32.

Rao et al., "In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.

Raskovalov et al., "Structure and transport properties of $L1_7La_3Zr_{2-0.75x}Al_xO_{12}$ supersonic solid electrolytes," Journal of Power Sources, 2013, vol. 238, pp. 48-52.

Reed, James S., Principles of Ceramics Processing, 2nd Edition, John Wiley & Sons, Inc., New York, pp. 60-61.

Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.

Ren et al., "Direct observation of lithium dendrites inside garnet-type lithium-ion solid electrolyte," Electrochemistry Communications, 2015, vol. 57, pp. 27-30.

Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.

Rettenwander et al., "Site Occupation of Ga and Al in Stabilized Cubic $Li_{7-3(x+y)}Ga_xAl_yLa_3Zr_2O_{12}$ Garnets As Deduced from $^{27}Al$ and $^{71}Ga$ MAS NMR at Ultrahigh Magnetic Fields," Chemistry of Materials, 2015, vol. 27, pp. 3135-3142.

Rettenwander et al., "Synthesis, Crystal Chemistry, and Electrochemical Properties of $Li_{7-2x}La_3Zr_{2-x}Mo_xO_{12}$ (x=0.1-0.4): Stabilization of the Cubic Garnet Polymorph via Substitution of $Zr^{4+}$ by $Mo^{6+}$," Inorganic Chemistry, 2015, vol. 54, pp. 10440-10449.

Rettenwander et al., "DFT study of the role of $Al^{3+}$ in the fast ion-conductor $Li_{7-3x}Al^{3+}{}_xLa_3Zr_2O_{12}$ Garnet," Chem. Mater. 2014, vol. 26, pp. 2617-2623.

Rosero-Navarro et al., "Preparation of $Li_7La_3(Zr_{2-x},Nb_x)O_{12}$ (x=0-1.5) and $Li_3BO_3/LiBO_2$ composites at low temperatures using a sol-gel process," Solid State Ionics, 2016, vol. 285, pp. 6-12.

Sakamoto et al., "Synthesis of nano-scale fast ion conducting cubic $Li_7La_3Zr_2O_{12}$", Nanotechnology, 2013, vol. 24, 424005, 8 pages.

Sakamoto, Jeff, "Garnet-based ceramic electrolyte: Enabling Li metal anodes and solid state batteries," Beyond Lithium Ion VI, Jun. 4-6, 2013, Boulder, CO., 36 pages.

Sakuda et al., "All-solid-state lithium secondary batteries using $LiCoO_2$ particles with pulsed laser deposition coatings of $Li_2S$—$P_2S_5$ solid electrolytes", J. Power Sources, vol. 196, 2011, pp. 6735-6741.

Sakuda et al., "Interfacial observation between $LiCoO_2$ electrode and $Li_2S$—$P_2S_5$ solid electrolytes of all-solid-stateLithium Secondary Batteries Using Transmission Electron Microscopy", Chem. of Materials, 2010, vol. 22, pp. 949-956; D01:10.1021/cm901819c.

Sakuda et al., "Evaluation of elastic modulus of $Li_2S$—$P_2S_5$ glassy solid electrolyte by ultrasonic sound velocity measurement and compression test", Journal of the Ceramic Society of Japan, vol. 121, 2013, pp. 946-949.

Satyanarayana et al., "Structure and Li+ dynamics of Sb-doped $Li_7La_3Zr_2O_{12}$ fast lithium ion conductors", issued on Phys. Chem. Chem. Phys., 2013, vol. 15, pp. 11327-11335.

Schafbauer et al., "Tape Casting as a Multi Purpose Shaping Technology for Different Applications in Energy Issues", Materials Science Forum, vols. 706-709, 2012, pp. 1035-1040.

Schmidt et al., "In-situ, non-destructive acoustic characterization of solid state electrolyte cells", Journal of Power Sources, 2016, vol. 324, pp. 126-133.

Sharafi et al., Characterizing the Li—$Li_7La_3Zr_2O_{12}$ interface stability and kinetics as a function of temperature and current density, Journal of Power Sources, 2016, vol. 302, pp. 135-139.

Shimonishi et al., "Synthesis of garnet-type $Li_{7-x}La_3Zr_2O_{12-frax;1;2x}$ and its stability in aqueous solutions," Solid State Ionics, 2011, vol. 183, pp. 48-53.

Shin et al., "Synergistic multi-doping effects on the $Li_7La_3Zr_2O_{12}$ solid electrolyte for fast lithium ion conduction," Scientific Reports, 2015, pp. 1-9.

Song et al., "Crystal structure, migration mechanism and electrochemical performance of Cr-stabilized garnet," 2014, vol. 268, pp. 135-139.

Stepina et al., "Ethylene vinylacetate copolymer and nanographite composite as chemical vapour sensor",Functional Materials and Nanotechnologies, 2013; IOP Conf. Series: Materials Science and Engineering 49, 2013, 012017 doi:10.1088/1757-899X/49/1/012017, pp. 1-4.

Suárez et al., "Sintering to Transparency of Polycrystalline Ceramic Materials," Mar. 2, 2012, pp. 527-553: http://www.intechopen.com/books/sintering-of-ceramics-new-emerging-techniques/sintering-to-transparencyof-polycrystalline-ceramic-materials.

Sudo et al., "Interface behavior between garnet-type lithium-conducting solid electrolyte and lithium metal," Solid State Ionics, 2014, vol. 262, pp. 151-154.

Suzuki et al., "Transparent cubic garnet-type solid electrolyte of $Al_2O_3$-doped $Li_7La_3Zr_2O_{12}$," Solid State Ionics, 2015, vol. 278, pp. 172-176.

Suzuki et al., "Development of complex hydride-based all-solid-state lithium ion battery applying low melting point electrolyte", Journal of Power Sources, 2017, vol. 359, pp. 97-103.

Tadanaga et al., "Low temperature synthesis of highly ion conductive $Li_7La_3Zr_2O_{12}$—$Li_3BO_3$ composites," Electrochemistry Communications, 2013, vol. 33, pp. 51-54.

(56) References Cited

OTHER PUBLICATIONS

Takada, "Progress and prospective of solid-state lithium batteries", Acta Materialia 61, 2013, pp. 759-770.
Takahashi et al., "All-solid-state lithium battery with $LiBH_4$ solid electrolyte", Journal of Power Sources, 2013, vol. 226, pp. 61-64.
Takeda et al., "High Pressure Form of Fluoride Garnets $Na_3M_2Li_3F_{12}$ (M= & Fe)," Mat. Res. Bull., 1977, vol. 12, No. 7, pp. 689-692.
Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.
Teng, Shiang, et al., "Recent Developments in garnet based solid state electrolytes for thin film batteries," Current Opinion in Solid State and Materials Science, Feb. 2014, vol. 18, No. 18, pp. 29-38.
Thangadurai et al., "Fast Solid-State Li Ion Conducting Garnet-Type Structure Metal Oxides for Energy Storage," J. Phys. Chem. Lett, 2015, vol. 6, pp. 292-299.
Thangadurai et al., "$Li_6ALa_2N O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.
Thangadurai et al., "Novel Fast Lithium Ion Conduction in Garnet-Type $Li_5La_3M_2O_{12}$ (M =NB, Ta)," J. Am. Ceram. Soc., 2003, vol. 86, No. 3, pp. 437-440.
Thangadurai et al., "Garnet-type solid-state fast Li ion conductors for Li batteries: critical review", Chemical Society Reviews, 2014, vol. 43, pp. 4714-4727.
Thompson et al., "A Tale of Two Sites: On Defining the Carrier Concentration in Garnet-Based Ionic Conductors for Advanced Li Batteries," Adv. Energy Mater, 2015, 1500096, pp. 1-9.
Toda, S., et al., "Low temperature cubic garnet-type $CO_2$-doped $Li_7La_3Zr_2O_{12}$," Solid State Ionics, 2013, vol. 233, pp. 102-106.
Tong et al., "Highly Conductive Li Garnets by a Multielement Doping Strategy", Inorganic Chemistry, 2015, vol. 54, pp. 3600-3607.
Ulissi, Ulderico et al., "All solid-state battery using layered oxide cathode, lithium-carbon composite anode and thio-LISICON electrolyte," Solid State Ionics, vol. 296, 2016, pp. 13-17.
Wainwright et al., "Forces generated by anode growth in cylindrical $Li/MoS_2$ cells," Journal of Power Sources, 1991, vol. 34, pp. 31-38.
Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.
Wang et al., "Formulation and characterization of ultra-thick electrodes for high energy lithium-ion batteries employing tailored metal foams", J. Power Sources, 2011, vol. 196, pp. 8714-8718.
Wang et al., "The synergistic effects of al and Te on the structure and Li+-mobility of garnet-type solid electrolytes", J. Mater. Chem. A., 2014, vol. 2, pp. 20271-20279.
Wang et al., "Transparent ceramics: Processing, materials and applications," Progress in Solid State Chemistry, 41, 2013, pp. 20-54.
Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.
Wang, Shutao et al., "Syntheses and structures of lithium zirconates for high-temperature $CO_2$ absorption," J. Mater. Chem. A, 2013, vol. 1, pp. 3540-3550.
Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.

Wilkinson, D.P. et al., "Effects of physical constraints on Li cycability," Journal of Power Sources, 1991, vol. 36, pp. 517-527.
Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.
Wolfenstine et al., "Chemical stability of cubic $Li_7La_3Zr_2O_{12}$ with molten lithium at elevated temperature", J. Mate Sci., 2013, vol. 48, pp. 5846-5851.
Xie et al., "Lithium Distribution in Aluminum-Free Cubic $Li_7La_3Zr_2O_{12}$", Chem. Mater., 2011, vol. 23, pp. 3587-3589.
Xie et al., "Low-temperature synthesis of $Li_7La_3Zr_2O_{12}$ with cubic garnet-type structure," Materials Research Bulletin, 2012, vol. 47, pp. 1229-1232.
Xu et al., "Multistep sintering to synthesize fast lithium garnets," Journal of Power Sources, 2016, vol. 302, pp. 291-297.
Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J.Physical Chemistry C, 2015, vol. 119, pp. 14947-14953.
Yi et al., "Flame made nanoparticles permit processing of dense, flexible, Li+ conducting ceramic electrolyte thin films of cubic-$Li_7La_3Zr_2O_{12}$ (c-LLZO) ," J. Mater. Chem. A, 2016, vol. 4, pp. 12947-12954.
Yoshima, Kazuomi et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.
Zaiß et al., "Fast ionic conduction in cubic hafnium garnet $Li_7La_3Hf_2O_{12}$," Ionics, Springer-Verlag, 2010, vol. 16, pp. 855-858.
Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.
Zhang et al., "Field assisted sintering of dense Al-substituted cubic phase $Li_7La_3Zr_2O_{12}$ solid electrolytes," Journal of Power Sources, 2014, vol. 268, pp. 960-964.
Zhang et al., "Preparation of cubic $Li_7La_3Zr_2O_{12}$ solid electrolyte using a nano-sized core-shell structured precursor," Journal of Alloys and Compounds, 2015, vol. 644, pp. 793-798.
Final Office Action of U.S. Appl. No. 17/204,924 dated Sep. 13, 2023.
Non-Final Office Action of the U.S. Appl. No. 16/766,214 dated Aug. 23, 2023.
Office Action of the Chinese Patent Application No. 2019800380355 dated Aug. 23, 2023.
Ding et al., "Dendrite-Free Lithium Deposition via Self-Healing Electrostatic Shield Mechanism", J. Am. Chem. Soc., 2013, vol. 135, pp. 4450-4456, dx.doi.org/10.1021/ja312241y.
Louli et al., "Diagnosing and correcting anode-free cell failure via electrolyte and morphological analysis", Nature Energy, https://doi.org/10.1038/s41560-020-0668-8; 10 pages.
Niu et al., "High-energy lithium metal pouch cells with limited anode swelling and long stable cycles", Nature Energy, Jul. 2019, vol. 4, pp. 551-559, https://doi.org/10.1038/s41560-019-0390-6.
Zhu et al., "Design principles for self-forming interfaces enabling stable lithium-metal anodes", PNAS Latest Articles, www.pnas.org/cgi/doi/10.1073/pnas.2001923117; 9 pages.
Notice of Reasons for Rejection for JP Patent Application No. 2020-568251 mailing date of Jul. 26, 2023, and its English translation; 11 pages.
Non-Final Office Action of U.S. Appl. No. 17/251,741 dated Sep. 29, 2023.
Final Office Action for U.S. Appl. No. 16/461,119 dated Mar. 14, 2024; 13 pages.

\* cited by examiner

A is LiBH$_4$:LiI (3:1); B is LiNH$_2$:LiBH$_4$:LiI (3:3:2); C is LiNH$_2$:LiBH$_4$:LiI (9:3:4); and D is LiNH$_2$:LiBH$_4$:LiI (9:3:2)

SOLID-STATE BATTERY

CROSS-REFERENCE TO RELATED APPLICATIONS

The application claims the benefit of priority to U.S. Provisional Patent Application No. 62/681,576, filed Jun. 6, 2018, and titled HYBRID SOLID-STATE BATTERY, the entire contents of which are herein incorporated by reference in their entirety for all purposes.

FIELD

The present disclosure concerns solid-state rechargeable batteries, which are also known as secondary batteries.

BACKGROUND

Batteries are referred to as solid-state batteries when they include a solid-state electrolyte separator between the positive and negative electrodes of the battery cell. The solid-state electrolyte lacks flammable organic solvents and is therefore attractive for safety reasons.

Solid-state batteries operate within comparatively wider temperature, voltage, and pressure ranges than liquid electrolyte-based batteries do. Solid-state batteries may also include solid-state positive and negative electrodes. Solid-state batteries may include, for example, a metallic lithium (Li) negative electrode. Li metal negative electrodes maximize the energy density in a Li$^+$ ion battery because they maximize the positive and negative electrode voltage differential. Solid-state rechargeable batteries are predicted to be safer (e.g., less flammable) and have higher energy and power densities than liquid electrolyte-based batteries currently commercially available. However, a series of unmet challenges remain, which has prevented the realization of commercially viable solid-state batteries.

Some solid-state battery researchers have employed a single, monolithic single ion conductor to act as the electrolyte separator between the positive and negative electrodes. There are many problems associated with this approach. For example, to date no single ion conducting solid-state electrolyte has both sufficiently high ionic conductivity and also sufficiently high mechanical strength, while further being commercially affordable to process, light enough for certain applications, and also stable in the voltage range of 0-5 V vs. Li. Solid-state batteries to date inevitably encounter design tradeoffs in order to address each of these problems.

Some researchers have attempted to include more than one type of solid-state electrolyte in solid-state electrochemical cells. For example, some researchers prepared an oxidesulfide composite of a lithium superionic conductor. See J. Mater. Chem. A, 2014, 2, 4111-4116 DOI: 10.1039/C3TA15223E, which reports an oxide-sulfide composite that included a mixture of lithium-stuffed garnet powder with lithium phosphorous sulfide (LPS) powder. See also http://ma.ecsdl.org/content/MA2016-01/2/264.abstract, which sets forth results of an electrochemical cell having a metallic Li anode, a solid oxide electrolyte (LLZO), and a composite cathode consisting of an $75Li_2S:25P_2S_5$ sulfide electrolyte and $TiS_2$. See also Y. Kato, et al. DOI: 10.1038/NENERGY.2016.30, which reports cycling data for an electrochemical cell having $LiNbO_3$-coated $LiCoO_2$ positive electrode active materials and certain sulfide solid-state electrolytes ($Li_{9.6}P_3S_{12}$, $Li_{10}GeP_2S_{12}$, $Li_{9.54}Si_{1.74}P_{1.44}S_{11.7}Cl_{0.3}$). See also Suzuki, et al., Journal of Power Sources 359 (2017) 97-103, which sets forth a solid-state cell. These reported results suffer from a variety of deficiencies, including low capacity and capacity fade over time.

Because a series of unmet challenges remain, solutions to the aforementioned problems as well as others in the relevant filed are needed. The instant disclosure provides compositions, processes, and methods for overcoming these and other challenges and problems.

SUMMARY

In one embodiment, set forth herein is a solid-state electrochemical cell (SSEC), which includes (a) a positive electrode layer comprising an active material and a sulfide catholyte; (b) a single ion conducting, solid-state buffer; (c) a borohydride bonding layer; and (d) a lithium-stuffed garnet layer. The buffer is mixed within the positive electrode layer, the buffer is present as a layer in contact with the positive electrode layer, or both the buffer is mixed within the positive electrode layer and the buffer is present as a layer in contact with the positive electrode layer. The borohydride bonding layer is between and in contact with the lithium-stuffed garnet layer and either (i) the positive electrode layer with a buffer mixed therein or (ii) a buffer layer in contact with the positive electrode.

In a second embodiment, set forth herein is a method of making an electrochemical cell, in which the method includes the following steps: (a) providing a slurry comprising an active material, a catholyte, and a solvent; (b) depositing the slurry onto a current collector; (c) drying the slurry; (e) providing a second slurry comprising a single ion conducting, solid-state buffer; (f) depositing the second slurry onto a substrate; (g) drying the deposited second slurry to form a buffer layer; (h) transferring the buffer layer onto the first slurry, once dried, to form a stack; (i) applying pressure and heat to the stack; (j) providing a solid-state separator; (k) depositing a borohydride layer onto the solid-state separator; (l) combining the stack with the solid-state separator having a borohydride layer thereupon to form an electrochemical cell stack; and (m) applying pressure and heat to the electrochemical cell stack.

In one aspect, provided herein is a solid-state electrochemical stack including: (a) a positive electrode layer including a positive electrode active material, a binder, and a sulfide catholyte, wherein the positive electrode layer has a porosity less than 15% by volume (v/v); (b) a buffer layer including a sulfide electrolyte in contact with the positive electrode layer, wherein the buffer layer has a porosity less than 15% v/v; and (c) a separator layer including a member selected from the group consisting of lithium-stuffed garnet and LPSX, wherein the separator layer has a porosity less than 10% v/v; and wherein the buffer layer is between the positive electrode layer and the separator layer.

In another aspect, provided is a process for producing a solid-state electrochemical stack including: (a) casting a first slurry including a sulfide solid electrolyte powder onto a first substrate to form a first layer; (b) casting a second slurry including a sulfide solid electrolyte powder and a positive electrode active powder onto a second substrate to form a second layer; and (c) calendering the first layer and the second layer, wherein the first layer and second layer are in direct contact with each other. In another aspect, provided herein is a dual layer stack comprising: (a) a positive electrode layer comprising an active material and a sulfide catholyte; and (b) a single ion conducting, solid-state buffer;

wherein the buffer is mixed within the positive electrode layer, or is a layer in contact with the positive electrode layer, or both.

BRIEF DESCRIPTIONS OF THE DRAWINGS

FIG. 1 shows a schematic illustration of an example electrochemical cell.

FIG. 2 shows a cross-section scanning electron microscopy image (cross-section prepare by focused ion beam) of the solid-state cathode (SSC), buffer layer, bonding layer, garnet film in an electrochemical cell made in Example 1. The scale bar in FIG. 2 is 50 µm. The imaging conditions were WD 4.4 mm, HV 5.00 kV, HFW, 207 µm, mag 2000×, det TLD, tilt 52°, BSE mode.

DETAILED DESCRIPTION

General

Figure 1:
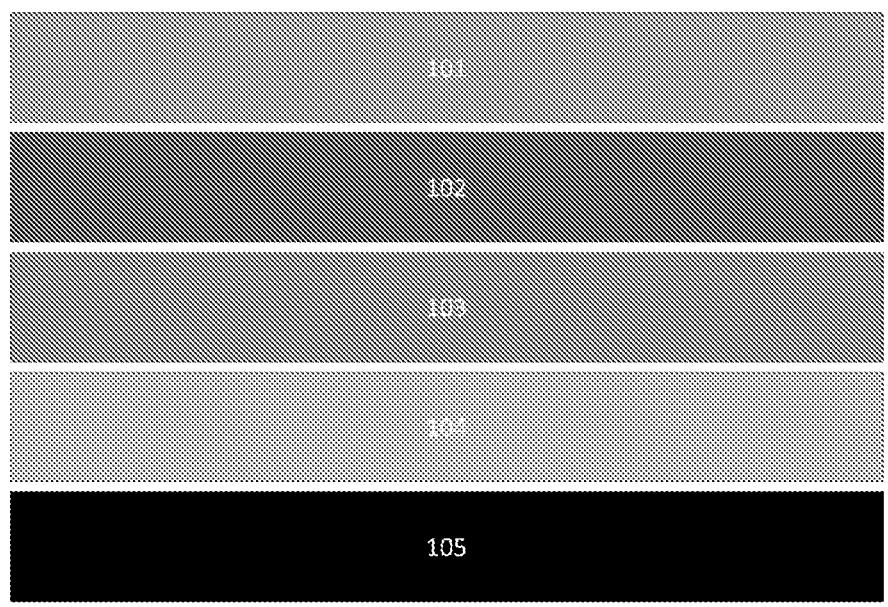

In some examples, the instant disclosure sets forth electrochemical cells that are observed to demonstrate an ASR that is less than 50 Ω-cm² at room temperature. The electrochemical cells disclosed herein include an oxide electrolyte separator and a sulfide electrolyte separator. The electrochemical cells herein include a sulfide-oxide solid-state electrolyte interface. A bonding layer comprising a borohydride, is used to bond an oxide electrolyte separator and a sulfide electrolyte separator. The oxide electrolyte separator is kinetically stable against metallic Li and has a suitable mechanical strength for conducting a high current density of $Li^+$ ions. The sulfide catholyte in the solid-state cathode and/or the sulfide buffer layer adjacent to the solid-state cathode provides a conductive pathway for lithium ions, which is suitable for use with a high active material mass loading in the positive electrode. In some examples the sulfide catholyte is kinetically stable to the coated active material (e.g. LZO coated NCA or LZO coated NMC). In some examples the sulfide catholyte is kinetically stable to the coated active material (e.g., LZO coated NCA) in the voltage window 2.7-4.2V vs. Li. The borohydride bonding layer bonds the oxide electrolyte separator and the sulfide (buffer) electrolyte separator and also provides an ion conduction pathway between the two electrolyte separators.

The electrochemical cells disclosed herein, in certain examples, include an oxide solid-state separator in contact with the negative electrode side of an electrochemical cell and a sulfide solid-state separator in contact with the positive electrode side of the electrochemical cell. In some examples, both the sulfide and oxide solid-state separator have high lithium ion conductivity, e.g., greater than $1*10^{-3}$ S/cm². In between the oxide solid-state separator and the sulfide solid-state separator, in some examples, is a bonding layer made of a borohydride. On the side of the oxide solid-state separator opposite the borohydride bonding layer, in some examples, is a lithium negative metal electrode. On the side of the sulfide solid-state separator opposite the borohydride bonding layer, in some examples, is a positive electrode.

Definitions

If a definition provided in any material incorporated by reference herein conflicts with a definition provided herein, the definition provided herein controls.

As used herein, the term "about" when qualifying a number, e.g., about 15% w/w, refers to the number qualified and optionally the numbers included in a range about that qualified number that includes ±10% of the number. For example, about 15 w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the phrase "active material," refers to a material that intercalates, or converts with, lithium in a reversible reaction such that the active material is suitable for use in a rechargeable battery. Active materials may include intercalation materials such as NCA or NMC. Active materials may include conversion chemistry materials such as $FeF_3$. For example, active materials may include, but are not limited to, any active material set forth in US US20160211517A1, which published Jul. 21, 2016, and is titled LITHIUM RICH NICKEL MANGANESE COBALT OXIDE.

As used herein, the term "amorphous," refers to a material that is not crystalline or that does not contain a majority crystalline phase. Amorphous refers to a material that does not evidence a crystalline property, for example, well-defined x-ray diffraction peaks as measured by x-ray diffraction. An amorphous material is at least primarily amorphous and characterized as having more amorphous components than crystalline components. Substantially amorphous refers to a material that does not include well defined x-ray diffraction peaks or that is characterized by an x-ray diffraction pattern that includes broad reflections that are recognized by a person having ordinary skill in the art as having the majority constituent component phase as an amorphous phase. A material that is substantially amorphous may have nano-sized domains of crystallinity, but which are still characterized by an x-ray diffraction pattern to be primarily in an amorphous phase. In a substantially amorphous material, transmission electron microscopy (TEM) selected area diffraction pattern (SADP) may evidence regions of crystallinity, but would also evidence a majority of the volume of the material as amorphous.

As used herein, the term "semiamorphous" or "semi-crystalline" refers to a composition having both crystalline and amorphous domains. A semi-crystalline material includes both nanocrystalline and/or microcrystalline components in addition to amorphous components. A semi-crystalline material is a material that is partially crystallized or is a material that includes some crystalline bulk and some amorphous bulk. For example, a material heated to its crystallization temperature, but subsequently cooled before the entirety of the material is able to crystallize, completely, is referred to herein as semi-crystalline material. As used herein, a semi-crystalline material can be characterized by an XRD powder pattern in which the primary peak of highest intensity has a full width at half maximum of at least 1° (2Θ), or at least 2° (2Θ), or at least 3° (2Θ).

As used herein, the term "anolyte," refers to an ionically conductive material that is mixed with, or layered upon, or laminated to, an anode material or anode current collector.

As used herein the phrase "applying a pressure," refers to a process whereby an external device, e.g., a calender, induces a pressure in another material.

As used herein, the phrase "at least one member selected from the group," includes a single member from the group, more than one member from the group, or a combination of members from the group. At least one member selected from the group consisting of A, B, and C includes, for example, A, only, B, only, or C, only, as well as A and B as well as A and C as well as B and C as well as A, B, and C or any other all combinations of A, B, and C.

As used herein "ASR" refers to area-specific resistance. ASR is measured using electrochemical impedance spectroscopy (EIS). EIS can be performed on a Biologic VMP3 instrument or an equivalent thereof. In an ASR measurement, lithium contacts are deposited on two sides of a sample. An AC voltage of 25 mV rms is applied across a frequency of 300 kHz-0.1 mHz while the current is measured. EIS partitions the ASR into the bulk contribution and the interfacial ASR contribution, by resolving two semicircles in a Nyquist plot.

As used herein the phrase "borohydride bonding layer" refers to a layer which includes a borohydride compound and which adheres a lithium-stuffed garnet layer to a sulfide electrolyte layer or sulfide including buffer. Non-limiting examples of the borohydride include, but are not limited to, $3LiBH_4 \cdot 2LiI \cdot 3LiNH_2$ or $3LiBH_4 \cdot 4LiI \cdot 9LiNH_2$. The borohydride may be any compound set forth in WO 2018/075972, which published Apr. 26, 2018, and was filed as International PCT Patent Application No. PCT/US2017/057735, and is entitled ELECTROLYTE SEPARATORS INCLUDING LITHIUM BOROHYDRIDE AND COMPOSITE ELECTROLYTE SEPARATORS OF LITHIUM-STUFFED GARNET AND LITHIUM BOROHYDRIDE, the entire contents of which are incorporated by reference herein in their entirety for all purposes. The borohydride may be any compound set forth in WO2019078897A1, which published Apr. 25, 2019, and was filed as International PCT Patent Application No. PCT/US2017/057739, filed Oct. 20, 2017, and is entitled BOROHYDRIDE-SULFIDE INTERFACIAL LAYER IN ALL SOLID STATE BATTERY, the entire contents of which are incorporated by reference herein in their entirety for all purposes.

As used herein, "binder" refers to a polymer with the capability to increase the adhesion and/or cohesion of an electrode. Suitable binders may include, but are not limited to, PVDF, PVDF-HFP, SBR, and ethylene alpha-olefin copolymer.

As used herein, the term "buffer" refers to a single ion conducting, solid-state electrolyte that is finely mixed within or combined with the positive electrode components or is a layer which is in direct contact with the positive electrode, e.g., an electrolyte layer laminated to the positive electrode layer. Single ion conducting means that the material only conducts one type of ion, e.g., a $Li^+$ ion with a transference number of greater than 0.9. Solid-state means that the buffer exists in the solid phase at ambient temperatures and pressures.

As used herein, the phrase "buffer is mixed within the positive electrode layer," means that the buffer material is ground up, e.g., milled, and then mixed with the other positive electrode layer compounds, e.g., active material and conductive carbon, when the positive electrode layer is formed.

As used herein the phrase "casting a film," refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot die, slip and/or tape casting, and other methods.

As used herein, the phrase "characterized by the formula" refers to a description of a chemical compound by its chemical formula.

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer which is laminated to a positive or negative electrode. In some examples, the current collector is Al. In some examples, the current collector is Cu. In some examples, the current collector is Ni. In some examples, the current collector is steel. In some examples, the current collector is an alloy of Al. In some examples, the current collector is an alloy of Cu. In some examples, the current collector is an alloy of steel. In some examples, the current collector is Al. In some examples, the current collector is coated with carbon. In some examples, the current collector comprises a combination of the above metals. During charging and discharging, electrons move in the opposite direction to the flow of Li ions and pass through the current collector when entering or exiting an electrode.

As used herein, the term "diameter $(d_{90})$" refers to the size, in a distribution of sizes, measured by microscopy techniques or other particle size analysis techniques, including, but not limited to, scanning electron microscopy or dynamic light scattering. $D_{90}$ includes the characteristic dimension, i.e., particle size, at which 90% of the total particle area (for a 2D sampling method like microscopy) or volume (for a 3D sampling method like light scattering) is representative of particles smaller than the recited size. In other words, in a collection of particle sizes, $d_{90}$ indicates the size at which 90% of the particles in the collection have a size smaller than the recited size. Similarly, the term "diameter $(d_{50})$" includes the characteristic dimension at which 50% of the total particle area (or volume) is representative of particles smaller than the recited size. Similarly, the term "diameter $(d_{10})$" includes the characteristic dimension at which 10% of the total particle area (or volume) is representative of particles smaller than the recited size. These figures may be calculated on a per-volume or per-area basis. Per-volume basis is assumed if neither is explicitly recited.

As used herein, a "binder" refers to a material that assists in the adhesion of another material. For example, as used herein, polyvinyl butyral is a binder because it is useful for adhering garnet materials. Other binders may include polycarbonates. Other binders may include polyacrylates and polymethacrylates. These examples of binders are not limiting as to the entire scope of binders contemplated here but merely serve as examples. Binders useful in the present disclosure include, but are not limited to, polypropylene (PP), polyethylene, atactic polypropylene (aPP), isotactic polypropylene (iPP), ethylene propylene rubber (EPR), ethylene pentene copolymer (EPC), polyisobutylene (PIB), styrene butadiene rubber (SBR), polyolefins, polyethylene-co-poly-1-octene (PE-co-PO), polyethylene-co-poly(methylene cyclopentane) (PE-co-PMCP), poly(methyl methacrylate) (and other acrylics), acrylic, polyvinylacetacetal resin, polyvinyl butyral resin, PVB, polyvinyl acetal resin, stereoblock polypropylenes, polypropylene polymethylpentene copolymer, polyethylene oxide (PEO), PEO block copolymers, silicone, and the like. In some examples, including any of the foregoing, the binder is a polymer is selected from the group consisting of polyacrylonitrile (PAN), polypropylene, polyethylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxyethyl glycidyl ether (PEO-MEEGE), polyethylene oxide 2-methoxyethoxyethyl glycidyl poly(allyl glycidyl ether) (PEO-MEEGE-AGE), polysiloxane, polyvinylidene fluoride (PVDF), polyvinylidene fluoride hexafluoropropylene (PVDF-HFP), ethylene propylene (EPR), nitrile rubber (NPR), styrene-butadiene-rubber (SBR), polybutadiene polymer, polybutadiene rubber (PB), polyisobutadiene rubber (PIB), polyolefin, alpha-polyolefin, ethylene alpha-polyolefin, polyisoprene rubber (PI), polychloroprene rubber (CR), acrylonitrile-butadiene rubber (NBR), and polyethyl acrylate (PEA). As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the term "contact" means direct contact unless specified otherwise. For electrically conductive materials, contact means contact sufficient for electrical conduction to occur between the contacting materials. For ionically conductive materials, contact means contact sufficient for ionic conduction to occur between the contacting materials. Two materials which are in direct contact are positioned without an interleaving layer between the two materials. As used herein, the phrase "electrical contact," refers to contact sufficient for electrical conduction to occur between the contacting materials.

As used herein, the phrase "direct contact," means that two materials are in sufficient physical contact to conduct an electronic or ionic current therebetween, if the materials are electrically or ionically conductive. Direct contact between two materials, one of which is electrically or ionically insulating, means that the two materials share an interface that transmits an applied force or pressure.

As used herein, the phrase "electrical contact" means that two materials are in direct contact and can conduct an electrical current through the point(s) of direct contact.

As used herein, the terms "cathode" and "anode" refer to the electrodes of a battery. During a charge cycle in a Li-secondary battery, Li ions leave the cathode and move through an electrolyte and to the anode. During a charge cycle, electrons leave the cathode and move through an external circuit to the anode. During a discharge cycle in a Li-secondary battery, Li migrate towards the cathode through an electrolyte and from the anode. During a discharge cycle, electrons leave the anode and move through an external circuit to the cathode.

As used herein, the phrase "green film" or "green tape" refers to an unsintered tape or film that includes lithium-stuffed garnet or precursors to lithium-stuffed garnet and at least one of a binder, plasticizer, carbon, dispersant, solvent or combinations thereof. As used herein, "green film tape" refers to a roll, continuous layer, or cut portion thereof of casted tape, either dry or not dry, of green film.

As used herein, the phrases "electrochemical cell" or "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container.

As used herein, the phrase "electrochemical device" refers to an energy storage device, such as, but not limited to a Li-secondary battery that operates or produces electricity or an electrical current by an electrochemical reaction, e.g., a conversion chemistry reaction such as $3Li + FeF_3 \leftrightarrow 3LiF + Fe$.

As used herein, the term "electrolyte," refers to a material that allows ions, e.g., $Li^+$, to migrate therethrough, but which does not allow electrons to conduct therethrough. The ionic conductivity is greater than the electronic conductivity by a factor of at least 1000. Electrolytes are useful for electrically insulating the cathode and anode of a secondary battery while allowing ions, e.g., $Li^+$, to transmit through the electrolyte. Solid electrolytes, in some examples, rely on ion hopping and/or diffusion through rigid structures. Solid electrolytes may be also referred to as fast ion conductors or super-ionic conductors. In this case, a solid electrolyte layer may be also referred to as a solid electrolyte separator or a solid-state electrolyte separator.

As used herein the phrase "energy storage electrode," refers to, for example, an electrode that is suitable for use in an energy storage device, e.g., a lithium rechargeable battery or Li-secondary battery. As used herein, such an electrode is capable of conducting electrons and Li ions as necessary for the charging and discharging of a rechargeable battery.

As used herein, the phrase "film thickness" refers to the distance, or median measured distance, between the top and bottom faces of a film. As used herein, the term "thickness" when referring to a layer refers to the distance, or median measured distance, between the top and bottom faces of the layer. As used herein, the top and bottom faces refer to the sides of the film having the largest surface area. Scanning electron microscopy is used to measure thickness unless specified otherwise explicitly.

As used herein, "flatness" of a surface refers to the greatest normal distance between the lowest point on a surface and a plane containing the three highest points on the surface, or alternately, the greatest normal distance between the highest point on a surface and a plane containing the three lowest points on the surface. It may be measured with an atomic force microscope (AFM), a high precision optical microscope, or laser interferometry height mapping of a surface.

As used herein, the term "thin film" refers to a film having the components, compositions, or materials described herein where the film has an average thickness dimension of about 10 nm to about 100 µm. In some examples, thin refers to a film that is less than about 1 µm, 10 µm, or 50 µm in thickness.

As used herein, the phrase "lithium interfacial resistance," refers to the interfacial resistance of a material towards the incorporation of $Li^+$ ions. A lithium interfacial ASR (AS-$R_{interface}$) is calculated from the interfacial resistance ($R_{interface}$), by the equation $ASR_{interface}=R_{interface}*A/2$, where A is the area of the electrodes in contact with the separator and the factor of 2 accounts for 2 interfaces when measured in a symmetric cell and $R_{interface}=R_{total}-R_{bulk}$, wherein $R_{total}$ is total resistance and $R_{bulk}$ is bulk resistance.

As used herein, the phrase "lithium-stuffed garnet" refers to oxides that are characterized by a crystal structure related to a garnet crystal structure. Some examples of lithium-stuffed garnets are set forth in U.S. Patent Application Publication No. 2015/0099190, which published Apr. 9, 2015, and was filed Oct. 7, 2014 as Ser. No. 14/509,029, and is incorporated by reference herein in its entirety for all purposes. This application describes Li-stuffed garnet solid-state electrolytes used in solid-state lithium rechargeable batteries. These Li-stuffed garnets generally having a composition according to $Li_ALa_BM'_CM''_DZr_EO_F$, $Li_ALa_BM'_CM''_DTa_EO_F$, or $Li_ALa_BM'_CM''_DNb_EO_F$, wherein 4<A<8.5, 1.5<B<4, 0≤C≤2, 0≤D≤2; 0≤E<3, 10<F<13, and M' and M" are each, independently in each instance selected from Ga, Al, Mo, W, Nb, Sb, Ca, Ba, Sr, Ce, Hf, Rb, and Ta, or $Li_aLa_bZr_cAl_dMe''_eO_f$, wherein 5<a<8.5; 2<b<4; 0<c≤2.5; 0≤d<2; 0≤e<2, and 10<f<13 and Me" is a metal selected from Ga, Nb, Ta, V, W, Mo, and Sb and as otherwise described in U.S. Patent Application Publication No. 2015/0099190. As used herein, lithium-stuffed garnets, and garnets, generally, include, but are not limited to, $Li_{7.0\pm\delta}La_3(Zr_{t1}+Nb_{t2}+Ta_{t3})O_{12}+0.35Al_2O_3$; wherein δ is from 0 to 3 and (t1+t2+t3=2) so that the La:(Zr/Nb/Ta) ratio is 3:2. For example, δ is 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. In some examples, the Li-stuffed garnet herein has a composition of $Li_{7\pm\delta}Li_3Zr_2O_{12}\cdot xAl_2O_3$. In yet another embodiment, the Li-stuffed garnet herein has a composition of $Li_{7\pm\delta}Li_3Zr_2O_{12}\cdot 0.22Al_2O_3$. In yet other examples, the Li-stuffed garnet herein has a composition of $Li_{7\pm\delta}Li_3Zr_2O_{12}\cdot 0.35Al_2O_3$. In certain other examples, the Li-stuffed garnet herein has a composition of $Li_{7\pm\delta}Li_3Zr_2O_{12}\cdot 0.5Al_2O_3$. In another example, the Li-stuffed garnet herein has a composition of $Li_{7\pm\delta}Li_3Zr_2O_{12}\cdot 0.75Al_2O_3$. Also, L-stuffed garnets used herein include, but are not limited to, $Li_xLa_3Zr_2O_F+yAl_2O_3$, wherein x ranges from 5.5 to 9; and y ranges from 0.05 to 1. In these examples, subscripts x, y, and F are selected so that the Li-stuffed garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples, x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, Li-stuffed garnets as used herein include, but are not limited to, $Li_xLa_3Zr_2O_{12}+yAl_2O_3$, wherein y is from 0 to 1 and includes 0 and 1. In one embodiment, the Li-stuffed garnet herein has a composition of $Li_7Li_3Zr_2O_{12}$.

As used herein, garnet or Li-stuffed garnet does not include YAG-garnets (i.e., yttrium aluminum garnets or, e.g., $Y_3Al_5O_{12}$). As used herein, garnet does not include silicate-based garnets such as pyrope, almandine, spessartine grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrases "garnet precursor chemicals," "chemical precursor to a garnet-type electrolyte," "precursors to garnet" and "garnet precursor materials" refer to chemicals which react to form a lithium-stuffed garnet material described herein. These chemical precursors include, but are not limited to lithium hydroxide (e.g., LiOH), lithium oxide (e.g. $_2O$), lithium carbonate (e.g., $LiCO_3$), zirconium oxide(e.g., $ZrO_2$), lanthanum oxide (e.g., $La_2O_3$), lanthanum hydroxide (e.g., $La(OH)_3$), aluminum oxide (e.g., $Al_2O_3$), aluminum hydroxide (e.g., $Al(OH)_3$), AlOOH, aluminum (e.g., Al), Boehmite, gibbsite, corundum, aluminum nitrate (e.g., $Al(NO_3)_3$), aluminum nitrate nonahydrate, niobium oxide (e.g., $Nb_2O_5$), gallium oxide ($Ga_2O_3$), and tantalum oxide (e.g., $Ta_2O_5$). Other precursors to garnet materials may be suitable for use with the methods set forth herein.

As used herein the phrase "garnet-type electrolyte," refers to an electrolyte that includes a lithium-stuffed garnet material described herein as a $Li^+$ ion conductor. The advantages of Li-stuffed garnet solid-state electrolytes are many, including as a substitution for liquid, flammable electrolytes commonly used in lithium rechargeable batteries.

As used herein, the term "LIRAP" refers to a lithium rich antiperovskite and is used synonymously with "LOC" or "$Li_3OCl$". The composition of LIRAP is $aLi_2O+bLiX+cLiOH+dAl_2O_3$ where X=Cl, Br, and/or I, a/b=0.7-9, c/a=0.01-1, d/a=0.001-0.1.

As used herein, the term "LXPS" or "LPS+X" refers to a lithium conducting electrolyte comprising Li, P, S, and X, where X=Cl, Br, and/or I. For example, "LSPI" refers to a lithium conducting electrolyte comprising Li, P, S, and I. More generally, it is understood to include $aLi_2S+bP_2S_y+cLiX$ where X=Cl, Br, and/or I and where y=3-5 and where a/b=2.5-4.5 and where (a+b)/c=0.5-15.

As used herein, the term "LBHPS" refers to a lithium conducting electrolyte having, Li, B, H, P, and S, for example, $A(LiBH_4)(1-A)(P_2S_5)$ wherein 0.05≤A≤0.95.

As used herein, "LSS" refers to lithium silicon sulfide which can be described as $Li_2S$—$SiS_2$, Li—$SiS_2$, Li—S—Si, and/or a catholyte consisting essentially of Li, S, and Si. LSS refers to an electrolyte material characterized by the formula $Li_xSi_yS_z$ where 0.33≤x≤0.5, 0.1≤y≤0.2, 0.4≤z≤0.55, and it may include up to 10 atomic % oxygen. LSS also refers to an electrolyte material comprising Li, Si, and S. In some examples, LSS is a mixture of $Li_2S$ and $SiS_2$. In some examples, the molar ratio of $Li_2S:SiS_2$ is 90:10, 85:15, 80:20, 75:25, 70:30, 2:1, 65:35, 60:40, 55:45, or 50:50. LSS may be doped with compounds such as $Li_xPO_y$, $Li_xBO_y$, $Li_4SiO_4$, $Li_3MO_4$, $Li_3MO_3$, $PS_x$, and/or lithium halides such as, but not limited to, LiI, LiCl, LiF, or LiBr, wherein $0<x\leq 5$ and $0<y\leq 5$.

As used herein, the term "SLOPS" refers to unless otherwise specified, a 60:40 molar ratio of $Li_2S:SiS_2$ with 0.1-10 mol. % $Li_3PO_4$. In some examples, "SLOPS" includes $Li_{10}Si_4S_{13}$ (50:50 $Li_2S:SiS_2$) with 0.1-10 mol. % $Li_3PO_4Li$. In some examples, "SLOPS" includes $Li_{26}Si_7S_{27}$ (65:35 $Li_2S:SiS_2$) with 0.1-10 mol. % $Li_3PO_4MO$, wherein M is a metal. In some examples, "SLOPS" includes $Li_4SiS_4$ (67:33 $Li_2S:SiS_2$) with 0.1-5 mol. % $Li_3PO_4$, wherein $0<x\leq 5$ and $0<y\leq 5$. In some examples, "SLOPS" includes $Li_{14}Si_3S_{13}$ (70:30 $Li_2S:SiS_2$) with 0.1-5 mol. % $Li_3PO_4$. In some examples, "SLOPS" is characterized by the formula $(1-x)(60:40\ Li_2S:SiS_2)*(x)(Li_3PO_4)$, wherein x is from 0.01 to 0.99. As used herein, "LBS-PDX" refers to an electrolyte composition of $Li_2S:B_2S_3:Li_3PO_4:LiX$ where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used herein, the term "LSTPS" refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to a catholyte material characterized by the formula $Li_aMP_bS_cO_d$, where M is Si, Ge, Sn, and/or Al, and where $2\leq a\leq 8$, $0.5\leq b\leq 2.5$, $4\leq c\leq 12$, and $d<3$. LXPSO refers to LXPS, as defined above, and having oxygen doping at from 0.1 to about 10 atomic %. LPSO refers to LPS, as defined above, and having oxygen doping at from 0.1 to about 10 atomic %.$_{13}$ (50:50 $Li_2S:SiS_2$) with 0.1-10 mol. % $Li_3PO_4$. In some examples, "SLOPS" includes $Li_{26}Si_7S_{27}$ (65:35 $Li_2S:SiS_2$) with 0.1-10 mol. % $Li_3PO_4$. In some examples, "SLOPS" includes $Li_4SiS_4$ (67:33 $Li_2S:SiS_2$) with 0.1-5 mol. % $Li_3PO_4$. In some examples, "SLOPS" includes $Li_{14}Si_3S_{13}$ (70:30 $Li_2S:SiS_2$) with 0.1-5 mol. % $Li_3PO_4$. In some examples, "SLOPS" is characterized by the formula $(1-x)(60:40\ Li_2S:SiS_2)*(x)(Li_3PO_4)$, wherein x is from 0.01 to 0.99. As used herein, "LBS-PDX" refers to an electrolyte composition of $Li_2S:B_2S_3:Li_3PO_4:LiX$ where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used herein, the term "LPSCl" refers to an electrolyte material having Li, P, S, and Cl chemical constituents. As used herein, the term "LPSBr" refers to an electrolyte material having Li, P, S, and Br chemical constituents. As used herein, the term "LPSI" refers to an electrolyte material having Li, P, S, and I chemical constituents. LXPSO refers to LXPS, as defined above, and having oxygen doping at from 0.1 to about 10 atomic %. LPSO refers to LPS, as defined above, and having oxygen doping at from 0.1 to about 10 atomic %.

As used herein, the term "LAPS" refers to an electrolyte material having Li, As, P, and S, chemical constituents. " refers to an electrolyte material having Li, P, S, and Cl chemical constituents. As used herein, the term "LTPS" refers to an electrolyte material having Li, P, Sn, and S, chemical constituents. As used herein, the term "LSPS" refers to an electrolyte material having Li, P, Si, and S, chemical constituents. As used herein, the term "LGPS" refers to an electrolyte material having Li, P, Ge, and S, chemical constituents. As used herein, the term "LPS" refers to an electrolyte material having Li, P, and S, chemical constituents. As used herein, the term "LSTPSCl" refers to an electrolyte material having Li, Si, P, Sn, S, and Cl chemical constituents. As used herein, the term "LSPSCl" refers to an electrolyte material having Li, Si, P, S, and Cl chemical constituents. As used herein, the term "LSPSBr" refers to an electrolyte material having Li, Si, P, S, and Br chemical constituents. As used herein, "LTS" refers to a lithium tin sulfide compound which can be described as $Li_2S:SnS_2:As_2S_5$, $Li_2S$—$SnS_2$, $Li_2S$—$SnS$, $Li$—$S$—$Sn$, and/or a catholyte consisting essentially of Li, S, and Sn. The composition may be $Li_xSn_yS_z$ where $0.25\leq x\leq 0.65$, $0.05\leq y\leq 0.2$, and $0.25\leq z\leq 0.65$. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In and/or lithium halides such as, but not limited to, LiI, LiCl, LiF, or LiBr.

As used herein, the term "LATS" refers to an LTS further including Arsenic (As):$As_2S_5$, $Li_2S$—$SnS_2$, $Li_2S$—$SnS$, Li—S—Sn, and/or a catholyte consisting essentially of Li, S, and Sn. The composition may be $Li_xSn_yS_z$ where $0.25\geq x\geq 0.65$, $0.05\leq y\leq 0.2$, and $0.25\leq z\leq 0.65$. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In and/or lithium halides such as, but not limited to, LiI, LiCl, LiF, or LiBr.

As used herein, the term "LBHI" or "LiBHI" refers to a lithium conducting electrolyte having Li, B, H, and I. More generally, it is understood to include $aLiBH_4+bLiX$ where X=Cl, Br, and/or I and where a:b=7:1, 6:1, 5:1, 4:1, 3:1, 2:1, or within the range a/b=2-4. LBHI may further include nitrogen in the form of $aLiBH_4+bLiX+cLiNH_2$ where $(a+c)/b=2-4$ and c/a=0-10.

As used herein, the term "LBHXN" refers to a composition characterized as $A\cdot(LiBH_4)\cdot B\cdot(LiX)\cdot C\cdot(LiNH_2)$ wherein X is fluorine (F), bromine (Br), chloride (Cl), iodine (I), or a combination thereof, and wherein $3\leq A\leq 6$, $2\leq B\leq 5$, and $0\leq C\leq 9$. As used herein, the term "LBHFN" refers to a composition characterized as $A\cdot(LiBH_4)\cdot B\cdot(LiF)\cdot C\cdot(LiNH_2)$ and wherein $3\leq A\leq 6$, $2\leq B\leq 5$, and $0\leq C\leq 9$. As used herein, the term "LBHBrN" refers to a composition characterized as $A\cdot(LiBH_4)\cdot B\cdot(LiBr)\cdot C\cdot(LiNH_2)$ and wherein $3\leq A\leq 6$, $2\leq B\leq 5$, and $0\leq C\leq 9$. As used herein, the term "LBHClN" refers to a composition characterized as $A\cdot(LiBH_4)\cdot B\cdot(LiCl)\cdot C\cdot(LiNH_2)$ and wherein $3\leq A\leq 6$, $2\leq B\leq 5$, and $0\leq C\leq 9$. As used herein, the term "LBHIN" refers to a composition characterized as $A\cdot(LiBH_4)\cdot B\cdot(LiI)\cdot C\cdot(LiNH_2)$ and wherein $3\leq A\leq 6$, $2\leq B\leq 5$, and $0\leq C\leq 9$.

As used herein, "SLOBS" includes, unless otherwise specified, a 60:40 molar ratio of $Li_2S:SiS_2$ with 0.1-10 mol. % $LiBH_4$. In some examples, "SLOBS" includes $Li_{10}Si_4S_{13}$ (50:50 $Li_2S:SiS_2$) with 0.1-10 mol. % $LiBH_4$. In some examples, "SLOBS" includes $Li_{26}Si_7S_{27}$ (65:35 $Li_2S:SiS_2$) with 0.1-10 mol. % $LiBH_4$. In some examples, "SLOBS" includes $Li_4SiS_4$ (67:33 $Li_2S:SiS_2$) with 0.1-5 mol. % $LiBH_4$. In some examples, "SLOBS" includes $Li_{14}Si_3S_{13}$ (70:30 $Li_2S:SiS_2$) with 0.1-5 mol. % $LiBH_4$. In some examples, "SLOBS" is characterized by the formula $(1-x)(60:40\ Li_2S:SiS_2)*(x)(Li_3BO_4)$, wherein x is from 0.01 to 0.99. As used herein, "LBS-BOX" refers to an electrolyte composition of $Li_2S:B_2S_3:LiBH_4:LiX$ where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used herein, the phrase "made of the same type of material," refers to two or more different physical forms of a material but which includes same composition. For example, lithium-stuffed garnet powder and a lithium-stuffed garnet thin film are made of the same type of material. For example, LSTPS powder and an LSTPS thin film are made of the same type of material.

As used herein the term "making," refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode As used here, the phrase "positive electrode," refers to the electrode in a secondary battery towards which positive ions, e.g., $Li^+$, conduct, flow, or move during discharge of the battery. As used herein, the phrase "negative electrode" refers to the electrode in a secondary battery from where positive ions, e.g., $Li^+$, flow, or move during discharge of the battery. In a battery comprised of a Li-metal electrode and a conversion chemistry, intercalation chemistry, or combination conversion/intercalation chemistry-including electrode (i.e., cathode active material; e.g., $NiF_x$, NCA, $LiNi_xMn_yCo_zO_2$ [NMC] or $LiNi_xAl_yCo_zO_2$[NCA], wherein x+y+z=1), the electrode having the conversion chemistry, intercalation chemistry, or combination conversion/intercalation chemistry material is referred to as the positive electrode. In some common usages, cathode is used in place of positive electrode, and anode is used in place of negative electrode. When a Li-secondary battery is charged, Li ions move from the positive electrode (e.g., $NiF_x$, NMC, NCA) towards the negative electrode (e.g., Li-metal). When a Li-secondary battery is discharged, Li ions move towards the positive electrode and from the negative electrode.

As used herein, the phrase "organic component (at 10%)" refers to the weight percent amount of an organic species in a host. For example, if the buffer layer includes LSTPS and a polymer but wherein the organic component (at 10%), this means that the total amount of polymer in the combination of LSTPS and polymer is 10 weight %, with the remaining 90% being non-organic, e.g., LSTPS.

As used herein, the phrase "porosity as determined by SEM" refers to measurement of density by using image analysis software to analyze a scanning electron micrograph. For example, first, a user or software assigns pixels and/or regions of an image as porosity. Second, the area fraction of those regions is summed. Finally, the porosity fraction determined by SEM is equal to the area fraction of the porous region of the image.

As used herein, the phrase "providing" refers to the provision of, generation or, presentation of, or delivery of that which is provided.

As used herein, the terms "separator," and "$Li^+$ ion-conducting separator," are used interchangeably with separator being a short-hand reference for $Li^+$ ion-conducting separator, unless specified otherwise explicitly. A separator refers to a solid electrolyte which conducts $Li^+$ ions, is substantially insulating to electrons, and which is suitable for use as a physical barrier or spacer between the positive and negative electrodes in an electrochemical cell or a rechargeable battery. A separator, as used herein, is substantially insulating when the separator's lithium ion conductivity is at least $10^3$, and typically $10^6$ times, greater than the separator's electron conductivity. A separator can be a film, monolith, or pellet. Unless explicitly specified to the contrary, a separator as used herein is stable when in contact with lithium metal.

As used herein, a "sintered lithium-stuffed garnet thin film" refers to a green film comprising a lithium-stuffed garnet which is sintered and densified to form a thin film.

As used herein, the phrase "solid-state cathode" or "solid-state positive electrode" refers to a type of "positive electrode" defined herein. In certain examples, all components in this solid-state cathode film are in solid form. The solid-state cathode includes active cathode materials as defined herein, solid-state catholyte as defined herein, optionally a conductive additive, and optionally binders. The solid-state cathode are in some examples densified films.

As used here, the phrase "solid-state electrolyte," is used interchangeably with the phrase "solid separator" refers to a material which does not include carbon and which conducts atomic ions (e.g., $Li^+$) but does not conduct electrons. An inorganic solid-state electrolyte is a solid material suitable for electrically isolating the positive and negative electrodes of a lithium secondary battery while also providing a conduction pathway for lithium ions. Example inorganic solid-state electrolytes include oxide electrolytes and sulfide electrolytes, which are further defined below. Non-limiting example sulfide electrolytes are found, for example, in U.S. Pat. No. 9,172,114, which issued Oct. 27, 2015, and also in US Patent Application Publication No. 2017-0162901 A1, which published Jun. 8, 2017, and was filed as U.S. patent application Ser. No. 15/367,103 on Dec. 1, 2016, the entire contents of which are herein incorporated by reference in its entirety for all purposes. Non-limiting example oxide electrolytes are found, for example, in US Patent Application Publication No. 2015-0200420 A1, which published Jul. 16, 2015, the entire contents of which are herein incorporated by reference in its entirety for all purposes. In some examples, the inorganic solid-state electrolyte also includes a polymer.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35 Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12}.0.35Al_2O_3$), unless specified otherwise.

As used herein, the phrase "slot casting," or "slot die coating" refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 μm.

As used herein, the term "oxide" refers to a chemical compound that includes at least one oxygen atom and one other element in the chemical formula for the chemical compound. For example, an "oxide" is interchangeable with "oxide electrolytes." Non-limiting examples of oxide electrolytes are found, for example, in US Patent Application Publication No. 2015/0200420, published Jul. 16, 2015, the entire contents of which are incorporated herein by reference in their entirety.

As used herein, the term "sulfide" refers to refers to a chemical compound that includes at least one sulfur atom and one other element in the chemical formula for the chemical compound. For example, a "sulfide" is interchangeable with "sulfide electrolytes." Non-limiting examples of sulfide electrolytes are found, for example, in U.S. Pat. No. 9,172,114, issued Oct. 27, 2015, and also in US Patent Application Publication No. 2017-0162901 A1, which published Jun. 8, 2017, and was filed as U.S. patent application Ser. No. 15/367,103 on Dec. 1, 2016, the entire contents of which are herein incorporated by reference in its entirety for all purposes. As used herein, a sulfide catholyte is a catholyte that comprises or consists essentially of a sulfide.

As used here, the phrase "sulfide electrolyte," or "lithium sulfide" includes, but is not limited to, electrolytes referred to herein as LSS, LTS, LXPS, or LXPSO, where X is Si, Ge, Sn, As, Al, or Li—Sn—Si—P—S, or Li—As—Sn—S. In these acronyms (LSS, LTS, LXPS, or LXPSO), S refers to the element S, Si, or combinations thereof, and T refers to the element Sn. "Sulfide electrolyte" may also include $Li_aP_bS_cX_d$, $Li_aB_bS_cX_d$, $Li_aSn_bS_cX_d$ or $Li_aSi_bS_cX_d$ where X=F, Cl, Br, I, and 10%≤a≤50%, 10%≤b≤44%, 24%≤c≤70%, 0≤d≤18%; % are atomic %. Up to 10 at % oxygen may be present in the sulfide electrolytes, either by design or as a contaminant species.

As used herein, the term "sulfide-halide" refers to a chemical compound that includes at least one sulfur atom, at least one halogen atom, and one other element in the chemical formula for the chemical compound.

As used herein, voltage is set forth with respect to lithium (i.e., V vs. Li) metal unless stated otherwise.

Electrochemical Cells

One example electrochemical cell is schematically illustrated in FIG. 1. In FIG. 1, layer 101 represents an evaporated lithium metal anode. Layer 102 represents a lithium-stuffed garnet layer. Layer 103 represents a bonding layer. Layer 104 represents a buffer layer. Layer 105 represents a positive electrode layer. In some examples, layer 102 is approximately 100 μm thick. In some examples, layer 101 is approximately 15, 16, 17, 18, 19, 20, 21, 22, 23, 24, 25, 26, 27, 28, 29, 30, 31, 32, 33, 34, 35, 36, 37, 38, 39, or 40 μm thick. In some examples, layer 102 is approximately 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, or 125 μm thick. In some examples, layer 103 is approximately 1, 2, 3, 4, 5, 6, 7, 8, 9, 10, 11, 12, 13, 14, or 15 μm thick. In some examples, layer 104 is approximately 1, 2, 3, 4, 5, 6, 7, 8, 9, 10, 11, 12, 13, 14, or 15 μm thick. In some examples, layer 105 is approximately 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, or 170 μm thick.

In some examples, set forth herein is a solid-state electrochemical cell (SSEC), which includes (a) a positive electrode layer comprising an active material and a sulfide catholyte; (b) a single ion conducting, solid-state buffer; (c) a borohydride bonding layer; and (d) a lithium-stuffed garnet layer. The buffer is mixed within the positive electrode layer, or the buffer is present as a layer in contact with the positive electrode layer, or, in some examples, the buffer is both mixed within the positive electrode layer and the buffer is present as a layer in contact with the positive electrode layer. The borohydride bonding layer is between and in contact with the lithium-stuffed garnet layer and either (i) the positive electrode layer with a buffer mixed therein or (ii) a buffer layer in contact with the positive electrode. In some examples, the borohydride bonding layer is between and in contact with the lithium-stuffed garnet layer and the positive electrode layer with a buffer mixed therein. In some examples, the buffer is mixed within the positive electrode layer. In some examples, the buffer is present as a layer in contact with the positive electrode layer. In some examples, both the buffer is mixed within the positive electrode layer and the buffer is present as a layer in contact with the positive electrode layer. In some examples, the borohydride bonding layer is between and in contact with the lithium-stuffed garnet layer and buffer layer in contact with the positive electrode.

In some examples, including any of the foregoing, the active material includes a coating. In some examples, the active material includes a coating of a material selected from LLZO.

In these examples, the Li ion conducts through inorganic single ion conductor, not through polymer or organic component (at 10%).

In some examples, set forth herein is a solid-state electrochemical cell (SSEC), including: (a) a positive electrode layer comprising an active material and a sulfide catholyte; (b) a single ion conducting, solid-state buffer; (c) a borohydride bonding layer; and (d) a lithium-stuffed garnet layer; wherein the buffer is mixed within the positive electrode layer, or is a layer in contact with the positive electrode layer, or both; wherein the borohydride bonding layer is between and in contact with the lithium-stuffed garnet layer and either (i) the positive electrode layer with a buffer mixed therein or (ii) a buffer layer in contact with the positive electrode.

In some examples, including any of the foregoing, the single ion conducting, solid-state buffer is mixed within the positive electrode layer. In some embodiments, the buffer is mixed within the positive electrode layer in such a way such that a gradient of active material and buffer material is achieved.

In some examples, including any of the foregoing, the single ion conducting, solid-state buffer is a layer in contact with the positive electrode layer.

In some examples, including any of the foregoing, the single ion conducting, solid-state buffer is mixed within the positive electrode layer and is present as a layer in contact with the positive electrode layer.

In some examples, including any of the foregoing, the single ion conducting, solid-state buffer layer prevents the borohydride bonding layer from contacting the positive electrode layer. In some examples, the borohydride bonding layer adheres the lithium-stuffed garnet layer to the buffer layer. In some examples, the borohydride bonding layer adheres the lithium-stuffed garnet layer to the component of the positive electrode layer which is a buffer.

In some examples, including any of the foregoing, the negative electrode layer is between and in contact with the lithium-stuffed garnet layer and the negative electrode current collector layer. In some examples, including any of the foregoing, the buffer layer potential is shielded from the Li metal negative electrode potential. In some examples, including any of the foregoing, the borohydride bonding layer potential is shielded from the positive electrode potential. In some examples, including any of the foregoing, the SSEC has an ASR of 50 Ωcm² or less.

In some examples, set forth herein is a solid-state electrochemical cell (SSEC), including (a) a positive electrode layer, which includes an active material and a sulfide catholyte; (b) a buffer, which includes a single ion conducting, solid-state electrolyte, and in which the buffer is mixed within or is in direct contact with the positive electrode layer; (c) a bonding layer including a borohydride; and (d) a layer including a lithium-stuffed garnet. In this embodiment, the borohydride bonding layer is between and in contact with the layer including a lithium-stuffed garnet and either the positive electrode layer or the buffer in direct contact with the positive electrode.

In some examples, including any of the foregoing, a solid-state electrochemical stack further includes (d) a negative electrode current collector in direct contact with the separator layer. In another instance, any solid-state electrochemical stack described above further includes (e) a positive electrode current collector in direct contact with the positive electrode layer. In a further instance, any solid-state electrochemical stack described above further includes (d) a negative electrode current collector and (e) a negative electrode, wherein the (e) negative electrode is between and in direct contact with the separator layer and the negative electrode current collector.

In certain embodiments, provided herein is a composite having a lithium-stuffed garnet and an LBHI, where the LBHI fills at least 90% of the through-pores and/or surface pores of the lithium-stuffed garnet, and where the LBHI may be a composition having $A \cdot (LiBH_4) \cdot B \cdot (LiX) \cdot C \cdot (LiNH_2)$ wherein X is a halide wherein $3 \leq A \leq 6$, $2 \leq B \leq 5$, and $0 \leq C \leq 9$.

In some examples, herein, the borohydride bonding layer is a LBHI (Lithium borohydride with lithium iodide). The buffer layer is LSTPS. The buffer layer blocks, i.e., shields, the high voltage positive electrode.

Buffer Composition

The sulfide in the buffer layer in some examples may be any sulfide set forth in US Patent Application Publication No. 2017-0005367 A1, entitled COMPOSITE ELECTROLYTES, which published Jan. 5, 2017, the entire contents of which are herein incorporated by reference in their entirety for all purposes.

The sulfide in the buffer layer in some examples may be any sulfide set forth in WO2017096088A1, which published Jun. 8, 2017, and was filed as International PCT Patent Application NO. PCT/US2016/064492, filed Dec. 1, 2016, and entitled LITHIUM, PHOSPHORUS, SULFUR, AND IODINE CONTAINING ELECTROLYTE AND CATHOLYTE COMPOSITIONS, ELECTROLYTE MEMBRANES FOR ELECTROCHEMICAL DEVICES, AND ANNEALING METHODS OF MAKING THESE ELECTROLYTES AND CATHOLYTES, and which published as WO 2017/096088 on Jun. 8, 2017, the entire contents of which are herein incorporated by reference in their entirety for all purposes.

In some examples, including any of the foregoing, the buffer layer, the sulfide catholyte or the single ion conducting, the solid-state buffer, or all, can be characterized by one of the following formula: $Li_aSi_bSn_cP_dS_eO_f$, wherein $2 \leq a \leq 8$, $0 \leq b \leq 1$, $0 \leq c \leq 1$, $b+c=1$, $0.5 \leq d \leq 2.5$, $4 \leq e \leq 12$, and $0 \leq f \leq 10$; $Li_aSi_bP_cS_dX_e$, wherein $8 < a < 12$, $1 < b < 3$, $1 < c < 3$, $8 < d < 14$, and $0 < e < 1$, wherein X is F, Cl, Br, or I; $Li_gAs_hSn_jS_kO_l$, wherein $2 \leq g \leq 6$, $0 \leq h \leq 1$, $0 \leq j \leq 1$, $2 \leq k \leq 6$, and $0 \leq l \leq 10$; $Li_mP_nS_pI_q$, wherein $2 \leq m \leq 6$, $0 \leq n \leq 1$, $0 \leq p \leq 1$, $2 \leq q \leq 6$; a mixture of $(Li_2S):(P_2S_5)$ having a molar ratio of $Li_2S:P_2S_5$ from about 10:1 to about 6:4 and LiI, wherein the ratio of $[(Li_2S):(P_2S_5)]:LiI$ is from 95:5 to 50:50; LPS+X, wherein X is selected from Cl, I, or Br; $vLi_2S+wP_2S_5+yLiX$; or $vLi_2S+wSiS_2+yLiX$. In some examples, including any of the foregoing, the sulfide catholyte comprises $LSTPS \cdot _2S+wB_2S_3+yLiX$.

In some examples, the buffer comprises $Li_aSi_bSn_cP_dS_e$, wherein $2 \leq a \leq 8$, $0 \leq b \leq 1$, $0 \leq c \leq 1$, $0.5 \leq d \leq 2.5$, and $4 \leq e \leq 12$. In some examples, the buffer comprises $Li_aSi_bSn_cP_dS_e$, wherein $2 \leq a \leq 8$, $0 \leq b \leq 1$, $0 \leq c \leq 1$, $b+c=1$, $0.5 \leq d \leq 2.5$, and $4 \leq e \leq 12$. In some examples, the buffer comprises $Li_aSi_bSn_cP_dS_e$, wherein $3 \leq a \leq 7$, $0 \leq b \leq 1$, $0 \leq c \leq 1$, $b+c=1$, $0.5 \leq d \leq 1.5$, and $8 \leq e \leq 12$. In some examples, the buffer comprises $Li_aSi_bSn_cP_dS_e$, wherein $3 \leq a \leq 5$, $0 \leq b \leq 1$, $0 \leq c \leq 1$, $b+c=1$, $0.5 \leq d \leq 1$, and $5 \leq e \leq 9$. In some examples, the buffer comprises $Li_aSi_bSn_cP_dS_e$, wherein $3 \leq a \leq 5$, $0 \leq b \leq 1$, $0 \leq c \leq 1$, $b+c=1$, $0.5 \leq d \leq 1$, and $5 \leq e \leq 9$. In some examples, the buffer comprises $Li_aSi_bSn_cP_dS_e$, wherein $2 \leq a \leq 8$, $0 \leq b \leq 1$, $0 \leq c \leq 1$, $b+c=1$, $0.5 \leq d \leq 2.5$, and $4 \leq e \leq 12$. In some examples, the buffer comprises $Li_aSi_bSn_cP_dS_e$, wherein $3 \leq a \leq 5$, $0 \leq b \leq 0.5$, $0 \leq c \leq 0.5$, $0 \leq d \leq 2$, and $2 \leq e \leq 10$. In some examples, the buffer comprises $Li_aSi_bSn_cP_dS_e$, wherein $3 \leq a \leq 5$, $0 \leq b \leq 0.25$, $0 \leq c \leq 1$, $0 \leq d \leq 1$, and $2 \leq e \leq 14$. In some examples, the buffer comprises $Li_aSi_bSn_cP_dS_e$, wherein $3 \leq a \leq 5$, $0 \leq b \leq 0.25$, $0 \leq c \leq 1$, $0 \leq d \leq 1$, and $2 \leq e \leq 8$.

In some examples, including any of the foregoing, the single ion conducting, solid-state buffer comprises LSTPS.

The buffer layer does not conduct electrons and thereby shields the positive electrode potential from the potential experienced by the borohydride bonding layer.

The buffer layer does not conduct electrons and thereby shields the positive electrode potential from the potential experienced by the negative electrode.

In some examples, the buffer layer is easy to deform.

In some examples, the buffer layer is chemically stable when in contact with the sulfide catholyte disclosed herein and/or the and coated active materials, disclosed herein.

In some examples, the buffer layer comprises LSTPS.

In some examples, the buffer layer comprises particles with $D_{50}$ of about 10 nm to 1000 nm, about 100 nm to 500 nm, or about 150 nm to 300 nm. In some examples, the buffer layer comprises particles with $D_{50}$ of about 100 nm, about 200 nm, or about 300 nm. In some examples, the buffer layer comprises particles with $D_{90}$ of about 500 nm to 2000 nm, 750 nm to 1000 nm, or about 1000 nm. In some examples, the buffer layer comprises particles with $D_{90}$ of about 800 nm, 900 nm, 1000 nm, or 1100 nm. In some examples, the buffer layer comprises particles with $D_{90}$ of at least about 750 nm. In some examples, the buffer layer comprises particles with $D_{90}$ of at least about 900 nm.

In some examples, the buffer layer is made of particles 1/10 of the thickness the buffer layer. For example, if the buffer layer is 5 μm thick, then it, in some examples, includes buffer particles that are 0.5 μm. In some examples, if the buffer layer is 5 μm thick, then the buffer layer includes LSTPS particles that have a $d_{50}$ particle size diameter of 0.5 μm.

In some examples, the buffer layer has negligible interfacial resistance to the positive electrode.

In some examples, the buffer layer is non-polymeric, which means it includes less than 5 wt. % polymer.

In some examples, the buffer layer is adhered to the positive electrode through a lamination and densification process. This results in a buffered positive electrode which blocks electron access and shields the other electrolyte layer from the positive electrode potential.

In some examples, the buffer layer is adhered to the positive electrode through a lamination and densification process. This results in a buffered positive electrode which blocks electron access and shields the other electrolyte layer from the positive electrode potential.

In some examples, the buffer layer has a porosity less than about 20% v/v, 15% v/v, 12.5% v/v, 10% v/v, 5% v/v, 1% v/v, or less. In some examples, the buffer layer has a porosity of about 5% v/v to 20% v/v, or about 10% v/v to 15% v/v.

Bonding Layer Composition

In certain embodiments, a bonding layer may include a composition having A·(LiBH$_4$)·B·(LiX)·C·(LiNH$_2$) wherein X may be fluorine, bromine, chloride, iodine, or a combination thereof, and wherein 3≤A≤6, 2≤B≤5, and 0≤C≤9. In some examples, a bonding layer comprises A·(LiBH$_4$)·B·(LiX)·C·(LiNH$_2$), wherein 3≤A≤6, 2≤B≤5, and 3≤C≤6. In some examples, a bonding layer comprises A·(LiBH$_4$)·B·(LiX)·C·(LiNH$_2$), wherein 3≤A≤5, 2≤B≤5, and 3≤C≤5. In some examples, a bonding layer comprises A·(LiBH$_4$)·B·(LiX)·C·(LiNH$_2$), wherein 3≤A≤4, 2≤B≤4, and 3≤C≤4. In some examples, a bonding layer comprises A·(LiBH$_4$)·B·(LiX)·C·(LiNH$_2$), wherein 4≤A≤5, 2≤B≤4, and 4≤C≤5. In some examples, a bonding layer comprises A·(LiBH$_4$)·B·(LiX)·C·(LiNH$_2$), wherein 4≤A≤5, 3≤B≤4, and 4≤C≤5.

In certain embodiments, a bonding layer may include a composition having A·(LiBH$_4$)·B·(LiX)·C·(LiNH$_2$) wherein X may be fluorine, bromine, chloride, iodine, or a combination thereof, and wherein 0.1≤A≤3, 0.1≤B≤4.5, and 0≤C≤9.

In one embodiment, X may be bromine, chlorine, iodine, or a combination thereof. In another embodiment, X may be iodine. In some embodiments, A is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. In some embodiments, B is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5. In some embodiments, C is 0.0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9. 8.0, 8.1, 8.2, 8.3, 8.4, 8.5, 8.6, 8.7, 8.8, 8.9, or 9.0.

In some examples, the bonding layer comprises a borohydride composition comprising A·(LiBH$_4$)·B·(LiX)·C·(LiNH$_2$), wherein 2.5<A<4.5, 2.5<B<5.5, and 4<C<9. In some examples, including any of the foregoing, the borohydride bonding layer comprises a borohydride composition including A·(LiBH$_4$)·B·(LiX)·C·(LiNH$_2$). In some examples, 2.5<A<3.5, 3.5<B<4.5, and 5<C<9.

In some examples, including any of the foregoing, the borohydride bonding layer comprises a borohydride composition, wherein the composition is 3LiBH$_4$·2LiCl·3LiNH$_2$ or 3LiBH$_4$·4LiCl·9LiNH$_2$. In one embodiment, the composition may be 3LiBH$_4$·2LiI·3LiNH$_2$. In another embodiment, the composition may be 3LiBH$_4$·4LiI·9LiNH$_2$. In another embodiment, the composition may be 3LiBH$_4$·2LiCl·3LiNH$_2$. In another embodiment, the composition may be 3LiBH$_4$·4LiCl·9LiNH$_2$. In another embodiment, the composition may be 3LiBH$_4$·2LiBr·3LiNH$_2$. In another embodiment, the composition may be 3LiBH$_4$·4LiBr·9LiNH$_2$.

In some examples, including any of the foregoing, the borohydride bonding layer comprises a borohydride composition, wherein the composition is 3LiBH$_4$·2LiCl·3LiNH$_2$ or 3LiBH$_4$·4LiCl·5LiNH$_2$. In one embodiment, the composition may be 4LiBH$_4$·2LiI·4LiNH$_2$. In another embodiment, the composition may be 4LiBH$_4$·3LiI·4LiNH$_2$. In another embodiment, the composition may be 4LiBH$_4$·5LiCl·4LiNH$_2$. In another embodiment, the composition may be 4LiBH$_4$·6LiCl·4LiNH$_2$. In some examples, including any of the foregoing, the borohydride bonding layer comprises a borohydride composition, wherein the composition is 3LiBH$_4$·3LiCl·4LiNH$_2$ or 3LiBH$_4$·3LiCl·5LiNH$_2$. In one embodiment, the composition may be 3LiBH$_4$·3LiI·6LiNH$_2$. In another embodiment, the composition may be 3LiBH$_4$·3LiI·7LiNH$_2$.

In some examples, including any of the foregoing, the borohydride bonding layer comprises a borohydride composition selected from LBHIN and LBHN. In some examples, including any of the foregoing, the borohydride bonding layer comprises KBH$_4$ and LiNH$_2$.

In some embodiments, the composition may exist in different physical states. For example, in one embodiment, the composition may be amorphous. By way of further example, in one embodiment, the composition may be semi-crystalline. The composition can be made amorphous or semi-crystalline by controlling the sintering profile, e.g., by adjusting the cooling rate after sintering.

In certain embodiments, the LBHI composition may exist as a film, a single entity, or a pellet. For example, in one embodiment, the composition is a thin film. By way of further example, in one embodiment, the composition is a monolith. By way of further example, in one embodiment, the composition is a pressed pellet.

In some embodiments, the LBHI composition may further include an oxide, a sulfide, a sulfide-halide, or an electrolyte. For example, in one embodiment, the oxide may be selected from a lithium-stuffed garnet characterized by the formula Li$_x$La$_y$Zr$_z$O$_t$·qAl$_2$O$_3$, wherein 4<x<10, 1<y<4, 1<z<3, 6<t<14, 0≤q≤1. By way of further example, in one embodiment, the composition includes an oxide with a coating of LBHI, where the oxide may be selected from a lithium-stuffed garnet characterized by the formula Li$_x$La$_y$Zr$_z$O$_t$·qAl$_2$O$_3$, wherein 4<x<10, 1<y<4, 1<z<3, 6<t<14, 0≤q≤1. By way of further example, in one embodiment, the oxide may be selected from a lithium-stuffed garnet characterized by the formula Li$_a$La$_b$Zr$_c$Al$_d$Me''$_e$O$_f$, wherein 5<a<8.5; 2<b<4; 0<c≤2.5; 0≤d<2; 0≤e<2, and 10<f<13 and Me'' is a metal selected from Nb, Ga, Ta, or combinations thereof. By way of further example, in one embodiment, the composition includes an oxide with a coating of LBHI, where the oxide may be selected from a lithium-stuffed garnet characterized by the formula Li$_a$La$_b$Zr$_c$Al$_d$Me''$_e$O$_f$, wherein 5<a<8.5; 2<b<4; 0<c≤2.5; 0≤d<2; 0≤e<2, and 10<f<13 and Me'' is a metal selected from Nb, Ga, Ta, or combinations thereof. By way of further example, in one Li$_a$La$_b$Zr$_c$Al$_d$Me''$_e$O$_f$ embodiment as above, Me'' is Nb. By way of further example, in one Li$_a$La$_b$Zr$_c$Al$_d$Me''$_e$O$_f$ embodiment as above, Me'' is Ga. By way of further example, in one Li$_a$La$_b$Zr$_c$Al$_d$Me''$_e$O$_f$ embodiment as above, Me'' is Ta. By way of further example, in one Li$_a$La$_b$Zr$_c$Al$_d$Me''$_e$O$_f$ embodiment as above, Me'' is Nb and Ga. By way of further example, in one Li$_a$La$_b$Zr$_c$Al$_d$Me''$_e$O$_f$ embodiment as above, Me'' is Nb and Ta. By way of further example, in one Li$_a$La$_b$Zr$_c$Al$_d$Me''$_e$O$_f$ embodiment as above, Me'' is Ga and Ta.

The borohydride bonding layer is in some examples made of a borohydride compound. The borohydride compound may be any compound set forth in WO 2018/075972, which published Apr. 26, 2018, and was filed as International PCT Patent Application No. PCT/US2017/057735, and is entitled ELECTROLYTE SEPARATORS INCLUDING LITHIUM BOROHYDRIDE AND COMPOSITE ELECTROLYTE SEPARATORS OF LITHIUM-STUFFED GARNET AND LITHIUM BOROHYDRIDE. The borohydride may be any compound set forth in WO 2019/078897, which published Apr. 25, 2019, and was filed as International PCT Patent Application No. PCT/US2017/057739, filed Oct. 20, 2017, and is entitled BOROHYDRIDE-SULFIDE INTERFACIAL LAYER IN ALL SOLID STATE BATTERY.

In some examples, including any of the foregoing, the lithium salt is chosen from LiTFSI, LiFSI, LiPF$_6$, LiClO$_4$, LiAsF$_6$, LiBOB, LiBETI, LiBF$_4$, and LiI and combinations thereof. In certain examples, the lithium salt is selected from LiPF$_6$, Lithium bis(oxalato)borate (LiBOB), Lithium bis (perfluoroethanesulfonyl)imide (LIBETI), LiTFSi, LiBF$_4$, LiClO$_4$, LiAsF$_6$, LiFSI, or LiI. In certain examples, the lithium salt is LiPF$_6$. In certain examples, the lithium salt is LiBOB In certain examples, the lithium salt is LiTFSi. In certain examples, the lithium salt is LiBF$_4$. In certain examples, the lithium salt is LiClO$_4$. In certain examples, the lithium salt is LiAsF$_6$. In certain examples, the lithium salt is LiI. In certain examples, the lithium salt is LiBF$_4$In certain examples, several lithium salts may be present simultaneously in different concentrations. In some examples, the concentration is about 0.5, about 0.6, about 0.7, about 0.8, about 0.9, about 1.0, about 1.1, about 1.2, about 1.3, about 1.4, about 1.5, about 1.6, about 1.7, about 1.8, about 1.9 or about 2.0M. In certain examples, the bonding layer may contain two salts selected from LiPF$_6$, LiBOB, LiTFSi, LiBF$_4$, LiClO$_4$, LiAsF$_6$, LiFSI, or LiI. In certain examples, the bonding layer may contain three salts selected from LiPF$_6$, LiBOB, LiTFSi, LiBF$_4$, LiClO$_4$, LiAsF$_6$, LiFSI, or LiI. In certain examples, the lithium salt is a lithium salt is selected from LiPF$_6$, LiBOB, and LFTSi. In certain examples, the lithium salt is LiPF$_6$ at a concentration of 0.5 M to 2M. In some examples, the concentration is 0.5, 0.6, 0.7, 0.8, 0.9, 1.0, 1.1, 1.2, 1.3, 1.4, 1.5, 1.6, 1.7, 1.8, 1.9 or 2.0M. In certain examples, the lithium salt is LiTFSI at a concentration of 0.5 M to 2M. In some examples, the concentration is 0.5, 0.6, 0.7, 0.8, 0.9, 1.0, 1.1, 1.2, 1.3, 1.4, 1.5, 1.6, 1.7, 1.8, 1.9 or 2.0M.

In certain examples, the lithium salt is present at a concentration from 0.01 M to 10 M. In some examples, the concentration is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.3, 3.2, 3.3, 3.4, 3.5, 3.6, 3.7, 3.8, 3.9, 2.0, 0.3, 0.2, 0.3, 0.4, 0.5, 0.6, 0.7, 0.8, 0.9, 3.0, 3.1, 3.2, 3.3, 3.4, 3.5, 3.6, 3.7, 3.8, 3.9, 4.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.8, 8.4, 8.5, 8.6, 8.7, 8.8, 8.9, 9.9, 9.1, 9.2, 9.3, 9.4, 9.5, 9.6, 9.7, 9.8, 9.9, 10.0 M.

Other Compositions

In some examples, including any of the foregoing, the buffer layer comprises a binder at 0.01 to 10% by weight. Binders may include, in some examples, polyolefins. Binders may include ethylene alpha-olefin copolymer, ethylene-octene copolymer, polyolefin plastomers, polyolefin elastomers, styrene-butadiene rubber, polyvinylidene fluoride, poly(vinylidene fluoride-co-hexafluoropropylene), and the like.

In some examples, including any of the foregoing, the buffer layer comprises an organic polymer at 10% by volume or less.

In some examples, including any of the foregoing, the polymer is selected from the group consisting of polyacrylonitrile (PAN), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxy)ethyl glycidyl ether (PEO-MEEGE), polyethylene oxide 2-methoxyethoxy)ethyl glycidyl poly (allyl glycidyl ether) (PEO-MEEGE-AGE), polysiloxane, polyvinylidene fluoride (PVDF), polyvinylidene fluoride hexafluoropropylene (PVDF-HFP), ethylene propylene (EPR), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), polyvinylidene fluoride (PVDF), and polyethylene.

In some examples, including any of the foregoing, the buffer layer or buffer component does not include an organic polymer.

In some examples, including any of the foregoing, the positive electrode potential is shielded from the lithium-stuffed garnet layer potential.

In some examples, including any of the foregoing, the active material potential in the positive electrode is shielded from the lithium-stuffed garnet layer potential.

In some examples, the cathode comprises active material, wherein the active material is selected from LiNi$_x$Mn$_y$Co$_z$O$_2$ (NMC) and LiNi$_x$Al$_y$Co$_z$O$_2$ (NCA), wherein x+y+z=1).

In some examples, including any of the foregoing, the active material is coated.

In some examples, including any of the foregoing, the active material is coated or partially coated with a coating selected from the group consisting of lithium niobium oxide, lithium zirconium oxide, lithium aluminum oxide, lithium phosphate, lithium tantalum oxide, lithium hafnium oxide, niobium oxide, zirconium oxide, aluminum oxide, tantalum oxide, and hafnium oxide.

In some examples, including any of the foregoing, the active material is uncoated.

In some examples, including any of the foregoing, the positive electrode comprises a lithium intercalation material, a lithium conversion material, or both a lithium intercalation material and a lithium conversion material.

In some examples, the positive electrode has a porosity less than about 20% v/v, 15% v/v, 12.5% v/v, 10% v/v, 5% v/v, 1% v/v, or less. In some examples, the positive electrode has a porosity of about 5% v/v to 20% v/v, or about 10% v/v to 15% v/v.

In some examples, including any of the foregoing, the intercalation material is selected from the group consisting of a nickel manganese cobalt oxide (NMC), a nickel cobalt aluminum oxide (NCA), Li(NiCoAl)O$_2$, a lithium cobalt oxide (LCO), a lithium manganese cobalt oxide (LMCO), a lithium nickel manganese cobalt oxide (LMNCO), a lithium nickel manganese oxide (LNMO), Li(NiCoMn)O$_2$, LiMn$_2$O$_4$, LiCoO$_2$, and LiMn$_{2-a}$NiaO$_4$, wherein a is from 0 to 2, or LiMPO$_4$, wherein M is Fe, Ni, Co, or Mn.

In some examples, including any of the foregoing, the lithium conversion material is selected from the group consisting of FeF$_2$, NiF$_2$, FeOxF$_{3-2x}$, FeF$_3$, MnF$_3$, CoF$_3$, CuF$_2$ materials, alloys thereof, and combinations thereof $_{2-a}$NiaO$_4$, wherein a is from 0 to 2, or LiMPO$_4$, wherein M is Fe, Ni, Co, or Mn.

In some examples, including any of the foregoing, the sulfide catholyte and the single ion conducting, solid-state buffer are made of the same type of material.

In some examples, including any of the foregoing, the sulfide catholyte or the single ion conducting, solid-state buffer, or both, are selected from the group consisting of LSS, SLOPS, LSTPS, LSTPSCl, SLOBS, LATS, and LPS+ X, wherein X is selected from the group consisting of Cl, I, Br, and combinations thereof. In some examples, X is Cl. In some examples, X is I. In some examples, X is Br.

In some examples, including any of the foregoing, the sulfide catholyte or the single ion conducting, solid-state buffer, or both, are selected from the group consisting of LSS, SLOPS, LSTPS, LSTPSCl, LSPSCl, SLOBS, LATS, and LPS+X, wherein X is selected from the group consisting of Cl, I, Br, and combinations thereof. In some examples, X is Cl. In some examples, X is I. In some examples, X is Br.

In some examples, including any of the foregoing, the sulfide catholyte or the single ion conducting, solid-state buffer, or both, are selected from the group consisting of LPSI, LXPS, LSTPS, LSPSCl, LPSCl, LSPSBr, and LPSBr.

In some examples, including any of the foregoing, the sulfide catholyte or the single ion conducting, solid-state buffer, or both, are selected from $xLi_2S:y.SiS_2$, wherein x and y are each independently a number from 0 to 1, and wherein x+y=1.

In some examples, including any of the foregoing, the sulfide catholyte or the single ion conducting, solid-state buffer, or both, are selected from the group consisting of LSS, LGPS, LSTPS, and $LSPS·_2S:ySiS_2$, wherein x and y are each independently a number from 0 to 1, and wherein x+y=1.

In some examples, including any of the foregoing, the borohydride bonding layer comprises a lithium borohydride, a sodium borohydride, or a potassium borohydride.

In some examples, including any of the foregoing, the lithium borohydride, sodium borohydride, or potassium borohydride is doped with $LiNH_2$.

In some examples, including any of the foregoing, any one or more of the lithium borohydride, sodium borohydride, or potassium borohydride is doped with LiI.

In some examples, including any of the foregoing, any one or more of the lithium borohydride, sodium borohydride, or potassium borohydride is doped with $LiNH_2$ and LiI.

In some examples, including any of the foregoing, the borohydride bonding layer comprises a borohydride composition comprising $A(LiBH_4)(1-A)(P_2S_5)$, wherein $0.05 \leq A \leq 0.95$. In some examples, $0.5 < A < 0.95$. In some examples, A is 0.85, 0.9, or 9.95.

In some examples, including any of the foregoing, the borohydride bonding layer comprises $0.9(LiBH_4)0.1(P_2S_5)$.

In some examples, including any of the foregoing, the borohydride bonding layer is amorphous. In some examples, including any of the foregoing, the borohydride bonding layer is semi-crystalline. In some examples, including any of the foregoing, the borohydride bonding layer is polycrystalline.

In some examples, including any of the foregoing, the lithium-stuffed garnet layer comprises a lithium-stuffed garnet selected from $Li_xLa_yZr_zO_t·qAl_2O_3$, wherein $4<x<10$, $1<y<4$, $1<z<3$, $6<t<14$, and $0 \leq q \leq 1$.

In some examples, including any of the foregoing, the lithium-stuffed garnet layer comprises a lithium-stuffed garnet selected from $Li_7La_3Zr_2O_{12}·Al_2O_2O_3$ and $Li_7La_3Zr_2O_{12}.0.35Al_2O_3$.

In some examples, including any of the foregoing, the lithium-stuffed garnet is doped with Nb, Ga, and/or Ta·$_7La_3Zr_2O_{12}Al_2O_3$ and $Li_7La_3Zr_2O_{12}.0.35Al_2O_3$.

In some examples, including any of the foregoing, the lithium-stuffed garnet layer comprises a lithium-stuffed garnet characterized by the formula $Li_aLa_bZr_cAl_dMe''_eO_f$, wherein $5<a<8.5$; $2<b<4$; $0 \leq c \leq 2.5$; $0 \leq d<2$; $0 \leq e<2$, and $10<f<13$ and Me'' is a metal selected from the group consisting of Nb, Ga, Ta, and combinations thereof.

In some examples, including any of the foregoing, the lithium-stuffed garnet layer comprises a lithium-stuffed garnet oxide characterized by the formula $Li_uLa_vZr_xO_y·zAl_2O_3$, wherein u is a rational number from 4 to 8; v is a rational number from 2 to 4; x is a rational number from 1 to 3; y is a rational number from 10 to 14; and z is a rational number from 0.05 to 1; wherein u, v, x, y, and z are selected so that the lithium-stuffed garnet oxide is charge neutral.

In some examples, including any of the foregoing, the lithium-stuffed garnet layer comprises a lithium-stuffed garnet oxide characterized by the formula $Li_uLa_vZr_xO_y·zTa_2O_5$, wherein u is a rational number from 4 to 10; v is a rational number from 2 to 4; x is a rational number from 1 to 3; y is a rational number from 10 to 14; and z is a rational number from 0 to 1; wherein u, v, x, y, and z are selected so that the lithium-stuffed garnet oxide is charge neutral.

In some examples, including any of the foregoing, the lithium-stuffed garnet layer comprises a lithium-stuffed garnet oxide characterized by the formula $Li_uLa_vZr_xO_y·zNb_2O_5$, wherein u is a rational number from 4 to 10; v is a rational number from 2 to 4; x is a rational number from 1 to 3; y is a rational number from 10 to 14; and z is a rational number from 0 to 1; wherein u, v, x, y, and z are selected so that the lithium-stuffed garnet oxide is charge neutral.

In some examples, including any of the foregoing, the lithium-stuffed garnet layer comprises a lithium-stuffed garnet oxide characterized by the formula $Li_uLa_vZr_xO_y·zGa_2O_3$, wherein u is a rational number from 4 to 10; v is a rational number from 2 to 4; x is a rational number from 1 to 3; y is a rational number from 10 to 14; and z is a rational number from 0 to 1; wherein u, v, x, y, and z are selected so that the lithium-stuffed garnet oxide is charge neutral.

In some examples, including any of the foregoing, the lithium-stuffed garnet layer comprises a lithium-stuffed garnet oxide characterized by the formula $Li_uLa_vZr_xO_y·zTa_2O_5·bAl_2O_3$, wherein u is a rational number from 4 to 10; v is a rational number from 2 to 4; x is a rational number from 1 to 3; y is a rational number from 10 to 14; z is a rational number from 0 to 1; b is a rational number from 0 to 1; wherein $z+b \leq 1$; and u, v, x, y, and z are selected so that the lithium-stuffed garnet oxide is charge neutral.

In some examples, including any of the foregoing, the lithium-stuffed garnet layer comprises a lithium-stuffed garnet oxide characterized by the formula $Li_uLa_vZr_xO_y·zNb_2O_5·bAl_2O_3$, wherein u is a rational number from 4 to 10; v is a rational number from 2 to 4; x is a rational number from 1 to 3; y is a rational number from 10 to 14; z is a rational number from 0 to 1; b is a rational number from 0 to 1; wherein $z+b \leq 1$; and u, v, x, y, and z are selected so that the lithium-stuffed garnet oxide is charge neutral.

In some examples, including any of the foregoing, the lithium-stuffed garnet layer comprises a lithium-stuffed garnet oxide characterized by the formula $Li_uLa_vZr_xO_y·zGa_2O_3·bAl_2O_3$, wherein u is a rational number from 4 to 10; v is a rational number from 2 to 4; x is a rational number from 1 to 3; y is a rational number from 10 to 14; and is a rational number from 0 to 1; b is a rational number from 0 to 1; wherein $z+b<1$; and u, v, x, y, and z are selected so that the lithium-stuffed garnet oxide is charge neutral.

In some examples, including any of the foregoing, the lithium-stuffed garnet layer comprises a lithium-stuffed garnet characterized by the formula $Li_{6.4}Ga_{0.2}La_3Zr_2O_{12.3}·bAl_2O_3$, wherein u is a rational number from 4 to 10; v is a rational number from 2 to 4; x is a rational number from 1 to 3; y is a rational number from 10 to 14; and is a rational number from 0 to 1; b is a rational number from 0 to 1; wherein z+b≤1; and u, v, x, y, and z are selected so that the lithium-stuffed garnet oxide is charge neutral.

In some examples, including any of the foregoing, the SSEC further includes a positive electrode current collector layer.

In some examples, including any of the foregoing, the SSEC further includes a negative electrode current collector layer. In some examples, the negative electrode current collector layer is a sintered metal. In some examples, the sintered metal is selected from the group consisting of Al, Cu, Ni, Ag, Au, Pt, Pd, or Sn. In some examples, the metal is Ni.

In some examples, including any of the foregoing, the positive electrode layer further comprises a binder, carbon, or both binder and carbon.

In some examples, including any of the foregoing, the lithium-stuffed garnet layer is between and in contact with the negative current collector layer and the borohydride bonding layer.

In some examples, including any of the foregoing, the borohydride bonding layer is between and in contact with the lithium-stuffed garnet layer and the buffer layer.

In some examples, including any of the foregoing, the buffer layer is between and in contact with the borohydride bonding layer and the positive electrode layer.

In some examples, including any of the foregoing, the positive electrode layer is between and in contact with the buffer layer and the positive electrode current collector layer In some examples, including any of the foregoing, the active material includes a coating or the active material is coated. In some examples, the active material has a coating. In some examples, the active material is coated. In some examples, the active material includes a coating of a material selected from lithium-lanthanum-zirconium oxide (LLZO).

The lithium-stuffed garnet layer may comprise any lithium-stuffed garnet set forth in U.S. Pat. No. 9,806,372 B2, which issued Oct. 31, 2017, and is titled Garnet MATERIALS FOR LI SECONDARY BATTERIES AND METHODS OF MAKING and USING GARNET MATERIALS, and U.S. Pat. No. 9,970,711, which issued May 15, 2018, and is titled LITHIUM STUFFED GARNET SETTER PLATES FOR SOLID ELECTROLYTE FABRICATION, the entire contents of which are herein incorporated by reference in their entirety for all purposes. The lithium-stuffed garnet layer made by forming a layer or film of the lithium-stuffed garnet layer described herein, for example by uses the methods in U.S. Pat. No. 9,806,372 B2. The lithium-stuffed garnet layer may comprise any lithium-stuffed garnet set forth in U.S. Pat. No. 9,966,630, which issued May 8, 2018, and is titled ANNEALED GARNET ELECTROLYTE SEPARATORS, the entire contents of which are herein incorporated by reference in their entirety for all purposes. The lithium-stuffed garnet layer made by forming a layer or film of the lithium-stuffed garnet layer described herein, for example by uses the methods in U.S. Pat. No. 9,966,630 B2. The lithium-stuffed garnet layer may comprise any lithium-stuffed garnet set forth in US Patent Application Publicaiton No. US20180375149A1, which was filed as U.S. patent application Ser. No. 15/631,884, filed Jun. 23, 2017, and titled LITHIUM-STUFFED GARNET ELECTROLYTES WITH SECONDARY PHASE INCLUSIONS, the entire contents of which are herein incorporated by reference in their entirety for all purposes. The lithium-stuffed garnet layer made by forming a layer or film of the lithium-stuffed garnet layer described herein, for example by uses the methods in U.S. patent application Ser. No. 15/631, 884. The lithium-stuffed garnet layer may comprise any lithium-stuffed garnet set forth in set forth in International PCT Patent Application No. PCT/US2017/039069, filed Jun. 23, 2017, and titled LITHIUM-STUFFED GARNET ELECTROLYTES WITH SECONDARY PHASE INCLUSIONS, the entire contents of which are herein incorporated by reference in their entirety for all purposes. The lithium-stuffed garnet layer made by forming a layer or film of the lithium-stuffed garnet layer described herein, for example by uses the methods in PCT/US2017/039069.

In some examples, the lithium-stuffed garnet layer is chemically stable when in contact with Li metal. In some examples, the lithium-stuffed garnet layer is kinetically stable when in contact with Li metal.

In some examples, the lithium-stuffed garnet comprises lithium lanthanum zirconium oxide (LLZO) and has good electrochemical stability and high mechanical strength, e.g. greater than 500 MPa. In some examples, the LLZO is suitable for use with a Li metal anode.

In any examples herein, the lithium-stuffed garnet layer or LLZO may be paired with a bonding agent set forth in WO2017197406A1, which published Nov. 16, 2017, and was filed as International PCT Patent Application No. PCT/US2017/032749, filed 15 May 2017, and entitled SOLID ELECTROLYTE SEPARATOR BONDING AGENT, the entire contents of which are herein incorporated by reference in their entirety for all purposes. In any examples herein, the lithium-stuffed garnet are made according to the methods in International PCT Patent Application No. PCT/US2016/027886, which was filed Apr. 15, 2016, and is titled LITHIUM STUFFED GARNET SETTER PLATES FOR SOLID ELECTROLYTE FABRICATION the entire contents of which are herein incorporated by reference in their entirety for all purposes. In any examples herein, the lithium-stuffed garnet are made according to the methods in International PCT Patent Application No. PCT/US2016/027922, which was filed Apr. 15, 2016, and is titled SETTER PLATES FOR SOLID ELECTROLYTE FABRICATION AND METHODS OF USING THE SAME TO PREPARE DENSE SOLID ELECTROLYTES, the entire contents of which are herein incorporated by reference in their entirety for all purposes. In any examples herein, the lithium-stuffed garnet are made according to the methods in International PCT Patent Application No. PCT/US2016/043428, which was filed Jul. 21, 2016, and is titled PROCESSES AND MATERIALS FOR CASTING AND SINTERING GREEN GARNET THIN FILMS, the entire contents of which are herein incorporated by reference in their entirety for all purposes. In any examples herein, the lithium-stuffed garnet are made according to the methods in U.S. Pat. No. 9,970,711, which issued May 15, 2018, and is titled LITHIUM STUFFED GARNET SETTER PLATES FOR SOLID ELECTROLYTE FABRICATION, the entire contents of which are herein incorporated by reference in their entirety for all purposes. In any examples herein, the lithium-stuffed garnet are made according to the methods in U.S. Pat. No. 9,970,711, which issued May 15, 2018, and is titled LITHIUM STUFFED GARNET SETTER PLATES FOR SOLID ELECTROLYTE FABRICATION, the entire contents of which are herein incorporated by reference in their entirety for all purposes. The sulfide in the sulfide catholyte in some examples may be any sulfide set forth in U.S. Pat. No. 9,172,114, which issued Oct. 27, 2015, and is titled SOLID STATE CATHOLYTES AND ELECTROLYTES FOR ENERGY STORAGE DEVICES, the entire contents of which are herein incorporated by reference in their entirety for all purposes. The sulfide in the sulfide catholyte in some examples may be any sulfide set forth in International PCT Patent Application No. PCT/US2016/015982, filed Feb. 1, 2016, and titled METAL SULFIDE ANOLYTE FOR ELECTROCHEMICAL CELLS, and which published as WO 2016/126610 on Aug. 11, 2016, the entire contents of which are herein incorporated by reference in their entirety for all purposes. The sulfide in the sulfide catholyte in some examples may be any sulfide set forth in International PCT Patent Application No. PCT/US2016/039424, filed Jun. 24, 2016, and titled COMPOSITE ELECTROLYTES, and which published as WO 2016/210371, on Dec. 29, 2016, the entire contents of which are herein incorporated by reference in their entirety for all purposes. The sulfide in the sulfide catholyte in some examples may be any sulfide set forth in US Patent Application Publication No. 2017-0005367 A1, entitled COMPOSITE ELECTROLYTES, which published Jan. 5, 2017, the entire contents of which are herein incorporated by reference in their entirety for all purposes. The sulfide in the sulfide catholyte in some examples may be any sulfide set forth in International PCT Patent Application NO. PCT/US2016/064492, filed Dec. 1, 2016, and entitled LITHIUM, PHOSPHORUS, SULFUR, AND IODINE CONTAINING ELECTROLYTE AND CATHOLYTE COMPOSITIONS, ELECTROLYTE MEMBRANES FOR ELECTROCHEMICAL DEVICES, AND ANNEALING METHODS OF MAKING THESE ELECTROLYTES AND CATHOLYTES, and which published as WO 2017/096088 on Jun. 8, 2017, the entire contents of which are herein incorporated by reference in their entirety for all purposes.

The sulfide in the buffer layer in some examples may be any sulfide set forth in U.S. Pat. No. 9,172,114, which issued Oct. 27, 2015, and is titled SOLID STATE CATHOLYTES AND ELECTROLYTES FOR ENERGY STORAGE DEVICES, the entire contents of which are herein incorporated by reference in their entirety for all purposes. The sulfide in the buffer layer in some examples may be any sulfide set forth in International PCT Patent Application No. PCT/US2016/015982, filed Feb. 1, 2016, and titled METAL SULFIDE ANOLYTE FOR ELECTROCHEMICAL CELLS, and which published as WO 2016/126610 on Aug. 11, 2016, the entire contents of which are herein incorporated by reference in their entirety for all purposes. The sulfide in the buffer layer in some examples may be any sulfide set forth in International PCT Patent Application No. PCT/US2016/039424, filed Jun. 24, 2016, and titled COMPOSITE ELECTROLYTES, and which published as WO 2016/210371, on Dec. 29, 2016, the entire contents of which are herein incorporated by reference in their entirety for all purposes.

In some examples, a positive electrode includes about 85 wt % LZO coated NCA, about 13 wt % LSTPS and about 2 wt % binder.

In some examples, including any of the foregoing, the negative electrode is a lithium (Li) metal electrode layer. In some examples, including any of the foregoing, the at least one current collector includes a material selected from the group consisting of carbon (C)-coated nickel (Ni), nickel (Ni), copper (Cu), aluminum (Al), and stainless steel. In some examples, including any of the foregoing, the e negative electrode current collector includes a material selected from the group consisting of carbon (C)-coated nickel (Ni), nickel (Ni), and copper (Cu). In some examples, including any of the foregoing, the positive electrode current collector layer includes a material selected from the group consisting of carbon (C)-coated aluminum and aluminum. In some examples, including any of the foregoing, the negative electrode current collector layer is C-coated Ni. In some examples, including any of the foregoing, the positive electrode current collector layer is C-coated Al.

Buffer Layer Dimensions

In some examples, including any of the foregoing, the thickness of the buffer layer is from about 1 µm to about 50 µm. In some examples, the thickness of the buffer layer is 1 µm. In some examples, the thickness of the buffer layer is 2 µm. In some examples, the thickness of the buffer layer is 3 µm. In some examples, the thickness of the buffer layer is 4 µm. In some examples, the thickness of the buffer layer is 5 µm. In some examples, the thickness of the buffer layer is 6 µm. In some examples, the thickness of the buffer layer is 7 µm. In some examples, the thickness of the buffer layer is 8 µm. In some examples, the thickness of the buffer layer is 9 µm. In some examples, the thickness of the buffer layer is 10 µm.

In some examples, including any of the foregoing, the single ion conducting, solid-state buffer is mixed within the positive electrode layer to a depth of penetration within the positive electrode layer from about 1 µm to about 50 µm. This depth of penetration is measured from the edge where the positive electrode layer interfaces with either the buffer layer or the borohydride bonding layer. In some examples, if the positive electrode layer is 200 µm thick, and the depth of penetration within the positive electrode layer from about 1 µm to about 50 µm, this means that the buffer is present in the positive electrode on the side closest to the buffer layer, if present, or borohydride bonding layer, if no buffer layer present. In some examples, if the positive electrode layer is 200 µm thick, and the depth of penetration within the positive electrode layer from about 1 µm to about 50 µm, this also means that the side of the positive electrode which is contact with the positive current collector has no buffer component.

In some examples, including any of the foregoing, the single ion conducting, solid-state buffer is mixed within the positive electrode layer to a depth of penetration within the positive electrode layer from about 1 µm to about 50 µm. This depth of penetration is measured from the edge where the positive electrode layer interfaces with either the buffer layer or the borohydride bonding layer. In some examples, if the positive electrode layer is 150 µm thick, and the depth of penetration within the positive electrode layer from about 1 µm to about 50 µm, this means that the buffer is present in the positive electrode on the side closest to the buffer layer, if present, or borohydride bonding layer, if no buffer layer present. In some examples, if the positive electrode layer is 150 µm thick, and the depth of penetration within the positive electrode layer from about 1 µm to about 50 µm, this also means that the side of the positive electrode which is contact with the positive current collector has no buffer component.

In some examples, including any of the foregoing, the buffer layer is between and in direct contact with the positive electrode layer and the separator layer. In some instances, the buffer layer has a thickness ranging from about 1 µm to about 15 µm. In some instances, the buffer layer has a thickness of 1 µm. In some instances, the buffer layer has a thickness of 1 µm. In some instances, the buffer layer has a thickness of 2 µm. In some instances, the buffer layer has a thickness of 3 µm. In some instances, the buffer layer has a thickness of 4 µm. In some instances, the buffer layer has a thickness of 5 µm. In some instances, the buffer layer has a thickness of 6 µm. In some instances, the buffer layer has a thickness of 7 µm. In some instances, the buffer layer has a thickness of 8 µm. In some instances, the buffer layer has a thickness of 9 µm. In some instances, the buffer layer has a thickness of 10 µm. In some instances, the buffer layer has a thickness of 11 µm. In some instances, the buffer layer has a thickness of 12 µm. In some instances, the buffer layer has a thickness of 13 µm. In some instances, the buffer layer has a thickness of 14 µm. In some instances, the buffer layer has a thickness of 15 µm.

Buffer Layer Dimensions

In some examples, the bonding layer comprises a lithium borohydride. In some examples, the bonding layer comprises lithium borohydride particles that are at least about 1 µm in average diameter. In some examples, the bonding layer comprises lithium borohydride particles that are about 1 µm to about 50 µm, about 2 µm to about 20 µm, or about 1 µm to about 10 µm in average diameter.

In some examples, prior to assembly of the battery cell, the bonding layer comprises particles that are at least about 1 µm in average diameter. In some examples, the bonding layer particles that are about 1 µm to about 50 µm, about 2 µm to about 20 µm, or about 1 µm to about 10 µm in average diameter.

In some examples, including any of the foregoing, the thickness of the borohydride bonding layer is from about 1 µm to about 50 µm. In some examples, including any of the foregoing, the thickness of the borohydride bonding layer is from about 1 µm to about 50 µm. In some examples, the thickness of the borohydride bonding layer is 1 µm. In some examples, the thickness of the borohydride bonding layer is 2 µm. In some examples, the thickness of the borohydride bonding layer is 3 µm. In some examples, the thickness of the borohydride bonding layer is 4 µm. In some examples, the thickness of the borohydride bonding layer is 5 µm. In some examples, the thickness of the borohydride bonding layer is 6 µm. In some examples, the thickness of the borohydride bonding layer is 7 µm. In some examples, the thickness of the borohydride bonding layer is 8 µm. In some examples, the thickness of the borohydride bonding layer is 9 µm. In some examples, the thickness of the borohydride bonding layer is 10 µm. In some examples, the thickness of the borohydride bonding layer is 11 µm. In some examples, the thickness of the borohydride bonding layer is 12 µm. In some examples, the thickness of the borohydride bonding layer is 13 µm. In some examples, the thickness of the borohydride bonding layer is 14 µm. In some examples, the thickness of the borohydride bonding layer is 15 µm. In some examples, the thickness of the borohydride bonding layer is 16 µm. In some examples, the thickness of the borohydride bonding layer is 17 µm. In some examples, the thickness of the borohydride bonding layer is 18 µm. In some examples, the thickness of the borohydride bonding layer is 19 µm. In some examples, the thickness of the borohydride bonding layer is 20 µm. In some examples, the thickness of the borohydride bonding layer is 31 µm. In some examples, the thickness of the borohydride bonding layer is 32 µm. In some examples, the thickness of the borohydride bonding layer is 33 µm. In some examples, the thickness of the borohydride bonding layer is 34 µm. In some examples, the thickness of the borohydride bonding layer is 35 µm. In some examples, the thickness of the borohydride bonding layer is 36 µm. In some examples, the thickness of the borohydride bonding layer is 37 µm. In some examples, the thickness of the borohydride bonding layer is 38 µm. In some examples, the thickness of the borohydride bonding layer is 39 µm. In some examples, the thickness of the borohydride bonding layer is 40 µm. In some examples, the thickness of the borohydride bonding layer is 41 µm. In some examples, the thickness of the borohydride bonding layer is 42 µm. In some examples, the thickness of the borohydride bonding layer is 43 µm. In some examples, the thickness of the borohydride bonding layer is 44 µm. In some examples, the thickness of the borohydride bonding layer is 45 µm. In some examples, the thickness of the borohydride bonding layer is 46 µm. In some examples, the thickness of the borohydride bonding layer is 47 µm. In some examples, the thickness of the borohydride bonding layer is 48 µm. In some examples, the thickness of the borohydride bonding layer is 49 µm. In some examples, the thickness of the borohydride bonding layer is 50 µm.

In some examples, including any of the foregoing, the borohydride bonding layer penetrates into the buffer layer.

In some examples, including any of the foregoing, the borohydride bonding layer penetrates into the lithium-stuffed garnet layer.

In some examples, including any of the foregoing, the borohydride bonding layer penetrates into the buffer layer and the lithium-stuffed garnet layer.

In some examples, including any of the foregoing, the borohydride bonding layer has a density of 90% or above of the raw material density as measured by quantitative analysis of a cross-section SEM image. Density is determined by analyzing porosity as a function of total area using an SEM image and analytical software.

In some examples, including any of the foregoing, the borohydride bonding layer has a density of 90% or above of the raw material density as measured by quantitative analysis of a cross-section SEM image.

In some examples, including any of the foregoing, the borohydride bonding layer has a melting point below 250° C. In some examples, including any of the foregoing, the borohydride bonding layer has a melting point above 250° C.

In some examples, including any of the foregoing, the SSEC further comprises a negative electrode.

In some examples, including any of the foregoing, the negative electrode is a lithium (Li) metal negative electrode.

In some examples, including any of the foregoing, the lithium-stuffed garnet layer contacts the negative electrode.

In certain embodiments, the composition may be a thin film and include a porosity as determined by SEM for the thin film. For example, in one embodiment, the compositions set forth herein may have a porosity less than 5%. By way of further example, in one embodiment, the compositions set forth herein may have a porosity less than 6%. By way of further example, in one embodiment, the compositions set forth herein may have a porosity less than 7%. By way of further example, in one embodiment, the compositions set forth herein may have a porosity less than 8%. By way of further example, in one embodiment, the compositions set forth herein may have a porosity less than 4%. By way of further example, in one embodiment, the compositions set forth herein may have a porosity less than 3%. By way of further example, in one embodiment, the compositions set forth herein may have a porosity less than 2%. By way of further example, in one embodiment, the compositions set forth herein may have a porosity less than 1%. By way of further example, in one embodiment, the compositions set forth herein may have a porosity less than 0.5%.

In some examples, the solid-state electrochemical stack described above further includes a bonding layer between and in direct contact with the buffer layer and the separator layer.

In some examples, set forth herein is a bonding layer having a thickness of about 1 nm. In some examples, set forth herein is a bonding layer having a thickness of about 5 nm to about 100 nm.

In some examples, set forth herein is a bonding layer having a thickness of about 100 nm to about 1000 nm. In some examples, the bonding layer has a thickness of about 200 nm to about 900 nm, about 300 nm to about 800 nm, or about 500 nm.

In some examples, set forth herein is a bonding layer having a thickness of about 1 µm. In some examples, set forth herein is a bonding layer having a thickness of about 2 µm. In some examples, set forth herein is a bonding layer having a thickness of about 3 µm. In some examples, set forth herein is a bonding layer having a thickness of about 4 µm. In some examples, set forth herein is a bonding layer having a thickness of about 5 µm to about 100 µm. In some examples, set forth herein is a bonding layer having a thickness of about 10 µm to about 50 µm, about 15 µm to about 40 µm, or 20 µm to about 40 µm. In some examples, set forth herein is a bonding layer having a thickness of about 1 µm. In some examples, set forth herein is a bonding layer having a thickness of about 2 µm. In some examples, set forth herein is a bonding layer having a thickness of about 3 µm. In some examples, set forth herein is a bonding layer having a thickness of about 4 µm. In some examples, set forth herein is a bonding layer having a thickness of about 5 µm. In some examples, set forth herein is a bonding layer having a thickness of about 100 µm. In some examples, set forth herein is a bonding layer having a thickness of about 1 µm to about 100 µm, of about 1 µm to about 50 µm, or of about 5 µm to about 50 µm.

In some examples, including any of the foregoing, the bonding layer is greater than 100 nm and less than 10 µm in median thickness. In some examples, including any of the foregoing, the polymer has a crosslink density greater than 0.1% and less than 30% as measured by ASTM D2765. In some examples, including any of the foregoing, the bonding layer lowers the interfacial impedance between the electrolyte separator and the positive electrode than it otherwise would be in the absence of the bonding layer. In some examples, the bonding layer lowers the interfacial impedance between the electrolyte separator and the positive electrode than it otherwise would be in the absence of the bonding layer. In some examples, the interfacial impedance between the oxide electrolyte separator and the positive electrode is less than 50 $\Omega \cdot cm^2$ at 50° C., when the bonding layer is positioned between and in direct contact with the oxide electrolyte separator and the positive electrode. In some examples, the interfacial impedance between the oxide electrolyte separator and the positive electrode is less than 25 $\Omega \cdot cm^2$ at 50° C. In some examples, the interfacial impedance between the oxide electrolyte separator and the positive electrode is less than 10 $\Omega \cdot cm^2$ at 50° C. In some examples, the interfacial impedance between the oxide electrolyte separator and the positive electrode is less than 5 $\Omega \cdot cm^2$ at 50° C. In some examples, the interfacial impedance between the oxide electrolyte separator and the positive electrode is less than 5 $\Omega \cdot cm^2$ at 30° C. In some examples, the interfacial impedance between the oxide electrolyte separator and the positive electrode is less than 5 $\Omega \cdot cm^2$ at 20° C. In some examples, the interfacial impedance between the oxide electrolyte separator and the positive electrode is less than 5 $\Omega \cdot cm^2$ at 10° C. In some examples, the interfacial impedance between the oxide electrolyte separator and the positive electrode is less than 5 $\Omega \cdot cm^2$ at 0° C. In some examples, including any of the foregoing, the interfacial impedance between the electrolyte separator and the positive electrode is less than 50 $\Omega \cdot cm^2$ at 50° C. In some examples, including any of the foregoing, the interfacial impedance between the electrolyte separator and the positive electrode is less than 25 $\Omega \cdot cm^2$ at 50° C. In some examples, including any of the foregoing, the interfacial impedance between the electrolyte separator and the positive electrode is less than 10 $\Omega \cdot cm^2$ at 50° C. In some examples, including any of the foregoing, the interfacial impedance between the electrolyte separator and the positive electrode is less than 5 $\Omega \cdot cm^2$ at 50° C. In some examples, including any of the foregoing, the positive electrode includes a lithium intercalation material, a lithium conversion material, or a combination thereof.

In some examples, the bonding layer penetrates into the positive electrode. In other examples, bonding layer penetrates into the positive electrode at least 10% of the thickness of the positive electrode. In other examples, bonding layer penetrates into the positive electrode at least 9% of the thickness of the positive electrode. In other examples, bonding layer penetrates into the positive electrode at least 8% of the thickness of the positive electrode. In other examples, bonding layer penetrates into the positive electrode at least 7% of the thickness of the positive electrode. In other examples, bonding layer penetrates into the positive electrode at least 6% of the thickness of the positive electrode. In other examples, bonding layer penetrates into the positive electrode at least 5% of the thickness of the positive electrode. In other examples, bonding layer penetrates into the positive electrode at least 4% of the thickness of the positive electrode. In other examples, bonding layer penetrates into the positive electrode at least 3% of the thickness of the positive electrode. In other examples, bonding layer penetrates into the positive electrode at least % of the thickness of the positive electrode. In other examples, bonding layer penetrates into the positive electrode at least 1% of the thickness of the positive electrode.

In some examples, the bonding layer contacts the catholyte in the positive electrode. In some examples, the bonding layer does not creep around the electrolyte separator. In some examples, the bonding layer does not include components which volatilize and diffuse around the electrolyte separator to contact the Li metal negative electrode.

In some examples, including any of the foregoing, the bonding layer penetrates into the positive electrode at least 10% of the thickness of the positive electrode.

In some examples, including any of the foregoing, the bonding layer contacts the solid state catholyte in the positive electrode.

In some examples, including any of the foregoing, the diameter of the electrolyte separator is greater than the diameter of the positive electrode.

In some examples, including any of the foregoing, the width or diameter of the electrolyte separator is greater than the width or diameter, respectively, of the positive electrode.

In some examples, including any of the foregoing, the electrolyte separator has raised edges, which protect the bonding layer, or its constituent components, from creeping around the electrolyte separator.

In some examples, including any of the foregoing, the coated edges include a coating selected from parylene, polypropylene, polyethylene, alumina, $Al_2O_3$, $ZrO_2$, $TiO_2$, $SiO_2$, a binary oxide, $La_2Zr_2O_7$, a lithium carbonate species, or a glass, wherein the glass is selected from $SiO_2$—$B_2O_3$, or $Al_2O_3$.

In some examples, the borohydride bonding layer includes LBHI, LBHIN, [LBH—X], LBHPS, LiI, LPS, L[X]PS, or $Li_3PO_4$. In some examples, the borohydride bonding layer includes functionalized polymer, such as PEO—LiTFSI, poly-propylene carbonate (PPC)—LiTFSI, poly-ethylene carbonate (PEC)—LiTFSI, Li-poly(2-acrylamido-2-methyl-1-propane sulphonic acid) (PAMPS), Li-Nafion, Li-polyphenylene sulfide (PPS); or solid organic salt pair, such as ethylene carbonate (EC)-LiTFSI, Dimethyl sulfide (DMS)-LiPF$_6$, and succinonitrile (SCN)—LiBF$_4$.

Other Component Dimensions

In some examples, including any of the foregoing, the thickness of the positive electrode layer is from about 100 µm to about 1000 µm. In some examples, the thickness of the positive electrode layer is 10 µm. In some examples, the thickness of the positive electrode layer is 20 µm. In some examples, the thickness of the positive electrode layer is 30 µm. In some examples, the thickness of the positive electrode layer is 40 µm. In some examples, the thickness of the positive electrode layer is 50 µm. In some examples, the thickness of the positive electrode layer is 60 µm. In some examples, the thickness of the positive electrode layer is 70 µm. In some examples, the thickness of the positive electrode layer is 80 µm. In some examples, the thickness of the positive electrode layer is 90 µm. In some examples, the thickness of the positive electrode layer is 100 µm. In some examples, the thickness of the positive electrode layer is 110 µm. In some examples, the thickness of the positive electrode layer is 120 µm. In some examples, the thickness of the positive electrode layer is 130 µm. In some examples, the thickness of the positive electrode layer is 140 µm. In some examples, the thickness of the positive electrode layer is 150 µm. In some examples, the thickness of the positive electrode layer is 160 µm. In some examples, the thickness of the positive electrode layer is 170 µm. In some examples, the thickness of the positive electrode layer is 180 µm. In some examples, the thickness of the positive electrode layer is 190 µm. In some examples, the thickness of the positive electrode layer is 200 µm.

In some examples, including any of the foregoing, the thickness of the lithium-stuffed garnet layer is from about 1 µm to about 200 µm. In some examples, the thickness of the lithium-stuffed garnet layer is 10 µm. In some examples, the thickness of the lithium-stuffed garnet layer is 20 µm. In some examples, the thickness of the lithium-stuffed garnet layer is 30 µm. In some examples, the thickness of the lithium-stuffed garnet layer is 40 µm. In some examples, the thickness of the lithium-stuffed garnet layer is 50 µm. In some examples, the thickness of the lithium-stuffed garnet layer is 60 µm. In some examples, the thickness of the lithium-stuffed garnet layer is 70 µm. In some examples, the thickness of the lithium-stuffed garnet layer is 80 µm. In some examples, the thickness of the lithium-stuffed garnet layer is 90 µm. In some examples, the thickness of the lithium-stuffed garnet layer is 100 µm. In some examples, the thickness of the lithium-stuffed garnet layer is 110 µm. In some examples, the thickness of the lithium-stuffed garnet layer is 120 µm. In some examples, the thickness of the lithium-stuffed garnet layer is 130 µm. In some examples, the thickness of the lithium-stuffed garnet layer is 140 µm. In some examples, the thickness of the lithium-stuffed garnet layer is 150 µm. In some examples, the thickness of the lithium-stuffed garnet layer is 160 µm. In some examples, the thickness of the lithium-stuffed garnet layer is 170 µm. In some examples, the thickness of the lithium-stuffed garnet layer is 180 µm. In some examples, the thickness of the lithium-stuffed garnet layer is 190 µm. In some examples, the thickness of the lithium-stuffed garnet layer is 200 µm.

In some examples, including any of the foregoing, the separator layer in a solid-state electrochemical stack described herein is rectangular shaped. In another embodiment, the positive electrode layer in a solid-state electrochemical stack described herein is rectangular shaped. In a different embodiment, the separator layer in a solid-state electrochemical stack described herein is circular shaped. In an embodiment, the positive electrode layer in a solid-state electrochemical stack described herein is circular shaped.

In some examples, including any of the foregoing, the geometric surface area of the positive electrode layer and the geometric surface area separator layer are substantially the same.

In some examples, including any of the foregoing, one edge of the positive electrode layer is 2 cm to 30 cm in length. In some examples, one edge of the positive electrode layer is 2 cm, 3, cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, or 30 cm in length. In some examples, one edge of the separator layer is 2 cm to 30 cm in length. In some examples, one edge of the separator layer is 2 cm, 3, cm, 4 cm, 5 cm, 6 cm, 7 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, or 30 cm in length.

In certain embodiments, provided herein is a composite having a lithium-stuffed garnet and an LBHI, where the LBHI fills at least 90% of the through-pores and/or surface pores of the lithium-stuffed garnet, and where the LBHI may be a composition having A·(LiBH$_4$)·B·(LiX)·C·(LiNH$_2$) wherein X is a halide wherein $3 \leq A \leq 6$, $2 \leq B \leq 5$, and $0 \leq C \leq 9$.

In some examples, including any of the foregoing, the electrolyte separator is characterized by the empirical formula $Li_xLa_ALn_BO_h + yAl_2O_3$, wherein $3 \leq x \leq 8$, $2 < A < 4$, $1 < B < 3$, $0 \leq y \leq 1$, and $6 \leq h \leq 15$; and wherein subscripts x and h, and coefficient y are selected so that the electrolyte separator is charge neutral.

In some examples, including any of the foregoing, the electrolyte separator is doped with Ga, Nb, or Ta.

In some examples, including any of the foregoing, the electrolyte separator has a surface roughness, on at least one surface, from about 0.01 µm to 10 µm. In some examples, including any of the foregoing, the electrolyte separator has a surface roughness, on at least one surface, from about 0.01 µm to 5 µm. In some examples, including any of the foregoing, the electrolyte separator has a surface roughness, on at least one surface, from about 0.01 µm to 2 µm. In some examples, including any of the foregoing, the electrolyte separator has a density greater than 95% of its theoretical density. In some examples, including any of the foregoing, the electrolyte separator has a density greater than 95% of its theoretical density as determined by scanning electron microscopy (SEM). In some examples, including any of the foregoing, the electrolyte separator has a density greater than 95% of its theoretical density as measured by the Archimedes method. In some examples, including any of the foregoing, the electrolyte separator has a surface flatness of 0.1 µm to about 50 µm.

In some examples, including any of the foregoing, the lithium intercalation material is selected from the group consisting of a nickel manganese cobalt oxide (NMC), a nickel cobalt aluminum oxide (NCA), Li(NiCoAl)O$_2$, a lithium cobalt oxide (LCO), a lithium manganese cobalt oxide (LMCO), a lithium nickel manganese cobalt oxide (LMNCO), a lithium nickel manganese oxide (LNMO), Li(NiCoMn)O$_2$, LiMn$_2$O$_4$, LiCoO$_2$, LiMn$_{2-a}$Ni$_a$O$_4$, wherein a is from 0 to 2, or LiMPO$_4$, wherein M is Fe, Ni, Co, and Mn.

In some examples, including any of the foregoing, the lithium conversion material is selected from the group consisting of $FeF_2$, $NiF_2$, $FeO_xF_{3-2x}$, $FeF_3$, $MnF_3$, $CoF_3$, $CuF_2$ materials, alloys thereof, and combinations thereof.

In some examples, including any of the foregoing, the bonding layer penetrates into the positive electrode.

In some examples, set forth herein is an electrochemical stack, wherein the electrolyte separator has a thickness between about 10 nm and 50 µm; the bonding layer has a thickness between about 1 µm and 20 µm; and the positive electrode, exclusive of the current collector, has a thickness between about 5 µm and 150 µm.

In some examples, the electrolyte separator has a surface roughness Ra or Rt, on at least one surface, from about 0.1 µm to 10 µm. In other examples, the electrolyte separator has a surface roughness, on at least one surface, from about 0.1 µm to 5 µm. In other examples, the electrolyte separator has a surface roughness, on at least one surface, from about 0.1 µm to 2 µm. In some examples, the electrolyte has a surface roughness from about 0.1 µm to 10 µm at the surface that interfaces the electrolyte separator and the Li metal negative electrode.

In some examples, the electrolyte separator has a density greater than 95% of its theoretical density. In other examples, the electrolyte separator has a density greater than 95% of its theoretical density as determined by scanning electron microscopy (SEM). In certain examples, the electrolyte separator has a density greater than 95% of its theoretical density as measured by the Archimedes method. In some examples, the electrolyte separator has a surface flatness of 0.1 µm to about 50 µm. In some examples, the lithium salt in the bonding layer is selected from $LiPF_6$, LiBOB, LiTFSi, $LiBF_4$, $LiClO_4$, $LiAsF_6$, LiFSI, LiI, or $LiBF_4$. In certain examples, the lithium salt in the bonding layer is selected from $LiPF_6$, LiBOB, or LFTSi. In certain examples, the lithium salt in the bonding layer is $LiPF_6$ at a concentration of 0.5 M to 2M. In certain examples, the lithium salt in the bonding layer is LiTFSI at a concentration of 0.5 M to 2M. In certain examples, the lithium salt in the bonding layer is present at a concentration from 0.01 M to 10 M.

In some examples, the positive electrode includes a lithium intercalation material, a lithium conversion material, or both a lithium intercalation material and a lithium conversion material. In some examples, the lithium intercalation material is selected from a nickel manganese cobalt oxide Li(NiCoMn)O$_2$, (NMC), a nickel cobalt aluminum oxide (NCA), Li(NiCoAl)O$_2$, a lithium cobalt oxide (LCO), a lithium manganese cobalt oxide (LMCO), a lithium nickel manganese cobalt oxide (LMNCO), a lithium nickel manganese oxide (LNMO), $LiMn_2O_4$, $LiCoO_2$, $LiMn_2$-aNiaO$_4$, wherein a is from 0 to 2, or $LiMPO_4$, wherein M is Fe, Ni, Co, or Mn. In others, the lithium conversion material is selected from the group consisting of $FeF_2$, $NiF_2$, $FeO_xF_{3-2x}$, $FeF_3$, $MnF_3$, $CoF_3$, $CuF_2$ materials, alloys thereof, and combinations thereof. In others, the conversion material is doped with other transition metal fluorides or oxides.

In some examples, the positive electrode includes an electronically conductive source of carbon.

In some examples, the positive electrode includes a solid catholyte and a lithium intercalation material or a lithium conversion material; wherein each of the catholyte and lithium intercalation material or a lithium conversion material independently has a $d_{50}$ particle size from about 0.1 µm to 5 µm. In some examples, the positive electrode includes a solid catholyte and a lithium intercalation material or a lithium conversion material; wherein each of the catholyte and lithium intercalation material or a lithium conversion material independently has a $d_{50}$ particle size from about 0.1 µm to 15 µm. In some examples, the bonding layer is characterized by a thickness of about 1 nm to about 5 µm. In some examples, the Li negative electrode is characterized by a thickness of about 10 nm to about 50 µm. In some examples, the oxide separator is characterized by a thickness of about 0.1 µm to about 150 µm. In some examples, oxide separator is characterized by a thickness of about 10 µm to about 50 µm.

In some examples, the coated edges include a coating selected from parylene, epoxy, polypropylene, polyethylene, alumina, $Al_2O_3$, $ZrO_2$, $TiO_2$, $SiO_2$, a binary oxide, a lithium carbonate species, $La_2Zr_2O_7$, or a glass, wherein the glass is selected from $SiO_2$—$B_2O_3$, or $Al_2O_3$. In some examples, the electrolyte separator has tapered edges which protect the bonding layer from creeping around the electrolyte separator. In some examples, the edges of the separator electrolyte have been selectively treated with heat (e.g. laser beam) or chemicals (e.g. plasma, water, acid, etc).

In some examples, set forth herein is an electrochemical stack having an electrolyte separator which has a thickness between about 10 and 20 µm; a bonding layer which has a thickness between about 1 µm and 5 um; and a positive electrode, exclusive of the current collector, which has a thickness between about 5 µm and 150 um. In some examples, set forth herein is an electrochemical stack having an electrolyte separator which has a thickness between about 10 and 50 µm; a bonding layer which has a thickness between about 1 µm and 5 um; and a positive electrode, exclusive of the current collector, which has a thickness between about 5 µm and 200 um. In some examples, set forth herein is an electrochemical stack having an electrolyte separator which has a thickness between about 10 and 100 µm; a bonding layer which has a thickness between about 1 µm and 5 um; and a positive electrode, exclusive of the current collector, which has a thickness between about 5 µm and 200 um.

Methods

In some examples, set forth herein is a method of making an electrochemical cell, wherein the method includes providing a slurry comprising an active material, a catholyte, and a solvent; depositing the slurry onto a current collector; drying the slurry; providing a second slurry comprising a single ion conducting, solid-state buffer; depositing the second slurry onto a substrate; drying the second slurry; transferring the dried second slurry onto the first slurry once dried to form a stack; applying pressure and heat to the stack; providing a solid-state separator; depositing a borohydride layer onto the solid-state separator; combining the stack with the solid-state separator having a borohydride layer thereupon to form an electrochemical cell stack; and applying pressure and heat to the cell stack.

In some examples, including any of the foregoing, the solid loading is at least 60 wt %.

In some examples, including any of the foregoing, the buffer is LSTPS.

In some examples, the buffer layer is made by a calendering process, wherein the amount of force is at least about 100 psi, 500 psi, 1000 psi, 2000 psi, or more. In some examples, the buffer layer is made under elevated temperatures, such as great than about 40° C., 50° C., 75° C., 100° C., 120° C., 140° C., or more. In some examples, the buffer layer is heated to greater than about 100° C.

In some examples, including any of the foregoing, the pressure is applied uniaxially.

In certain embodiments, disclosed herein is a method for making a thin film including the A·(LiBH$_4$)·B·(LiX)·C·(LiNH$_2$) composition, the method including a) preparing a A·(LiBH$_4$)·B·(LiX)·C·(LiNH$_2$) composition material, b) providing a molten mixture, wherein the mixture includes A·(LiBH$_4$)·B·(LiX)·C·(LiNH$_2$), wherein X is fluorine, bromine, chlorine, iodine, or a combination thereof, and wherein 3≤A≤6, 2≤B≤5, and 0≤C≤9; c) dip-coating a substrate in the molten mixture; d) withdrawing the substrate; and e) cooling the substrate to room temperature. In some examples, the substrate is a current collector. In some examples, the substrate is a solid electrolyte. In some examples, the substrate is a lithium-stuffed garnet.

In certain embodiments, provided herein is a method for coating a lithium ion conducting separator electrolyte, the method including: a) providing the separator electrolyte; and b) pressing a composition of A·(LiBH$_4$)·B·(LiX)·C·(LiNH$_2$), where X may be fluorine, bromine, chlorine, iodine, or a combination thereof, and wherein 3≤A≤6, 2≤B≤5, and 0≤C≤9 at a temperature between 100-280° C. at a pressure of 10-2000 PSI on at least one surface of the separator. For example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is fluorine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is bromine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is chlorine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is iodine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is fluorine, bromine, and chlorine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is fluorine, bromine, and iodine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is fluorine, chlorine, and iodine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is bromine, chlorine, and iodine, and wherein 3≤A≤6, 2≤B≤5, and 0≤C≤9 at a temperature between 100-280° C. at a pressure of 10-2000 PSI on at least one surface of the separator.

In certain embodiments, provided herein is a method for coating a lithium ion conducting separator electrolyte, the method including: a) providing the separator electrolyte; and b) pressing a composition of A·(LiBH$_4$)·B·(LiX)·C·(LiNH$_2$), where X may be fluorine, bromine, chlorine, iodine, or a combination thereof, and wherein 3≤A≤6, 2≤B≤5, and 0≤C≤9 at a temperature between 100-280° C. at a pressure of 10-2000 PSI on at least one surface of the separator. For example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is fluorine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is bromine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is chlorine, and wherein 3<A<6, 2<B<5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is iodine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is fluorine, bromine, and chlorine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is fluorine, bromine, or iodine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is fluorine, chlorine, or iodine, and wherein 3≤A≤6, 2≤B≤5, and 0≤C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A·(LiBH$_4$)·B·(LiX)·C·(LiNH$_2$), where X is bromine, chlorine, or iodine, and wherein 3≤A≤6, 2≤B≤5, and 0≤C≤9 at a temperature between 100-280° C. at a pressure of 10-2000 PSI on at least one surface of the separator.

In certain embodiments, the temperature in the method is below the melting point (T$_m$) of the separator, and is about 0.8 T$_m$, where T$_m$ is expressed in Kelvin (K). In certain embodiments, the method further includes c) holding the pressure between the composition and the separator for 1-300 min.

In certain embodiments, the method further includes d) cooling the coated lithium ion conducting separator electrolyte under pressure for 10-1000 min. In certain embodiments, the method further includes d) cooling the coated lithium ion conducting separator electrolyte under pressure for 10-1000 min to room temperature. In certain embodiments, provided is a method for coating a lithium ion conducting separator electrolyte, the method including a) providing a lithium-stable separator electrolyte; b) providing a mixture of a solvent and an A·(LiBH$_4$)·B·(LiX)·C·(LiNH$_2$) precursor; and c) depositing the mixture on the separator by spray coating, spin coating, dip coating, slot die coating, gravure coating, or microgravure coating. For example, in one embodiment, provided is a method for coating a lithium ion conducting separator electrolyte, the method including a) providing a lithium-stable separator electrolyte; b) providing a mixture of a solvent and an A·(LiBH$_4$)·B·(LiX)·C·(LiNH$_2$) precursor; and c) depositing the mixture on the separator by spray coating. By way of further example, in one embodiment, provided is a method for coating a lithium ion conducting separator electrolyte, the method including a) providing a lithium-stable separator electrolyte; b) providing a mixture of a solvent and an A·(LiBH$_4$)·B·(LiX)·C·(LiNH$_2$) precursor; and c) depositing the mixture on the separator by spin coating. By way of further example, in one embodiment, provided is a method for coating a lithium ion conducting separator electrolyte, the method including a) providing a lithium-stable separator electrolyte; b) providing a mixture of a solvent and an A·(LiBH$_4$)·B·(LiX)·C·(LiNH$_2$) precursor; and c) depositing the mixture on the separator by dip coating. By way of further example, in one embodiment, provided is a method for coating a lithium ion conducting separator electrolyte, the method including a) providing a lithium-stable separator electrolyte; b) providing a mixture of a solvent and an A·(LiBH$_4$)·B·(LiX)·C·(LiNH$_2$) precursor; and c) depositing the mixture on the separator by slot die coating. By way of further example, in one embodiment, provided is a method for coating a lithium ion conducting separator electrolyte, the method including a) providing a lithium-stable separator electrolyte; b) providing a mixture of a solvent and an A·(LiBH$_4$)·B·(LiX)·C·(LiNH$_2$) precursor; and c) depositing the mixture on the separator by gravure coating. By way of further example, in one embodiment, provided is a method for coating a lithium ion conducting separator electrolyte, the method including a) providing a lithium-stable separator electrolyte; b) providing a mixture of a solvent and an A·(LiBH$_4$)·B·(LiX)·C·(LiNH$_2$) precursor; and c) depositing the mixture on the separator by microgravure coating.

In certain embodiments, the solvent in the method is selected from the group consisting of tetrahydrofuran, diethyl ether, methanol, and ethanol. For example, in one embodiment, the solvent in the method is tetrahydrofuran. By way of further example, in one embodiment, the solvent in the method is diethyl ether. By way of further example, in one embodiment, the solvent in the method is ethanol. By way of further example, in one embodiment, the solvent in the method is methanol.

In certain embodiments, the lithium-stable separator in the method has defects on the surface.

In certain embodiments, provided is a composition including A·(LiBH$_4$)·B·(LiX)·C·(LiNH$_2$), where X is fluorine, bromine, chloride, iodine, or a combination thereof, and wherein 3≤A≤6, 2≤B≤5, and 0≤C≤9 having a XRD pattern characterized by peaks at approximately 14.5°, 15.5°, 16.4° 19.3° and 29.6° 2θ. For example, in one embodiment, provided is a composition including A·(LiBH$_4$)·B·(LiX)·C·(LiNH$_2$), where X is fluorine, and wherein 3≤A≤6, 2≤B≤5, and 0≤C≤9 having a XRD pattern characterized by peaks at approximately 14.5°, 15.5°, 16.4° 19.3° and 29.6° 2θ. By way of further example, in one embodiment, provided is a composition including A·(LiBH$_4$)·B·(LiX)·C·(LiNH$_2$), where X is bromine, and wherein 3≤A≤6, 2≤B≤5, and 0≤C≤9 having a XRD pattern characterized by peaks at approximately 14.5°, 15.5°, 16.4° 19.3° and 29.6° 2θ. By way of further example, in one embodiment, provided is a composition including A·(LiBH$_4$)·B·(LiX)·C·(LiNH$_2$), where X is chloride, and wherein 3≤A≤6, 2≤B≤5, and 0≤C≤9 having a XRD pattern characterized by peaks at approximately 14.5°, 15.5°, 16.4° 19.3° and 29.6° 2θ. By way of further example, in one embodiment, provided is a composition including A·(LiBH$_4$)·B·(LiX)·C·(LiNH$_2$), where X is iodine, and wherein 3≤A≤6, 2≤B≤5, and 0≤C≤9 having a XRD pattern characterized by peaks at approximately 14.5°, 15.5°, 16.4° 19.3° and 29.6° 2θ. By way of further example, in one embodiment, provided is a composition including A·(LiBH$_4$)·B·(LiX)·C·(LiNH$_2$), where X is fluorine, bromine, and chloride, and wherein 3≤A≤6, 2≤B≤5, and 0≤C≤9 having a XRD pattern characterized by peaks at approximately 14.5°, 15.5°, 16.4° 19.3° and 29.6° 2θ. By way of further example, in one embodiment, provided is a composition including A·(LiBH$_4$)·B·(LiX)·C·(LiNH$_2$), where X is fluorine, bromine, and iodine, and wherein 3≤A≤6, 2≤B≤5, and 0≤C≤9 having a XRD pattern characterized by peaks at approximately 14.5°, 15.5°, 16.4° 19.3° and 29.6° 2θ. By way of further example, in one embodiment, provided is a composition including A·(LiBH$_4$)·B·(LiX)·C·(LiNH$_2$), where X is fluorine, chloride, and iodine, and wherein 3≤A≤6, 2≤B≤5, and 0≤C≤9 having a XRD pattern characterized by peaks at approximately 14.5°, 15.5°, 16.4° 19.3° and 29.6° 2θ. By way of further example, in one embodiment, provided is a composition including A·(LiBH$_4$)·B·(LiX)·C·(LiNH$_2$), where X is bromine, chloride, and iodine, and wherein 3≤A≤6, 2≤B≤5, and 0≤C≤9 having a XRD pattern characterized by peaks at approximately 14.5°, 15.5°, 16.4° 19.3° and 29.6° (2θ).

In some examples, including any of the foregoing, the polymeric bonding layer should be as thin as possible, for example, less than 5 μm, less than 2 μm, or less than 1 μm. The bonding layer may be a thin film which is deposited from solution via spray coating, gravure coating, slot die coating, dip coating, spin casting and similar techniques using solutions of DMF, NMP, THF, toluene, acetonitrile, or similar solvents. It may also be deposited from a melt above 50° C. A free standing thin film can also be pressed against the cathode and separator at low temperatures (<120° C.) and pressures (<1000 psi).

In certain embodiments, the molten LBHXN is applied via spin coating. A spin coater with heating capability is used for this embodiment. Powder is first applied on the substrate to be coated. The spin coater is heated to or above the melting point of the LBHXN. After melting, the substrate is rotated at speed of 100-5000 rpm while heat is applied. It is to be understood that the spin speed may correlate strongly with the coating film thickness. After rotation stops, the $2^{nd}$ layer, which could be a solid-state cathode film, or another lithium ion conducting separator (which is the same or a different Li ion conductor than the first substrate) is laminated at a pressure of 10-2000 pounds per square inch (PSI) Heat is optionally applied. After cooling the laminate to room temperature, the substrate, LBHXN and top layer are bonded together very well and cannot be separated without breaking.

In some examples, the substrate may be spin coated at a speed of at least about 100 rpm, 500 rpm, 1000 rpm, 2000 rpm. 3000 rpm, or more.

In some examples, set forth herein is a process of making an electrochemical device, including the following steps: providing a positive electrode includes an electrochemically active material and a solid state catholyte; providing a solid state catholyte includes a sulfide single ion conductor; providing a electrolyte separator includes a lithium-stuffed garnet; providing a bonding layer includes a polymer and a lithium salt; providing a stack wherein the electrolyte separator is between, and contacts, the lithium metal negative electrode and the bonding layer; and the bonding layer is between, and contacts, the electrolyte separator and the positive electrode; and bonding, adhering, or laminating the bonding layer to the positive electrode and the electrolyte separator by pressing against the stack at low temperatures and pressures.

In some examples, the pressure used during formation of a bonding layer, a buffer layer, a positive electrode layer, or any combination thereof, is at least 5000 Pascals, 10 kiloPascals (kPa), 100 kPa, 500 kPa, 1000 kPa, 10,000 kPa, 100,000 kPa, 1 MPa, 10 MPa, or 100 MPa. In some examples, the pressure used during formation of a bonding layer, a buffer layer, a positive electrode layer, or any combination thereof, is at least 1000 kPa, 10,000 kPa, 100,000 kPa, 1 MPa, 10 MPa, or 100 MPa.

In some examples, the pressure used during cycling of an electrochemical cell described herein is performed at more than atmospheric pressure and at a pressure of at least 100 Pascals, 1000 Pascals, 5000 Pascals, 10 kiloPascals (kPa), 100 kPa, 500 kPa, 1000 kPa, 10,000 kPa, 100,000 kPa, 1 MPa, 10 MPa, or 100 MPa.

In some examples, including any of the foregoing, the pressure is less than 1000 PSI. In some examples, including any of the foregoing, the pressure is less than 300 PSI. In some examples, including any of the foregoing, the temperature is less than 180° C. In some examples, including any of the foregoing, the temperature is less than 120° C. In some examples, including any of the foregoing, the process is performed in a clean room. In some examples, including any of the foregoing, the clean room has a Dewpoint less than −20° C., or less than −40° C. In some examples, including any of the foregoing, the clean room is a class 10,000 cleanroom.

In some examples, set forth herein is a process of making an electrochemical device, including, providing a positive electrode includes an electrochemically active material and a solid state catholyte, providing a solid state catholyte includes a sulfide single ion conductor; providing a electrolyte separator includes a lithium-stuffed garnet; providing a bonding layer includes a polymer and a lithium salt; providing a stack wherein the electrolyte separator contacts the bonding layer; and the bonding layer is between, and contacts, the electrolyte separator and the positive electrode; and bonding, adhering, or laminating the bonding layer to the positive electrode and the electrolyte separator by pressing against the stack at low temperatures and pressures.

In some examples, including any of the foregoing, the pressure is less than 1000 PSI. In some examples, including any of the foregoing, the pressure is less than 300 PSI.

In some examples, including any of the foregoing, the temperature is less than 180° C. In some examples, including any of the foregoing, the temperature is less than 120° C.

In some examples, including any of the foregoing, the process is performed in a clean room. In some examples, including any of the foregoing, the clean room has a Dewpoint less than −20° C., or less than −40° C. In some examples, including any of the foregoing, the clean room class 10,000 cleanroom or better.

In some examples, the borohydride bonding layer is heated to a temperature to which it melts or partially melts during processing to form an intimate contact with both the lithium-stuffed garnet layer and the buffer layer in contact with the positive electrode.

In some examples, the borohydride bonding layer melts or partially melts during processing to form an intimate contact with both the lithium-stuffed garnet layer and the positive electrode with a buffer mixed therein.

In some examples, set forth herein are multiple layers of bonding layers. In some examples, set forth herein are multiple layers of "oxide-sulfide interfacial layer," i.e., multiple bonding layers. In some examples, these bonding layers are kinetically stable to both oxide or sulfides. In some examples, these bonding layers promote or maintains oxide-sulfide interfacial contact. In some examples, these bonding layers fill in the gap between oxide and sulfide which improves ionic conductivity therebetween.

In some examples, the borohydride bonding layer is spin coated onto lithium-stuffed garnet layers, i.e., shields, the high voltage positive electrode. In some examples, the borohydride bonding layer is melt casted onto lithium-stuffed garnet layers. In some examples, the borohydride bonding layer is melt casted onto lithium-stuffed garnet layers.

In some examples, set forth herein is a process for producing a solid-state electrochemical stack including: (a) casting a first slurry including a sulfide solid electrolyte powder onto a first substrate to form a first layer; (b) casting a second slurry including a sulfide solid electrolyte powder and a positive electrode active powder onto a second substrate to form a second layer; and (c) calendering the first layer and the second layer, wherein the first layer and second layer are in contact with each other.

In one group of embodiments, prior to step (a), the process includes providing a first substrate. In such instances, prior to step (a), the process includes providing a first slurry including a sulfide solid electrolyte powder. In such instances, prior to step (b), the process includes providing a second substrate. In such instances, prior to step (b), the process includes providing a second slurry including a sulfide solid electrolyte powder and a positive electrode active powder. In some instances the process includes step (f) contacting the second layer and the first layer.

Additional Embodiments

In an embodiment, set forth herein is a solid-state electrochemical stack comprising: (a) a positive electrode layer comprising a positive electrode active material, and a sulfide catholyte, wherein the positive electrode layer has a porosity less than 15% by volume (v/v); (b) a buffer layer comprising a sulfide electrolyte in contact with the positive electrode layer, wherein the buffer layer has a porosity less than 15% v/v; and (c) a separator layer comprising a member selected from the group consisting of lithium-stuffed garnet and LPSX, wherein the separator layer has a porosity less than 10% v/v; and wherein the buffer layer is between the positive electrode layer and the separator layer.

In some embodiments, including any of the foregoing, the sulfide catholyte and sulfide electrolyte are solids.

In some embodiments, including any of the foregoing, the buffer layer substantially covers the positive electrode layer.

In some embodiments, including any of the foregoing, the buffer layer covers the positive electrode layer.

In some embodiments, including any of the foregoing, the buffer layer is uniformly dense.

In some embodiments, including any of the foregoing, the buffer layer is uniformly thick.

In some embodiments, including any of the foregoing, the buffer layer is in direct contact with the positive electrode layer and the separator layer.

In some embodiments, including any of the foregoing, a bonding layer is between and in direct contact with the buffer layer and the separator layer.

In some embodiments, including any of the foregoing, the sulfide catholyte is a sulfide single ion conductor.

In some embodiments, including any of the foregoing, the sulfide catholyte is an electrolyte comprising lithium (Li), phosphorus (P), and sulfur (S).

In some embodiments, including any of the foregoing, the catholyte comprises iodine (I).

In some embodiments, including any of the foregoing, the catholyte comprises chlorine (Cl), bromine (Br), iodine (I), or a combination thereof.

In some embodiments, including any of the foregoing, the catholyte comprises a member selected from the group consisting of tin (Sn), germanium (Ge), arsenic (As), silicon (Si), and a combination thereof.

In some embodiments, including any of the foregoing, the sulfide catholyte is selected from LPSI, LSTPS, LSPSCl, LBHI and LPS.

In some embodiments, including any of the foregoing, the sulfide catholyte is LSTPS.

In some embodiments, including any of the foregoing, the sulfide catholyte is LPSI.

In some embodiments, including any of the foregoing, the sulfide electrolyte is a sulfide single ion conductor.

In some embodiments, including any of the foregoing, the positive electrode layer comprising a positive electrode active material at a mass loading of about 75-about 90% by mass.

In some embodiments, including any of the foregoing, the positive electrode active material comprises a lithium intercalation material, a lithium conversion material, or both a lithium intercalation material and a lithium conversion material.

In some embodiments, including any of the foregoing, the positive electrode active material comprises a lithium intercalation material; and wherein the intercalation material is selected from the group consisting of a nickel manganese cobalt oxide (NMC), a nickel cobalt aluminum oxide (NCA), Li(NiCoAl)O$_2$, a lithium cobalt oxide (LCO), a lithium manganese cobalt oxide (LMCO), a lithium nickel manganese cobalt oxide (LMNCO), a lithium nickel manganese oxide (LNMO), Li(NiCoMn)O$_2$, LiMn$_2$O$_4$, LiCoO$_2$, and LiMn$_{2-a}$Ni$_a$O$_4$, wherein a is from 0 to 2, or LiMPO$_4$, wherein M is Fe, Ni, Co, or Mn.

In some embodiments, including any of the foregoing, the positive electrode active material comprises a lithium conversion material; and wherein the lithium conversion material is selected from the group consisting of FeF$_2$, NiF$_2$, FeO$_x$F$_{3-2x}$, FeF$_3$, MnF$_3$, CoF$_3$, CuF$_2$ materials, alloys thereof, and combinations thereof.

In some embodiments, including any of the foregoing, the intercalation material is NCA.

In some embodiments, including any of the foregoing, the intercalation material is NMC.

In some embodiments, including any of the foregoing, the solid-state electrochemical stack further comprises a bonding layer.

In some embodiments, including any of the foregoing, the bonding layer comprises a borohydride composition.

In some embodiments, including any of the foregoing, the buffer layer is between and in direct contact with the positive electrode layer and a borohydride layer, wherein the borohydride layer is between and in direct contact with the buffer layer and the separator layer.

In some embodiments, including any of the foregoing, the borohydride composition is represented by the following formula:

A·(LiBH$_4$)·B·(LiX)·C·(LiNH$_2$), wherein X is selected from fluorine (F), bromine (Br), chloride (CO, iodine (I), and a combination thereof, wherein $3 \leq A \leq 6$, $2 \leq B \leq 5$, and $0 \leq C \leq 9$.

In some embodiments, including any of the foregoing, the borohydride composition is represented by the following formula: A·(LiBH$_4$)·B·(LiX)·C·(LiNH$_2$), wherein X is selected from fluorine (F), bromine (Br), chloride (Cl), iodine (I), and a combination thereof, wherein $3 \leq A \leq 6$, $2 \leq B \leq 5$, and $3 \leq C \leq 9$.

In some embodiments, including any of the foregoing, the borohydride composition is represented by the following formula: A·(LiBH$_4$)·B·(LiX)·C·(LiNH$_2$), wherein X is selected from fluorine (F), bromine (Br), chloride (Cl), iodine (I), and a combination thereof, wherein $3 \leq A \leq 6$, $2 \leq B \leq 5$, and $3 \leq C \leq 6$.

In some embodiments, including any of the foregoing, the borohydride composition is selected from one of the following formula: 3LiBH$_4$·2LiI·3LiNH$_2$ or 3LiBH$_4$·4LiI·9LiNH$_2$.

In some embodiments, including any of the foregoing, the bonding layer further comprises LiI, LPS, LXPS, Li$_3$PO$_4$, or a combination thereof.

In some embodiments, including any of the foregoing, the solid-state electrochemical stack comprises (d) a negative electrode current collector in direct contact with the separator layer.

In some embodiments, including any of the foregoing, the solid-state electrochemical stack comprises (e) a positive electrode current collector in direct contact with the positive electrode layer.

In some embodiments, including any of the foregoing, the solid-state electrochemical stack comprises (d) a negative electrode current collector and (e) a negative electrode, wherein the (e) negative electrode is between and in direct contact with the separator layer and the negative electrode current collector.

In some embodiments, including any of the foregoing, the negative electrode is a lithium (Li) metal electrode layer In some embodiments, including any of the foregoing, at least one current collector comprises a material selected from the group consisting of carbon (C)-coated nickel (Ni), nickel (Ni), copper (Cu), aluminum (Al), stainless steel, alloys thereof, and combinations thereof.

In some embodiments, including any of the foregoing, the negative electrode current collector comprises a material selected from the group consisting of carbon (C)-coated nickel (Ni), nickel (Ni), copper (Cu), alloys thereof, and combinations thereof.

In some embodiments, including any of the foregoing, the positive electrode current collector layer comprises a material selected from the group consisting of carbon (C)-coated aluminum and aluminum.

In some embodiments, including any of the foregoing, negative electrode current collector layer is C-coated Ni.

In some embodiments, including any of the foregoing, the separator layer is rectangular shaped.

In some embodiments, including any of the foregoing, the positive electrode layer is rectangular shaped.

In some embodiments, including any of the foregoing, the separator layer is circular shaped.

In some embodiments, including any of the foregoing, the geometric surface area of the positive electrode layer and the geometric surface area separator layer are substantially the same.

In some embodiments, including any of the foregoing, one edge of the positive electrode layer is 2 cm-30 cm in length.

In some embodiments, including any of the foregoing, one edge of the separator layer is 2 cm-30 cm in length.

In some embodiments, including any of the foregoing, the positive electrode layer has a diameter that is 10 cm in length.

In some embodiments, including any of the foregoing, the separator layer has a diameter that is 10 cm in length.

In some embodiments, including any of the foregoing, the positive electrode layer comprises a percolating network of ion conductors.

In some embodiments, including any of the foregoing, the separator layer comprises a percolating network of ion conductors.

In some embodiments, including any of the foregoing, the separator layer comprises a polymer.

In some embodiments, including any of the foregoing, the positive electrode layer comprises a carbon at a mass loading of about 0 to about 1%.

In some embodiments, including any of the foregoing, the carbon at a mass loading of about 0 to about 1% is C65 or vapor-grown carbon fibers (VGCF).

In some embodiments, including any of the foregoing, the positive electrode layer comprises a binder at a mass loading of about 0 to about 2.5%.

In some embodiments, including any of the foregoing, the binder at a mass loading of about 0 to about 2.5% comprises a binder selected from the group consisting of polyacrylonitrile (PAN), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxy)ethyl glycidyl ether (PEO-MEEGE), polyethylene oxide 2-methoxyethoxy)ethyl glycidyl poly (allyl glycidyl ether) (PEO-MEEGE-AGE), polysiloxane, polyvinylidene fluoride (PVDF), polyvinylidene fluoride hexafluoropropylene (PVDF-HFP), ethylene propylene (EPR), nitrile rubber (NPR), styrene-butadiene-rubber (SBR), polybutadiene polymer, polybutadiene rubber (PB), polyisobutadiene rubber (PIB), polyolefin, alpha-polyolefin, an alpha-olefin, ethylene alpha-polyolefin, polyisoprene rubber (PI), polychloroprene rubber (CR), acrylonitrile-butadiene rubber (NBR), polyethyl acrylate (PEA), polyvinylidene fluoride (PVDF), polyethylene, POB3, a polyolefin, a rubber, or a combination thereof.

In some embodiments, including any of the foregoing, the thickness of the positive electrode layer is from about 10 μm to about 500 μm.

In some embodiments, including any of the foregoing, the thickness of the positive electrode layer is from 100 μm to about 500 μm.

In some embodiments, including any of the foregoing, the thickness of the separator layer is from about 1 μm to about 200 μm.

In some embodiments, including any of the foregoing, the thickness of the positive electrode current collector layer is from about 3 μm to about 100 μm.

In some embodiments, including any of the foregoing, the thickness of the positive electrode current collector layer is about 15 μm.

In some embodiments, including any of the foregoing, the thickness of the negative electrode current collector layer is from about 3 μm to about 100 μm.

In some embodiments, including any of the foregoing, the thickness of the positive electrode current collector layer is about 15 μm.

In some embodiments, including any of the foregoing, the thickness of the tabs on the positive electrode current collector or negative electrode current collector is from about 5 μm to about 100 μm.

In some embodiments, including any of the foregoing, the positive electrode layer has a porosity less than 1% v/v.

In some embodiments, including any of the foregoing, the buffer layer has a porosity less than 1% v/v.

In some embodiments, including any of the foregoing, the positive electrode layer has a porosity of at least 0.01% v/v.

In some embodiments, including any of the foregoing, the buffer layer has a porosity of at least 0.01% v/v.

In some embodiments, including any of the foregoing, the separator layer comprises lithium-stuffed garnet having the empirical formula $Li_7La_3Zr_2O_{12}\cdot xAl_2O_3$, wherein x is a rational number and $0 \leq x \leq 1$.

In some embodiments, including any of the foregoing, the separator layer comprises lithium-stuffed garnet oxide characterized by the formula $Li_uLa_vZr_xO_y\cdot zAl2O3$, wherein u is a rational number from 4 to 8; v is a rational number from 2 to 4; x is a rational number from 1 to 3; y is a rational number from 10 to 14; and z is a rational number from 0.05 to 1; wherein u, v, x, y, and z are selected so that the lithium-stuffed garnet oxide is charge neutral.

In some embodiments, including any of the foregoing, the separator layer comprises $Li_xLa_yZr_zO_t\cdot qAl_2O_3$, wherein $4<x<10$, $1<y<4$, $1<z<3$, $6<t<14$, and $0 \leq q \leq 1$.

In some embodiments, including any of the foregoing, the separator layer comprises $Li_7La_3Zr_2O_{12}\cdot Al_2O_3$ or $Li_7La_3Zr_2O_{12}\cdot 0.35Al_2O_3$.

In some embodiments, including any of the foregoing, the lithium-stuffed garnet is doped with Nb, Ga, and/or Ta.

In another embodiment, set forth herein is a solid-state electrochemical cell (SSEC), comprising: (a) a positive electrode layer comprising an active material and a sulfide catholyte; (b) a single ion conducting, solid-state buffer; (c) a borohydride bonding layer; and (d) a lithium-stuffed garnet layer; wherein the buffer is mixed within the positive electrode layer, or is a layer in contact with the positive electrode layer, or both; wherein the borohydride bonding layer is between and in contact with the lithium-stuffed garnet layer and either (i) the positive electrode layer with a buffer mixed therein or (ii) a buffer layer in contact with the positive electrode.

In some embodiments, including any of the foregoing, the single ion conducting, solid-state buffer is mixed within the positive electrode layer.

In some embodiments, including any of the foregoing, the single ion conducting, solid-state buffer is a layer in contact with the positive electrode layer.

In some embodiments, including any of the foregoing, the single ion conducting, solid-state buffer is mixed within the positive electrode layer and is present as a layer in contact with the positive electrode layer.

In some embodiments, including any of the foregoing, the single ion conducting, solid-state buffer layer prevents direct contact between the borohydride bonding layer and the positive electrode layer.

In some embodiments, including any of the foregoing, the thickness of the positive electrode layer is from about 100 µm to about 1000 µm.

In some embodiments, including any of the foregoing, the thickness of the buffer layer is from about 0.5 µm to about 50 µm.

In some embodiments, including any of the foregoing, the single ion conducting, solid-state buffer is mixed within the positive electrode layer to a depth of penetration within the positive electrode layer from about 1 µm to about 50 µm from the edge where the positive electrode layer interfaces with either the buffer layer or the borohydride bonding layer.

In some embodiments, including any of the foregoing, the thickness of the lithium-stuffed garnet layer is from about 1 µm to about 200 µm.

In some embodiments, including any of the foregoing, the thickness of the borohydride bonding layer is from about 0.5 µm to about 50 µm.

In some embodiments, including any of the foregoing, the borohydride bonding layer penetrates into the buffer layer.

In some embodiments, including any of the foregoing, the borohydride bonding layer penetrates into the lithium-stuffed garnet layer.

In some embodiments, including any of the foregoing, the borohydride bonding layer has a density of 90% or above of the raw material density.

In some embodiments, including any of the foregoing, the borohydride bonding layer has less than 10% porosity by volume.

In some embodiments, including any of the foregoing, the borohydride bonding layer has a melting point below 250° C.

In some embodiments, including any of the foregoing, the borohydride bonding layer has a melting point above 250° C.

In some embodiments, including any of the foregoing, the solid-state electrochemical stack comprises a negative electrode.

In some embodiments, including any of the foregoing, the negative electrode is a lithium (Li) metal negative electrode.

In some embodiments, including any of the foregoing, the lithium-stuffed garnet layer contacts the negative electrode.

In some embodiments, including any of the foregoing, the buffer layer comprises a binder at 0.01 to 10% by weight, The SSEC of embodiment 120, wherein the binder is a polymer and does not conduct electrons or Li$^+$ ions.

In some embodiments, including any of the foregoing, the buffer layer comprises an organic polymer at 10% by volume or less.

In some embodiments, including any of the foregoing, the polymer is selected from the group consisting of polyacrylonitrile (PAN), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxy)ethyl glycidyl ether (PEO-MEEGE), polyethylene oxide 2-methoxyethoxy)ethyl glycidyl poly (allyl glycidyl ether) (PEO-MEEGE-AGE), polysiloxane, polyvinylidene fluoride (PVDF), ethylene alpha-olefin copolymer, polyvinylidene fluoride hexafluoropropylene (PVDF-HFP), ethylene propylene (EPR), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), polyvinylidene fluoride (PVDF), and polyethylene.

In some embodiments, including any of the foregoing, the buffer layer or buffer component does not include an organic polymer.

In some embodiments, including any of the foregoing, the positive electrode potential is shielded from the lithium-stuffed garnet layer potential.

In some embodiments, including any of the foregoing, the active material potential in the positive electrode is shielded from the lithium-stuffed garnet layer potential.

In some embodiments, including any of the foregoing, the active material is coated.

In some embodiments, including any of the foregoing, the active material is coated with a coating selected from the group consisting of lithium niobium oxide, lithium zirconium oxide, lithium aluminum oxide, lithium tantalum oxide, lithium hafnium oxide, niobium oxide, zirconium oxide, aluminum oxide, tantalum oxide, and hafnium oxide.

In some embodiments, including any of the foregoing, the active material is uncoated.

In some embodiments, including any of the foregoing, the positive electrode comprises a lithium intercalation material, a lithium conversion material, or both a lithium intercalation material and a lithium conversion material.

In some embodiments, including any of the foregoing, the intercalation material is selected from the group consisting of a nickel manganese cobalt oxide (NMC), a nickel cobalt aluminum oxide (NCA), Li(NiCoAl)O$_2$, a lithium cobalt oxide (LCO), a lithium manganese cobalt oxide (LMCO), a lithium nickel manganese cobalt oxide (LMNCO), a lithium nickel manganese oxide (LNMO), Li(NiCoMn)O$_2$, LiMn$_2$O$_4$, LiCoO$_2$, and LiMn$_{2-a}$NiaO$_4$, wherein a is from 0 to 2, or LiMPO$_4$, wherein M is Fe, Ni, Co, or Mn.

In some embodiments, including any of the foregoing, the lithium conversion material is selected from the group consisting of FeF$_2$, NiF$_2$, FeOxF$_{3-2x}$, FeF$_3$, MnF$_3$, CoF$_3$, CuF$_2$ materials, alloys thereof, and combinations thereof.

In some embodiments, including any of the foregoing, the sulfide catholyte and the single ion conducting, solid-state buffer comprise the same type of material.

In some embodiments, including any of the foregoing, sulfide catholyte or the single ion conducting, solid-state buffer, or both, are selected from the group consisting of LSS, SLOPS, LSTPS, LSTPSCl, SLOBS, LATS, and LPS+X, wherein X is selected from the group consisting of Cl, I, Br, and combinations thereof.

In some embodiments, including any of the foregoing, sulfide catholyte or the single ion conducting, solid-state buffer, or both, are selected from the group consisting of LPSI, LXPS, LSTPS, LSPSCl, LPSCl, LSPSBr, and LPSBr.

In some embodiments, including any of the foregoing, sulfide catholyte or the single ion conducting, solid-state buffer, or both, are selected from $x \cdot Li_2S:y \cdot SiS_2$, wherein x and y are each independently a number from 0 to 1, and wherein x+y=1.

In some embodiments, including any of the foregoing, the sulfide catholyte or the single ion conducting, solid-state buffer, or both, are selected from the group consisting of LSS, LGPS, LSTPS, and LSPS.

In some embodiments, including any of the foregoing, the sulfide catholyte or the single ion conducting, solid-state buffer, or both, are characterized by one of the following formula: $Li_aSi_bSn_cP_dS_e$, wherein $2 \leq a \leq 8$, $0 \leq b \leq 1$, $0 \leq c \leq 1$, $0.5 \leq d \leq 2.5$, and $2 \leq e \leq 12$; $Li_aSi_bP_cS_dX_e$, wherein $8 < a < 12$, $1 < b < 3$, $1 < c < 3$, $8 < d < 14$, and $0 < e < 1$, wherein X is F, Cl, Br, or I; $Li_gAs_hSn_jS_kO_l$, wherein $2 \leq g \leq 6$, $0 \leq h \leq 1$, $0 \leq j \leq 1$, $2 \leq k \leq 6$, and $0 \leq l \leq 10$; or $Li_mP_nS_pI_q$, wherein $2 \leq m \leq 6$, $0 \leq n \leq 1$, $0 \leq p \leq 1$, $2 \leq q \leq 6$; a mixture of $(Li_2S):(P_2S_5)$ having a molar ratio of $Li_2S:P_2S_5$ from about 10:1 to about 6:4 and LiI, wherein the ratio of $[(Li_2S):(P_2S_5)]:LiI$ is from 95:5 to 50:50; LPS+X, wherein X is selected from Cl, I, or Br; $vLi_2S+wP_2S_5+yLiX$; $vLi_2S+wSiS_2+yLiX$; or $vLi_2S+wB_2S_3+yLiX$.

In some embodiments, including any of the foregoing, the sulfide catholyte comprises LSTPS.

In some embodiments, including any of the foregoing, the sulfide catholyte is characterized by the following formula: $Li_aSi_bSn_cP_dS_e$, wherein $2 \leq a \leq 8$, $0 \leq b \leq 1$, $0 \leq c \leq 1$, $0.5 \leq d \leq 2.5$, and $2 \leq e \leq 12$.

In some embodiments, including any of the foregoing, the sulfide catholyte is characterized by the following formula: $Li_aSi_bSn_cP_dS_e$, wherein $2 \leq a \leq 5$, $0 \leq b \leq 0.5$, $0 \leq c \leq 0.5$, $0.5 \leq d \leq 2$, and $2 \leq e \leq 12$.

In some embodiments, including any of the foregoing, the single ion conducting, solid-state buffer comprises LSTPS.

In some embodiments, including any of the foregoing, the borohydride bonding layer comprises a lithium borohydride, a sodium borohydride, or a potassium borohydride.

In some embodiments, including any of the foregoing, the lithium borohydride, sodium borohydride, or potassium borohydride is doped with $LiNH_2$.

In some embodiments, including any of the foregoing, any one or more of the lithium borohydride, sodium borohydride, or potassium borohydride is doped with LiI.

In some embodiments, including any of the foregoing, any one or more of the lithium borohydride, sodium borohydride, or potassium borohydride is doped with $LiNH_2$ and LiI.

In some embodiments, including any of the foregoing, the borohydride bonding layer comprises a borohydride composition comprising $A(LiBH_4)(1-A)(P_2S_5)$, wherein $0.05 \leq A \leq 0.95$.

In some embodiments, including any of the foregoing, $0.5 < A < 0.95$.

In some embodiments, including any of the foregoing, A is 0.85, 0.9, or 9.95.

In some embodiments, including any of the foregoing, the borohydride bonding layer comprises $0.9(LiBH_4)0.1(P_2S_5)$.

In some embodiments, including any of the foregoing, the borohydride bonding layer comprises a borohydride composition comprising: $A \cdot (LiBH_4) \cdot B \cdot (LiX) \cdot C(LiNH_2)$, wherein X is fluorine, bromine, chlorine, iodine, or a combination thereof, and wherein $3 \leq A \leq 6$, $2 \leq B \leq 5$, and $0 \leq C \leq 9$.

In some embodiments, including any of the foregoing, $3 \leq A \leq 6$, $2 \leq B \leq 5$, and $3 \leq C \leq 9$.

In some embodiments, including any of the foregoing, the X is bromine, chlorine, iodine, or a combination thereof.

In some embodiments, including any of the foregoing, X is chlorine.

In some embodiments, including any of the foregoing, X is bromine.

In some embodiments, including any of the foregoing, X is iodine.

In some embodiments, including any of the foregoing, $3 \leq A \leq 6$, $3 \leq B \leq 5$, and $3 \leq C \leq 9$ In some embodiments, including any of the foregoing, $4 \leq A \leq 6$, $4 \leq B \leq 5$, and $4 \leq C \leq 6$ In some embodiments, including any of the foregoing, the borohydride bonding layer comprises a borohydride composition, wherein the composition is $3LiBH_4 \cdot 2LiCl \cdot 3LiNH_2$ or $3LiBH_4 \cdot 4LiCl \cdot 9LiNH_2$.

In some embodiments, including any of the foregoing, the borohydride bonding layer comprises a borohydride composition, wherein the composition is $3LiBH_4 \cdot 2LiBr \cdot 3LiNH_2$ or $3LiBH_4 \cdot 4LiBr \cdot 9LiNH_2$.

In some embodiments, including any of the foregoing, the borohydride bonding layer comprises a borohydride composition, wherein the composition is $3LiBH_4 \cdot 2LiI \cdot 3LiNH_2$ or $3LiBH_4 \cdot 4LiI \cdot 9LiNH_2$.

In some embodiments, including any of the foregoing, the borohydride bonding layer comprises a borohydride composition selected from LBHIN and LBHN.

In some embodiments, including any of the foregoing, the borohydride bonding layer comprises $KBH_4+LiNH_2$.

In some embodiments, including any of the foregoing, the borohydride bonding layer is amorphous.

In some embodiments, including any of the foregoing, the borohydride bonding layer is semi-crystalline.

In some embodiments, including any of the foregoing, the borohydride bonding layer is polycrystalline.

In some embodiments, including any of the foregoing, the lithium-stuffed garnet layer comprises a lithium-stuffed garnet selected from $Li_xLa_yZr_zO_t \cdot qAl_2O_3$, wherein $4 < x < 10$, $1 < y < 4$, $1 < z < 3$, $6 < t < 14$, and $0 \leq q \leq 1$.

In some embodiments, including any of the foregoing, the lithium-stuffed garnet layer comprises a lithium-stuffed garnet selected from $Li_7La_3Zr_2O_{12} \cdot Al_2O_3$ and $Li_7La_3Zr_2O_{12} \cdot 0.35Al_2O_3$.

In some embodiments, including any of the foregoing, the lithium-stuffed garnet is doped with Nb, Ga, and/or Ta.

In some embodiments, including any of the foregoing, the lithium-stuffed garnet layer comprises a lithium-stuffed garnet characterized by the formula $Li_aLa_bZr_cAl_dMe''_eO_f$, wherein $5 < a < 8.5$; $2 < b < 4$; $0 \leq c \leq 2.5$; $0 \leq d < 2$; $0 \leq e < 2$, and $10 < f < 13$ and Me" is a metal selected from the group consisting of Nb, Ga, Ta, and combinations thereof.

In some embodiments, including any of the foregoing, the lithium-stuffed garnet layer comprises a lithium-stuffed garnet oxide characterized by the formula $Li_uLa_vZr_xO_y \cdot zAl_2O_3$, wherein u is a rational number from 4 to 8; v is a rational number from 2 to 4; x is a rational number from 1 to 3; y is a rational number from 10 to 14; and z is a rational number from 0.05 to 1; wherein u, v, x, y, and z are selected so that the lithium-stuffed garnet oxide is charge neutral. In some embodiments, including any of the foregoing, the lithium-stuffed garnet layer comprises a lithium-stuffed garnet oxide characterized by the formula $Li_uLa_vZr_xO_y \cdot zTa_2O_5$, wherein u is a rational number from 4 to 10; v is a rational number from 2 to 4; x is a rational number from 1 to 3; y is a rational number from 10 to 14; and z is a rational number from 0 to 1; wherein u, v, x, y, and z are selected so that the lithium-stuffed garnet oxide is charge neutral.

In some embodiments, including any of the foregoing, the lithium-stuffed garnet layer comprises a lithium-stuffed garnet oxide characterized by the formula $Li_uLa_vZr_xO_y \cdot zNb_2O_5$, wherein u is a rational number from 4 to 10; v is a rational number from 2 to 4; x is a rational number from 1 to 3; y is a rational number from 10 to 14; and z is a rational number from 0 to 1; wherein u, v, x, y, and z are selected so that the lithium-stuffed garnet oxide is charge neutral.

In some embodiments, including any of the foregoing, the lithium-stuffed garnet layer comprises a lithium-stuffed garnet oxide characterized by the formula $Li_uLa_vZr_xO_y \cdot zGa_2O_3$, wherein u is a rational number from 4 to 10; v is a rational number from 2 to 4; x is a rational number from 1 to 3; y is a rational number from 10 to 14; and z is a rational number from 0 to 1; wherein u, v, x, y, and z are selected so that the lithium-stuffed garnet oxide is charge neutral.

In some embodiments, including any of the foregoing, the lithium-stuffed garnet layer comprises a lithium-stuffed garnet oxide characterized by the formula $Li_uLa_vZr_xO_y \cdot zTa_2O_5 \cdot bAl_2O_3$, wherein u is a rational number from 4 to 10; v is a rational number from 2 to 4; x is a rational number from 1 to 3; y is a rational number from 10 to 14; z is a rational number from 0 to 1; b is a rational number from 0 to 1; wherein z+b<1; and u, v, x, y, and z are selected so that the lithium-stuffed garnet oxide is charge neutral.

In some embodiments, including any of the foregoing, the lithium-stuffed garnet layer comprises a lithium-stuffed garnet oxide characterized by the formula $Li_uLa_vZr_xO_y \cdot zNb_2O_5 \cdot bAl_2O_3$, wherein u is a rational number from 4 to 10; v is a rational number from 2 to 4; x is a rational number from 1 to 3; y is a rational number from 10 to 14; z is a rational number from 0 to 1; b is a rational number from 0 to 1; wherein z+b<1; and u, v, x, y, and z are selected so that the lithium-stuffed garnet oxide is charge neutral.

In some embodiments, including any of the foregoing, the lithium-stuffed garnet layer comprises a lithium-stuffed garnet oxide characterized by the formula $Li_uLa_vZr_xO_y \cdot zGa_2O_3 \cdot bAl_2O_3$, wherein u is a rational number from 4 to 10; v is a rational number from 2 to 4; x is a rational number from 1 to 3; y is a rational number from 10 to 14; and z is a rational number from 0 to 1; b is a rational number from 0 to 1; wherein z+b<1; and u, v, x, y, and z are selected so that the lithium-stuffed garnet oxide is charge neutral.

In some embodiments, including any of the foregoing, the lithium-stuffed garnet layer comprises a lithium-stuffed garnet characterized by the formula $Li_{6.4}Ga_{0.2}La_3Zr_2O_{12}$.

In some embodiments, including any of the foregoing, the SSEC comprises a positive electrode current collector layer.

In some embodiments, including any of the foregoing, the SSEC comprises a negative electrode current collector layer.

In some embodiments, including any of the foregoing, the negative electrode current collector layer is a sintered metal.

In some embodiments, including any of the foregoing, the sintered metal is selected from the group consisting of Al, Cu, Ni, Ag, Au, Pt, Pd, or Sn.

In some embodiments, including any of the foregoing, the metal is Ni.

In some embodiments, including any of the foregoing, the positive electrode layer further comprises a binder, carbon, or both binder and carbon In some embodiments, including any of the foregoing, the lithium-stuffed garnet layer is between and in contact with the negative current collector layer and the borohydride bonding layer.

In some embodiments, including any of the foregoing, the borohydride bonding layer is between and in contact with the lithium-stuffed garnet layer and the buffer layer.

In some embodiments, including any of the foregoing, the buffer layer is between and in contact with the borohydride bonding layer and the positive electrode layer.

In some embodiments, including any of the foregoing, the positive electrode layer is between and in contact with the buffer layer and the positive electrode current collector layer In some embodiments, including any of the foregoing, the negative electrode layer is between and in contact with the lithium-stuffed garnet layer and the negative electrode current collector layer.

In an embodiment, set forth herein is a battery comprising the SSEC of any one of embodiments set forth herein.

In an embodiment, set forth herein is an electric vehicle comprising the battery of any one of the embodiments set forth herein.

In an embodiment, set forth herein is a method of making an electrochemical cell: providing a slurry comprising an active material, a catholyte, and a solvent; depositing the slurry onto a current collector; drying the slurry; providing a second slurry comprising a single ion conducting, solid-state buffer; depositing the second slurry onto a substrate; drying the second slurry; transferring the dried second slurry onto the first slurry once dried to form a stack; applying pressure and heat to the stack; providing a solid-state separator; depositing a borohydride layer onto the solid-state separator; combining the stack with the solid-state separator having a borohydride layer thereupon to form an electrochemical cell stack; and applying pressure and heat to the cell stack.

In some embodiments, including any of the foregoing, the solid loading is at least 60 wt %.

In some embodiments, including any of the foregoing, the buffer is LSTPS.

In some embodiments, including any of the foregoing, pressure is applied uniaxially In an embodiment, set forth herein is a dual layer stack comprising: (a) a positive electrode layer comprising an active material and a sulfide catholyte; and (b) a single ion conducting, solid-state buffer; wherein the buffer is mixed within the positive electrode layer, or is a layer in contact with the positive electrode layer, or both.

In some embodiments, including any of the foregoing, the single ion conducting, solid-state buffer is mixed within the positive electrode layer.

In some embodiments, including any of the foregoing, the single ion conducting, solid-state buffer is a layer in contact with the positive electrode layer.

In some embodiments, including any of the foregoing, the single ion conducting, solid-state buffer is mixed within the positive electrode layer and is present as a layer in contact with the positive electrode layer.

In some embodiments, including any of the foregoing, the buffer is mixed within the positive electrode layer to a depth of penetration within the positive electrode layer from about 1 μm to about 50 μm from the edge where the positive electrode layer interfaces with either the buffer layer or the borohydride bonding layer.

In some embodiments, including any of the foregoing, the thickness of the lithium-stuffed garnet layer is from about 1 μm to about 200 μm.

In some embodiments, including any of the foregoing, the buffer layer comprises an organic polymer at 10% by volume or less.

In some embodiments, including any of the foregoing, the polymer is selected from the group consisting of polyacrylonitrile (PAN), polypropylene, polyethylene oxide (PEO), polymethyl methacrylate (PMMA), polyvinyl chloride (PVC), polyvinyl pyrrolidone (PVP), polyethylene oxide poly(allyl glycidyl ether) PEO-AGE, polyethylene oxide 2-methoxyethoxy)ethyl glycidyl ether (PEO-MEEGE), polyethylene oxide 2-methoxyethoxy)ethyl glycidyl poly (allyl glycidyl ether) (PEO-MEEGE-AGE), polysiloxane, polyvinylidene fluoride (PVDF), ethylene alpha-olefin copolymer, polyvinylidene fluoride hexafluoropropylene (PVDF-HFP), ethylene propylene (EPR), nitrile rubber (NPR), styrene-butadiene-rubber (SBR), polybutadiene polymer, polybutadiene rubber (PB), polyisobutadiene rubber (PIB), polyisoprene rubber (PI), polychloroprene rubber (CR), acrylonitrile-butadiene rubber (NBR), polyethyl acrylate (PEA), polyvinylidene fluoride (PVDF), and polyethylene.

In some embodiments, including any of the foregoing, the active material is coated.

In some embodiments, including any of the foregoing, the active material is coated with a coating selected from the group consisting of lithium niobium oxide, lithium zirconium oxide, lithium aluminum oxide, lithium tantalum oxide, lithium hafnium oxide, niobium oxide, zirconium oxide, aluminum oxide, tantalum oxide, and hafnium oxide.

In some embodiments, including any of the foregoing, the active material is uncoated.

In some embodiments, including any of the foregoing, the positive electrode comprises a lithium intercalation material, a lithium conversion material, or both a lithium intercalation material and a lithium conversion material.

In some embodiments, including any of the foregoing, the intercalation material is selected from the group consisting of a nickel manganese cobalt oxide (NMC), a nickel cobalt aluminum oxide (NCA), $Li(NiCoAl)O_2$, a lithium cobalt oxide (LCO), a lithium manganese cobalt oxide (LMCO), a lithium nickel manganese cobalt oxide (LMNCO), a lithium nickel manganese oxide (LNMO), $Li(NiCoMn)O_2$, $LiMn_2O_4$, $LiCoO_2$, and $LiMn_2\text{-}aNiaO_4$, wherein a is from 0 to 2, or $LiMPO_4$, wherein M is Fe, Ni, Co, or Mn.

In some embodiments, including any of the foregoing, the lithium conversion material is selected from the group consisting of $FeF_2$, $NiF_2$, $FeOxF_{3-2x}$, $FeF_3$, $MnF_3$, $CoF_3$, $CuF_2$ materials, alloys thereof, and combinations thereof In some embodiments, including any of the foregoing, the sulfide catholyte or the single ion conducting, solid-state buffer, or both, are selected from the group consisting of LSS, SLOPS, LSTPS, LSTPSCl, SLOBS, LATS, and LPS+X, wherein X is selected from the group consisting of Cl, I, Br, and combinations thereof.

In some embodiments, including any of the foregoing, the sulfide catholyte or the single ion conducting, solid-state buffer, or both, are selected from the group consisting of LPSI, LXPS, LSTPS, LSPSCl, LPSCl, LSPSBr, and LPSBr.

In some embodiments, including any of the foregoing, the sulfide catholyte or the single ion conducting, solid-state buffer, or both, are selected from $x \cdot Li_2S \colon y \cdot SiS_2$, wherein x and y are each independently a number from 0 to 1, and wherein x+y=1.

In some embodiments, including any of the foregoing, the sulfide catholyte or the single ion conducting, solid-state buffer, or both, are selected from the group consisting of LSS, LGPS, LSTPS, and LSPS.

In some embodiments, including any of the foregoing, the sulfide catholyte or the single ion conducting, solid-state buffer, or both, are characterized by one of the following formula: $Li_aSi_bSn_cP_dS_e$, wherein $2 \leq a \leq 8$, $0 \leq b \leq 1$, $0 \leq c \leq 1$, $0.5 \leq d \leq 2.5$, and $2 \leq e \leq 12$; $Li_aSi_bP_cS_dX_e$, wherein $8 < a < 12$, $1 < b < 3$, $1 < c < 3$, $8 < d < 14$, and $0 < e < 1$, wherein X is F, Cl, Br, or I; $Li_gAs_hSn_jS_kO_l$, wherein $2 \leq g \leq 6$, $0 \leq h \leq 1$, $0 \leq j \leq 1$, $2 \leq k \leq 6$, and $0 \leq l \leq 10$; or $Li_mP_nS_pI_q$, wherein $2 \leq m \leq 6$, $0 \leq n \leq 1$, $0 \leq p \leq 1$, $2 \leq q \leq 6$; a mixture of $(Li_2S) \colon (P_2S_5)$ having a molar ratio of $Li_2S \colon P_2S_5$ from about 10:1 to about 6:4 and LiI, wherein the ratio of $[(Li_2S) \colon (P_2S_5)] \colon LiI$ is from 95:5 to 50:50; LPS+X, wherein X is selected from Cl, I, or Br; $vLi_2S+wP_2S_5+yLiX$; $vLi_2S+wSiS_2+yLiX$; or $vLi_2S+wB_2S_3+yLiX$. In these embodiments, x, w, and y each, individually in each instance, can range from, and including, 0 to, and including, 1.

In some embodiments, including any of the foregoing, the sulfide catholyte comprises LSTPS.

In some embodiments, including any of the foregoing, the sulfide catholyte is characterized by the following formula: $Li_aSi_bSn_cP_dS_e$, wherein $2 \leq a \leq 8$, $0 \leq b \leq 1$, $0 \leq c \leq 1$, $0.5 \leq d \leq 2.5$, and $2 \leq e \leq 12$.

In some embodiments, including any of the foregoing, the sulfide catholyte is characterized by the following formula: $Li_aSi_bSn_cP_dS_e$, wherein $2 \leq a \leq 5$, $0 \leq b \leq 0.5$, $0 \leq c \leq 0.5$, $0.5 \leq d \leq 2$, and $2 \leq e \leq 12$.

In some embodiments, including any of the foregoing, the lithium-stuffed garnet layer comprises a lithium-stuffed garnet selected from $Li_xLa_yZr_zO_t \cdot qAl_2O_3$, wherein $4 < x < 10$, $1 < y < 4$, $1 < z < 3$, $6 < t < 14$, and $0 \leq q \leq 1$.

Although specific advantages have been enumerated above, various embodiments may include some, none, or all of the enumerated advantages. Other technical advantages may become readily apparent to one of ordinary skill in the art after review of the following figures and description.

EXAMPLES

Reagents, chemicals, and materials were commercially purchased unless specified otherwise to the contrary. Chemical reagents and solvents were purchased commercially and used without purification, unless otherwise noted. Pouch cell containers were purchased from Showa Denko. The Electrochemical potentiostat used was an Arbin potentiostat. Electrical impedance spectroscopy (EIS) was performed with a Biologic VMP3, VSP, VSP-300, SP-150, or SP-200. Viscosity is measured using Rheometer under the shear rate of 100 s$^{-1}$. Milling was performed using a Retsch PM 400 Planetary Ball Mill. Mixing was performed using a Fischer Scientific vortex mixer, a Flaktek speed mixer, or a Primix filmix homogenizer. Casting was performed on a TQC drawdown table. Calendering was performed on an IMC calender. Light scattering was performed on a Horiba, model: Partica, model no: LA-950V2, general term: laser scattering particle size distribution analyzer.

Electron microscopy was performed in a FEI Quanta SEM, a Helios 600i, or a Helios 660 FIB-SEM, though equivalent tools may be substituted. XRD was performed in a Bruker D8 Advance ECO or a Rigaku MiniFlex 2 with Cu K-α radiation, 6 mm slit width, at a scan time of 76 ms per step or 0.4 seconds per step, and at room temperature. Optical imaging was performed with an optical camera. DC cycling was performed with Arbin BT-2043, or BT-G, though it is understood that equivalent tools may be substituted.

Example 1

Step One (1): A solid-state positive electrode layer was prepared. A slurry was prepared with 30-80 weight % solid loading in 20-70% toluene. The solid loading comprised 70-95 wt % lithiated lithium zirconium oxide (LZO) coated lithiated nickel-cobalt-aluminum oxide active material (NCA), 13 wt % LSTPS and 2 wt % binder. The LSTPS composition was characterized as $Li_aSi_bSn_cP_dS_e$, wherein $2 \leq a \leq 8$, $0 \leq b \leq 1$, $0 \leq c \leq 1$, $0.5 \leq d \leq 2.5$, and $4 \leq e \leq 12$, and further it comprised an oxygen element from greater than 0 to 15 atomic %, and was prepared as described in U.S. Pat. No. 9,172,114, which issued Oct. 27, 2015, and is titled SOLID STATE CATHOLYTES AND ELECTROLYTES FOR ENERGY STORAGE DEVICES, the entire contents of which are herein incorporated by reference in their entirety for all purposes.

The slurry was cast using a doctor blade on carbon coated Al foil. The resulting cast slurry was dried at room temperature to 120° C. for 1-24 hours to form a positive electrode layer film on the carbon coated Al foil. This carbon coated Al foil acted as a current collector when the electrochemical cell was assembled in step seven (7). The positive electrode layer was adhered to this current collector after drying.

Step Two (2): A buffer layer in contact with the solid-state positive electrode layer was prepared. A slurry was prepared with 10-70 wt % LSTPS in toluene. The slurry was cast using doctor blade on Ni foil. The resulting cast slurry was dried at room temperature to 120° C. for 1-24 hours to form a buffer layer film. In this example, the buffer layer included the same chemical composition LSTPS as was used in the positive electrode layer. Without being bound to theory, it is proposed that this layer does not contain electron conductors. This buffer layer thereby blocks electrons from accessing the borohydride bonding layer. This way, the buffer layer shields the positive electrode layer potential to bonding layer potential. This, in turn, allows the buffer layer to shield the negative electrode (anode) potential from the positive electrode layer.

Step Three (3): The buffer layer film was peeled-off, i.e., removed, from the Ni foil after the drying in step two (2). The buffer layer was then transferred and placed on top of the positive electrode layer, which was prepared according to step one (1), to produce a stack (buffer layer—positive electrode layer—current collector).

Step Four (4): Uniaxial pressure of approximately 300 MPa was applied at low temperature (room temperature) to the stack produced in step three (3). The stack was left under pressure at high temperature (150-180° C.).

Step Five (5): The lithium-stuffed garnet layer was made according to the methods of forming a layer or film of the lithium-stuffed garnet in U.S. Pat. No. 9,806,372 B2, which issued Oct. 31, 2017, and is titled GARNET MATERIALS FOR LI SECONDARY BATTERIES AND METHODS OF MAKING and USING GARNET MATERIALS, and U.S. Pat. No. 9,970,711, which issued May 15, 2018, and is titled LITHIUM STUFFED GARNET SETTER PLATES FOR SOLID ELECTROLYTE FABRICATION, the entire contents of each of which are herein incorporated by reference in their entirety for all purposes.

Step Six (6): A borohydride bonding layer was prepared. The borohydride composition used to form the borohydride bonding layer was described according to International PCT Patent Application No. PCT/US2017/057735, filed Oct. 20, 2017, and entitled ELECTROLYTE SEPARATORS INCLUDING LITHIUM BOROHYDRIDE AND COMPOSITE ELECTROLYTE SEPARATORS OF LITHIUM-STUFFED GARNET AND LITHIUM BOROHYDRIDE; also International PCT Patent Application No. PCT/US2017/057739, filed Oct. 20, 2017, and entitled BOROHYDRIDE-SULFIDE INTERFACIAL LAYER IN ALL SOLID-STATE BATTERY, the entire contents of which are herein incorporated by reference in their entirety for all purposes. The composition, $3LiBH_4 \cdot 2LiCl \cdot 3LiNH_2$, was melted and spin-coated onto the lithium-stuffed garnet film prepared in step five (5). The borohydride bonding layer forms an intimate contact with both the lithium-stuffed garnet and the buffer layer in contact with the positive electrode layer.

Step Seven (7): The lithium-stuffed garnet film having a LBHIN spin-coated layer thereupon was placed on top of the stack resulting from step four (4), and in which the LBHIN borohydride bonding layer was in direct contact with the buffer layer. This stack was then densified by applying pressure of approximately 10,000 pounds per square inch (PSI) at the temperature at which the LBHIN melts (250° C.). The stack was then cooled to room temperature.

Step Eight (8): The stack resulting from step seven (7) was adhered to a current collector on the side of the lithium-stuffed garnet film not having a LBHIN spin-coated layer thereupon to form an electrochemical cell. Prior to adhering the current collector, lithium metal is evaporated onto the lithium-stuffed garnet to form a lithium metal negative electrode. The electrochemical cell included 30 μm of evaporated lithium.

Step Nine (9): The stack resulting from step eight (8) was cycled to form a lithium metal anode between the current collector adhered in and the lithium-stuffed garnet film.

Example 2

An electrochemical cell was constructed according to steps one (1) through eight (8) in Example 1. This cell was electrochemically cycled between 3.0V-4.2V at C/3 rate, 45° C., with an initial formation cycle at C/10. The electrochemical cells were pressurized to 300 pounds per square inch (psi).

Figure 3:
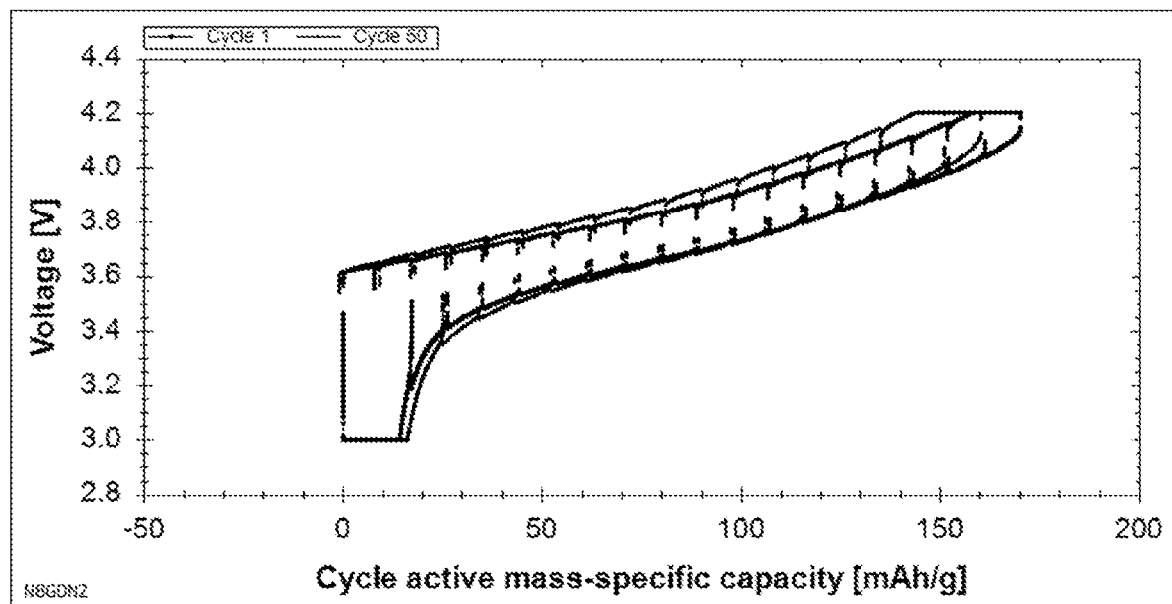
FIG. 3 is a plot of voltage as a function of active mass-specific capacity (mAh/g) over 50 cycles, as described in Example 2.
Figure 4:
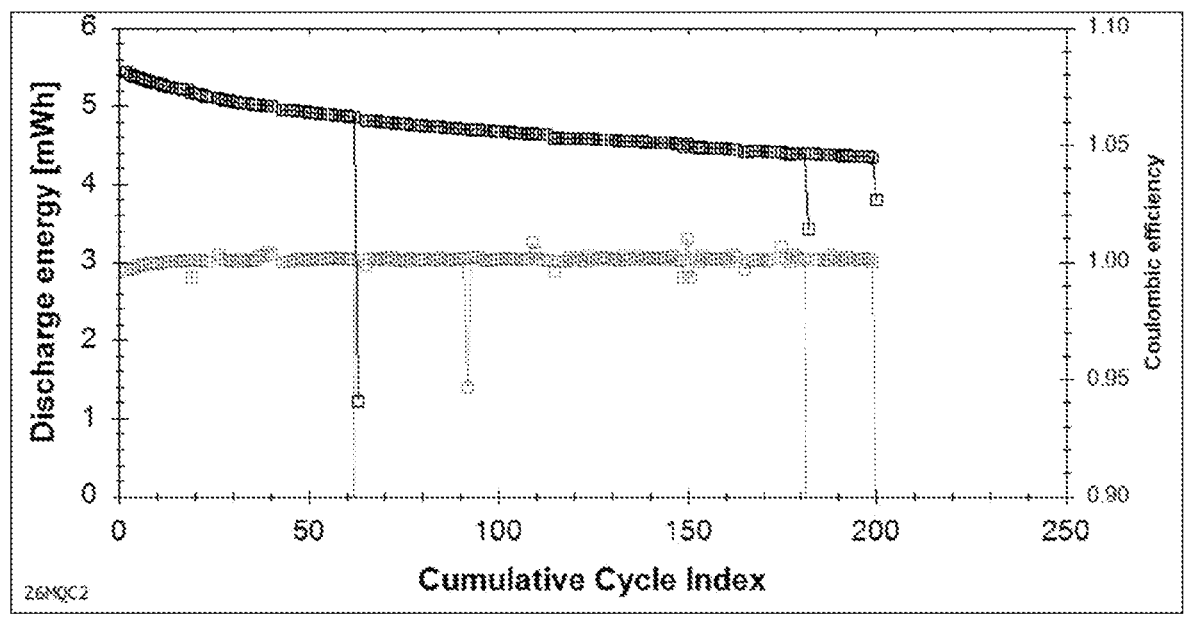
FIG. 4 is a plot of active mass-specific discharge capacity (mAh/g) as a function of cycle index as described in Example 2.
Figure 5:
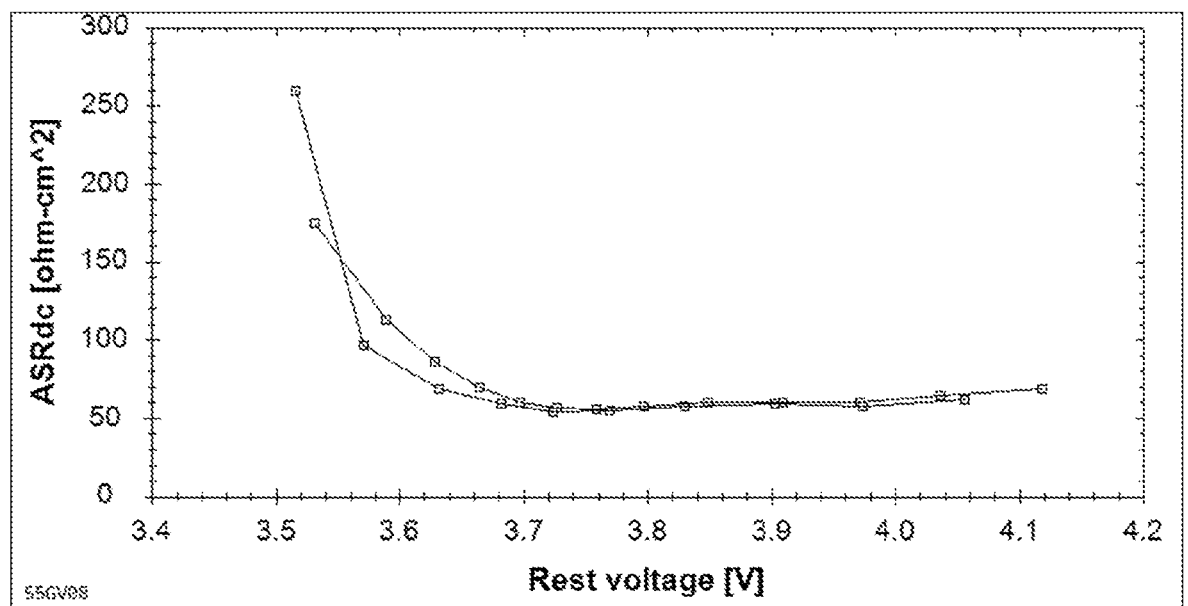
FIG. 5 shows a plot of ASR as a function of rest voltage, as described in Example 2.

The results are shown in FIG. 3-5.

FIG. 3 demonstrates that the electrochemical cell completed 50 cycles at C/3 rate at 45° C. without significant capacity loss. The first and $50^{th}$ cycles are overlaid in FIG. 3.

FIG. 4 demonstrates that the electrochemical cell completed 200 cycles and retained greater than 80% of its energy at the $200^{th}$ cycle. The columbic efficiency was observed to be close to 1 (>0.999 for most cycles). The first ($1^{st}$) cycle efficacy is greater than 90%. It is worth comparing these unexpected results with the results in Kato, et al., DOI: 10.1038/NENERGY.2016.30, which reports cycling data for an electrochemical cell having $LiNbO_3$-coated $LiCoO_2$ positive electrode active materials and a sulfide solid-state electrolyte ($Li_{9.6}P_3S_{12}$, $Li_{10}GeP_2S_{12}$, $Li_{9.54}Si_{1.74}P_{1.44}S_{11.7}Cl_{0.3}$). Kato, et al., report a columbic efficiency of 90%, 61% and 39% respectively in FIG. 4. In Kato, et al., however, only low voltage (2.5V) electrochemical cells were tested. These low voltage (2.5V) cells would be expected to have a high coulombic efficiency. However, the 2.5 V cell only showed a columbic efficiency of 93% at cycle 1, and 99% at cycle 10 and cycle 100. In contrast to Kato, et al., the electrochemical cells prepared in this Example were observed to a coulombic efficiency of about 100% (greater than 99.9%) after the 10 cycles, as shown in FIG. 4, in the instant provisional patent application. With comparison to prior art, the demonstrated Columbic efficiency is higher if tested under same conditions, indicating improved electrochemical stability on sulfide-cathode interface.

FIG. 5 demonstrates that the electrochemical cell has a low area-specific resistance (ASR) of approximately 54 $\Omega$-cm$^2$ at 45° C. LSTPS and the lithium-stuffed garnet each individually may have a high (e.g., 1000 $\Omega$-cm$^2$ or more) area specific resistance (ASR) at room temperature. It is therefore unexpected that simply by pressing the LSTPS and the lithium-stuffed garnet together, as done in Example 1, to form a heterogeneous interface therebetween, a low ASR resulted in the cell which comprised both LSTPS and lithium-stuffed garnet.

Figure 6:
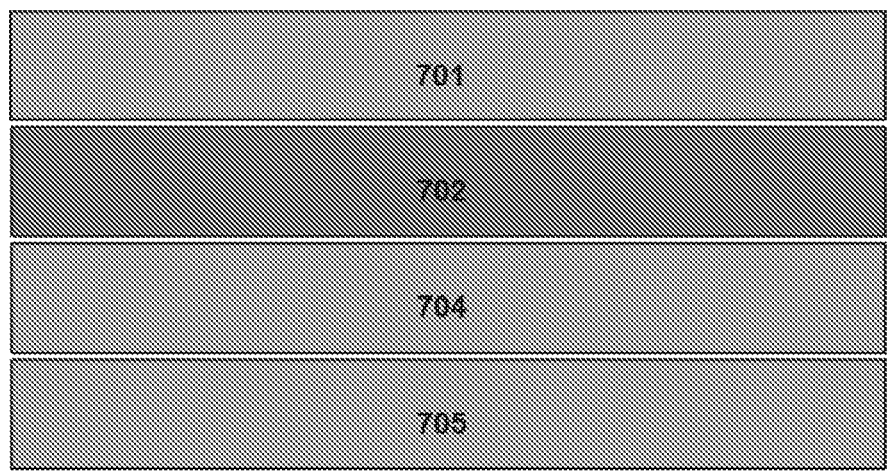
FIG. 6 shows a schematic illustration of an example electrochemical cell comprising a separator, a buffer layer, and a positive electrode layer.
Figure 7:
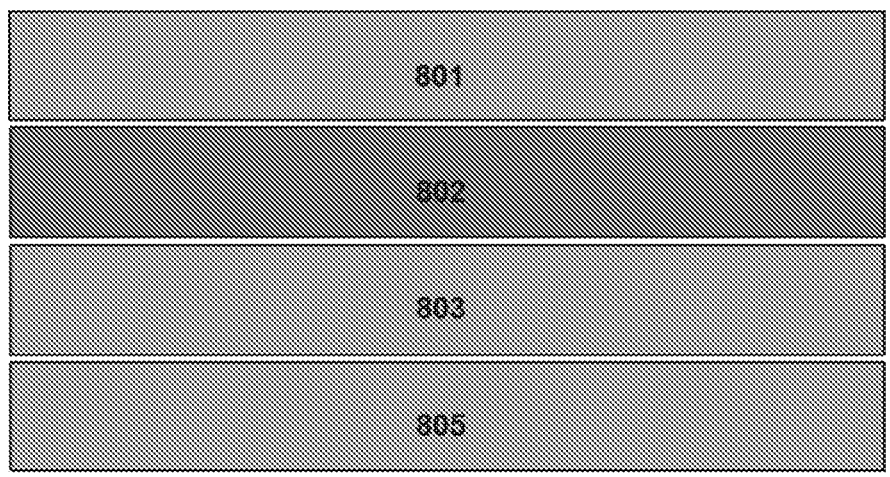
FIG. 7 shows a schematic illustration of an example electrochemical cell comprising a separator, a bonding layer, and a positive electrode layer.
Figure 8:
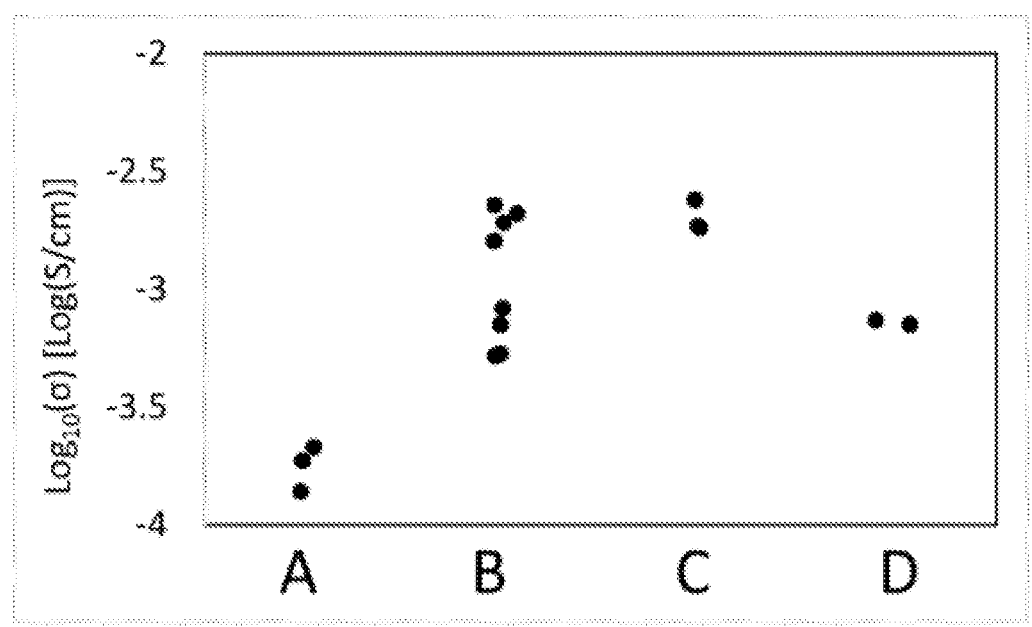
FIG. 8 shows a plot of lithium ion conductivity (Log(S/cm)) at 60° C. for a series of LBHI compositions and LBHI compositions doped with amide: (A) $LiBH_4$:LiI (3:1), (B) $LiNH_2$:$LiBH_4$:LiI (3:3:2), (C) $LiNH_2$:$LiBH_4$:LiI (9:3:4), and (D) $LiNH_2$:$LiBH_4$:LiI (9:3:2) are shown.

FIG. 6 and FIG. 7 show schematics of electrochemical cells tested. The electrochemical cells were prepared according to Example 1 and tested according to Example 2. The electrochemical cell depicted by FIG. 6 included layer 701, which represents an evaporated lithium metal anode. Layer 702 represents a lithium-stuffed garnet layer. Layer 704 represents a buffer layer. Layer 705 represents a positive electrode layer.

The electrochemical cell depicted by FIG. 7 included layer 801, which represents an evaporated lithium metal anode. Layer 802 represents a lithium-stuffed garnet layer. Layer 803 represents a bonding layer. Layer 805 represents a positive electrode layer.

Example 3

Making an Electrochemical Cell with a Buffer Layer

Step One (1): A solid-state positive electrode layer (cathode layer, SSC) was prepared. A slurry was prepared with 30-80 weight % solid loading in 20-70% toluene. The solid loading comprised 70-95 wt % lithium-zirconium-oxide (LZO)-coated lithiated nickel-cobalt-aluminum oxide active material (NCA), 13 wt % LSTPS and 2 wt % binder. The LSTPS composition was characterized as $Li_aSi_bSn_cP_dS_e$, wherein a is 4, b is 0.5, c is 0.5, d is 1, and e is 8, and further it comprised an oxygen element from greater than 0 to 15 atomic %, and was prepared as described in U.S. Pat. No. 9,172,114, which issued Oct. 27, 2015, and is titled SOLID STATE CATHOLYTES AND ELECTROLYTES FOR ENERGY STORAGE DEVICES, the entire contents of which are herein incorporated by reference in their entirety for all purposes.

The slurry was cast using a doctor blade on carbon-coated aluminum foil. The resulting cast slurry was dried at room temperature to 120° C. for 1-24 hours to form a positive electrode layer film on the carbon coated Al foil.

Step Two (2): A sulfide layer which was later placed in contact with the solid-state positive electrode layer was prepared. A slurry was prepared with 10-70 wt % LSTPS in toluene. The slurry was cast using a doctor blade casting method on Ni foil. The resulting cast slurry was dried at room temperature to 120° C. for 1-24 hours to form a buffer layer film. In this example, the buffer layer included the same chemical composition LSTPS as was used in the positive electrode layer. Without being bound to theory, it was proposed that this layer was not conductive to electrons (has an electron conductivity less than 1E-6 S/cm). This buffer layer thereby shields the negative electrode (anode) potential from the positive electrode layer.

Step Three (3): The two layers of step (1) and step (2) were put on top of each other such that the sulfide layer and the cathode layer were in direct contact with each other to produce a stack (Nickel film-buffer layer—positive electrode layer—aluminum film).

Figure 2:
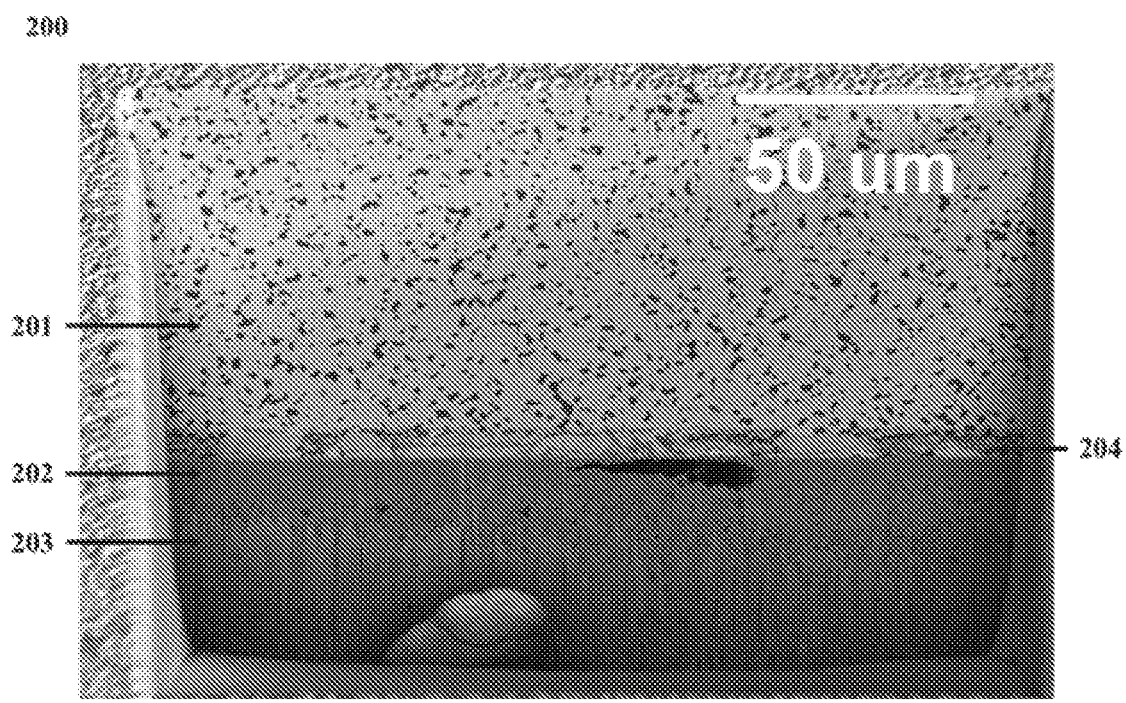

Step Four (4): The stack of step (3) is placed on an aluminum guide foil. The film is passed through a calender at 1.0 meters/min, 140° C., and ~100-110 bar (10-11 MPa) hydraulic pressure (to apply 1100-1200 N/mm). Saueressig GK 300 L or Ono Roll Type 12 calenders were used. Once calendered, the sulfide layer was transferred onto the cathode layer and both layers were densified together in one step. The result is shown in the image in FIG. 2. The carbon-coated aluminum foil also bonded to the aluminum guide foil during calendering and formed a first current collector on the side of the SSC.

The stack from step (4) was incorporated into an electrochemical cell comprising a lithium-stuffed garnet separator for testing.

The lithium-stuffed garnet layer was made according to the methods of forming a layer or film of the lithium-stuffed garnet in U.S. Pat. No. 9,806,372 B2, which issued Oct. 31, 2017, and is titled GARNET materials FOR LI SECONDARY BATTERIES AND METHODS OF MAKING and USING GARNET MATERIALS, and U.S. Pat. No. 9,970,711, which issued May 15, 2018, and is titled LITHIUM STUFFED GARNET SETTER PLATES FOR SOLID ELECTROLYTE FABRICATION, the entire contents of which are herein incorporated by reference in their entirety for all purposes.

Step Six (6): The lithium-stuffed garnet film was placed on top of the stack resulting from step four (4), so that the lithium-stuffed garnet film was in direct contact with the buffer layer. This stack was then densified by applying pressure of approximately 500 pounds per square inch (PSI) and at a temperature of 140° C. The stack was then cooled to room temperature.

Step seven (7): Lithium metal was evaporated onto the lithium-stuffed garnet (30 μm of evaporated lithium) to form a lithium metal negative electrode in the stack resulting from step six (6), and the stack was adhered to a negative electrode current collector, to form an electrochemical cell. In some cells, a negative electrode current was adhered directly onto the lithium-stuffed garnet film and lithium, from the positive electrode, was plated out between the lithium-stuffed garnet film and the negative electrode current collector.

Example 4

Making an Electrochemical Cell with a Buffer Layer and a Borohydride Layer

Step One (1): A solid-state positive electrode layer (cathode layer, SSC) was prepared. A slurry was prepared with 30-80 weight % solid loading in 20-70% toluene. The solid loading comprised 70-95 wt % lithium-zirconium-oxide (LZO)-coated lithiated nickel-cobalt-aluminum oxide active material (NCA), 13 wt % LSTPS and 2 wt % binder. The LSTPS composition was characterized as $Li_aSi_bSn_cP_dS_e$, wherein a is 5, b is 0.75, c is 0.25, d is 1, and e is 6, and further it comprised an oxygen element from greater than 0 to 15 atomic %, and was prepared as described in U.S. Pat. No. 9,172,114, which issued Oct. 27, 2015, and is titled SOLID STATE CATHOLYTES AND ELECTROLYTES FOR ENERGY STORAGE DEVICES, the entire contents of which are herein incorporated by reference in their entirety for all purposes.

The slurry was cast using a doctor blade on carbon-coated aluminum foil. The resulting cast slurry was dried at room temperature to 120° C. for 1-24 hours to form a positive electrode layer film on the carbon coated Al foil.

Step Two (2): A sulfide layer which was later placed in contact with the solid-state positive electrode layer was prepared. A slurry was prepared with 10-70 wt % LSTPS in toluene. The slurry was cast using a doctor blade casting method on Ni foil. The resulting cast slurry was dried at room temperature to 120° C. for 1-24 hours to form a buffer layer film. In this example, the buffer layer included the same chemical composition LSTPS as was used in the positive electrode layer. Without being bound to theory, it was proposed that this layer was not conductive to electrons (had an electron conductivity less than 1E-6 S/cm). This buffer layer thereby shielded the negative electrode (anode) potential from the positive electrode layer.

Step Three (3): The two layers of step (1) and step (2) were put on top of each other such that the sulfide layer and the cathode layer are in direct contact with each other to produce a stack (Nickel film-buffer layer—positive electrode layer—aluminum film).

Step Four (4): The stack of step (3) is placed on an aluminum guide foil. The film is passed through a calender at 1.0 meters/min, 140° C., and ~100-110 bar (10-11 MPa) hydraulic pressure (to apply 1100-1200 N/mm). Saueressig GK 300 L or Ono Roll Type 12 calenders were used. Once calendered, the sulfide layer was transferred onto the cathode layer and both layers were densified together in one step. The carbon-coated aluminum foil also bonded to the aluminum guide foil during calendering and formed a first current collector on the side of the SSC.

The stack from step (4) was incorporated into an electrochemical cell comprising a garnet separator and a borohydride bonding layer for testing.

Step Five (5): The lithium-stuffed garnet layer was made according to the methods of forming a layer or film of the lithium-stuffed garnet in U.S. Pat. No. 9,806,372 B2, which issued Oct. 31, 2017, and is titled GARNET materials FOR LI SECONDARY BATTERIES AND METHODS OF MAKING and USING GARNET MATERIALS, and U.S. Pat. No. 9,970,711, which issued May 15, 2018, and is titled LITHIUM STUFFED GARNET SETTER PLATES FOR SOLID ELECTROLYTE FABRICATION, the entire contents of which are herein incorporated by reference in their entirety for all purposes.

Step Six (6): An borohydride bonding layer was prepared. The borohydride composition used to form the borohydride bonding layer was described according to International PCT Patent Application No. PCT/US2017/057735, filed Oct. 20, 2017, and entitled ELECTROLYTE SEPARATORS INCLUDING LITHIUM BOROHYDRIDE AND COMPOSITE ELECTROLYTE SEPARATORS OF LITHIUM-STUFFED GARNET AND LITHIUM BOROHYDRIDE; also International PCT Patent Application No. PCT/US2017/057739, filed Oct. 20, 2017, and entitled BOROHYDRIDE-SULFIDE INTERFACIAL LAYER IN ALL SOLID-STATE BATTERY, the entire contents of which are herein incorporated by reference in their entirety for all purposes. The composition, $3LiBH_4 \cdot 2LiCl \cdot 3LiNH_2$, was melted and spin-coated onto the lithium-stuffed garnet film prepared in step five (5).

Step Seven (7): The lithium-stuffed garnet film having a LBHIN spin-coated layer thereupon, was placed on top of the stack resulting from step four (4), so that the LBHIN borohydride bonding layer was in direct contact with the buffer layer. This stack was then densified by applying pressure of approximately 1000 pounds per square inch (PSI) and at a temperature of 140° C. The stack was then cooled to room temperature. FIG. 3 shows an SEM FIB image of the resulting stack Step Eight (8): Lithium metal was evaporated onto the lithium-stuffed garnet (30 μm of evaporated lithium) to form a lithium metal negative electrode in the stack resulting from step seven (7), and the stack was adhered to a negative electrode current collector, to form an electrochemical cell. In some cells, a negative electrode current was adhered directly onto the lithium-stuffed garnet film and lithium, from the positive electrode, was plated out between the lithium-stuffed garnet film and the negative electrode current collector.

Example 5

A LBHI powder was prepared by mixing three (3) molar parts $LiBH_4$ with one (1) molar part LiI. The mixture was then subjected to two (2) millings in zirconia vessels at 300 rpm for 8 h, followed by annealing at 300° C. in a sealed vessel and cooled to room temperature to form a mixed and annealed LBHI powder.

A thin garnet film (Li-stuffed garnet characterized as approximately $Li_{7-x}La_3Zr_2O_{12}Al_2O_3$) was prepared as follows. Garnet precursors were mixed in a molar ratio of 6-7:1.5:2:0.1-1.5 of LiOH, $ZrO_2$, $La_2O_3$, and boehmite. The mixed precursors were milled in a ball mill and calcined at 700-1000° C. for 1-10 hours to form the cubic garnet phase with second phases. The powder was milled in a wet mill with solvent, surfactant, and dispersant. A binder solution was prepared by dissolving binder in the same solvent. The binder solution and powder slurry were mixed and tape cast on a Mylar substrate with a doctor blade of gap height 10-300 um to form a cast green tape. The green tape was released from the substrate, cut to the desired size, sintered between setters at 800-1200° C. for 1-10 hours and cooled to form a sintered garnet thin film.

Mixed and annealed LBHI powder (1-4 g) was heated to 300-350° C. under an argon atmosphere in a boron nitride or alumina crucible placed in a stainless steel heating block equipped with a band heater for about 2 h until the LBHI powder melted. The thin garnet film was dip-coated once into molten LBHI, at 300-350° C., under argon with a dwell time of 600 s. The thin garnet film was then withdrawn from the molten LBHI at a rate of 0.05-300 mm min$^{-1}$ and allowed to cool under argon for 5 s to 5 min to provide a dip-coated LBHI garnet.

Example 6

LBHI was prepared and heated to 300-350° C., as in Example 5. A thin copper current collector foil was then dip-coated once into the molten LBHI at 300-350° C. under argon with a dwell time of 600 s. The copper was then withdrawn from the molten LBHI at a rate of 0.05-300 mm min$^{-1}$ and allowed to cool under argon for 5 s to 5 min to provide a dip-coated LBHI copper.

Example 7

Dip-coated LBHI-garnet was prepared as in Example 5. ASR and calendar life were tested as follows. Uncoated garnet and dip-coated LBHI garnet were contacted on both sides with Li electrodes (8 mm contact area) and were subjected to 0.5 mA cm² current density with 30 s pulses twice daily (forward and reverse) at 80° C. and 300 PSI.

Example 8

Separators (uncoated garnet films or LBHI-coated garnet films prepared according to Example 6) were placed in a symmetric electrochemical cell with Li-metal electrodes on both sides of the samples. 5000 PSI of hydrostatic pressure was uniaxially applied to both sides of the cells under controlled temperature and under argon. Then, 5 cycles of 20 planar microns of lithium (approximately 4 mAh/cm²) at 2 mA/cm² at 80° C. were passed over an 8 mm electrode contact area. For surviving (non-shorted samples), the current was increased to 3 mAh/cm² at 80° C. For surviving samples, the current was then increased to 4 mAh/cm² at 80° C. followed by increasing to 5 mAh/cm² at 80° C. for surviving samples.

Example 9

LBHClN was prepared by mixing three (3) molar parts LiBH$_4$, three (3) molar parts of LiNH$_2$, with one (1) molar part LiCl. The mixture was then subjected to two (2) millings in zirconia vessels at 300 rpm for 8 h, followed by annealing in a sealed vessel at 180° C. for 2 hours and cooling to form a LBHClN powder.

Lithium-stuffed garnet film was prepared as in Example 5 and lithium metal was applied on one side. Then the LBHClN powder was dropped on the other side of the lithium-stuffed garnet film. The lithium-stuffed garnet with LBHClN powder on it was then heated to 80-140° C. at which point the LBHClN powder melted.

A Sulfide containing solid-state cathode film (SSC) was prepared. The SSC included a sulfide catholyte, LSTPS, and cathode active materials (NCA) with a LSTPS:NCA volumetric ratio of approximately ⅓ and ⅔. A small amount of carbon and binder, about 0-5 wt %, was added to the LSTPS and NCA. These resulting combination of LSTPS/NCA/carbon/binder was suspended in toluene at a mass loading of 20% powder in toluene. Then the suspension was mixed using a Flacktek and Filmix for 15 mins and 6 mins, respectively. The mixture then was casted on to carbon-coated aluminum foil and allowed to dry in an argon atmosphere until toluene evaporated. The film was punched to the desired size. The SSC film was densified at 180° C. under pressure of 300,000 PSI.

Then the SSC film was placed on top of the melted LBHClN powder. The SSC film was then pressed at 10-2000 pounds per square inch (PSI) while being cooled to room temperature. The cell was cycled at C/10 rate, at 45° C.

Example 10

An LBHXN powder was fabricated as above, where X was be Cl, Br, or I, or a mixture thereof. Spin casting was used to deposit the bonding layer of LBHXN thin film on to a lithium-stuffed garnet. In this procedure, a small amount of LBHXN powder was applied to the center of the lithium-stuffed garnet, which was on a chuck of a spin coater heated to the LBHXN melting temperature (~100-280° C.). LBHXN melted once the melting temperature was reached. A flat spatula was used to cast the melted LBHXN on the substrate to cover the area. The spin coater was turned on to the speed of 100 rpm to 5000 rpm while the chuck was still at the temperature needed to melt LBHXN. The spin coater was turned off after 1-10 min. After cooling to room temperature, a uniform coating of LBHXN was achieved on the substrate.

Example 11

To a mixture of LSTPS powder is added an organic, non-aqueous, aprotic solvent to form a slurry with a solid loading of at least about 35%. The slurry is then casted with a coater and coated onto a metal foil. The buffer layer is then placed in contact with a layer of cathode material. The layers are densified with a force of at least about 1000 psi, or more.

Example 12

The composition LiNH$_2$:LiBH$_4$:LiI (3:3:2) was coated on a solid-state cathode film by the drop casting method. Specifically, LBHIN powder was prepared and cast on a densified solid-state cathode. An uncoated lithium-stuffed film (made according to Example 5) was pressed on the LBHIN layer at 20-2000 PSI and 20-350° C.

Example 13

A solid-state positive electrode layer (cathode layer, SSC) was prepared. A slurry was prepared with 30-80 weight % solid loading in 20-70% toluene. The solid loading comprised 70-95 wt % lithium-zirconium-oxide (LZO)-coated lithiated nickel-cobalt-aluminum oxide active material (NCA), 13 wt % LSTPS and 2 wt % binder. The LSTPS composition was characterized as Li$_a$Si$_b$Sn$_c$P$_d$S$_e$, wherein a is 5, b is 0.75, c is 0.25, d is 1, and e is 6, and further it comprised an oxygen element from greater than 0 to 15 atomic %, and was prepared as described in U.S. Pat. No. 9,172,114, which issued Oct. 27, 2015, and is titled SOLID STATE CATHOLYTES AND ELECTROLYTES FOR ENERGY STORAGE DEVICES, the entire contents of which are herein incorporated by reference in their entirety for all purposes.

Lithium-stuffed garnet film was prepared as in Example 5 and lithium metal was applied on one side.

LPSI was cast onto the side of the lithium-stuffed garnet film which was opposite the side having lithium metal.

The thickness of the lithium-stuffed garnet film was about 100 μm. The thickness of the cathode was about 150 μm. The thickness of the LPSI was about 10 μm.

Figure 9:
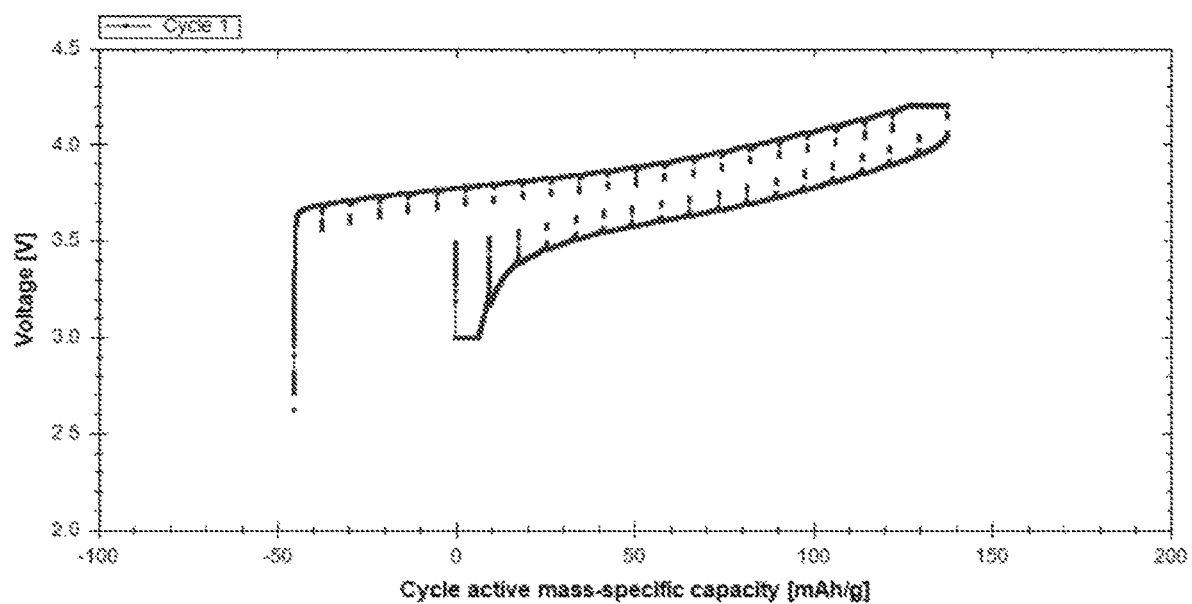
FIG. 9 shows cycling data for solid-state electrochemical cells which included lithium-stuffed garnet electrolyte film bonded to a solid-state cathode film with LPSI according to Example 13.

The resulting electrochemical cell was cycled at rate of C/10 at 45° C. under 300 psi. The results are shown in FIG. 9.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A solid-state electrochemical cell (SSEC), comprising:
   (a) a positive electrode layer comprising an active material and a sulfide catholyte, wherein the active material is selected from LiNi$_x$Mn$_y$Co$_z$O$_2$, and LiNi$_x$Al$_y$Co$_z$O$_2$, wherein x+y+z is equal to 1;
   (b) a single ion conducting, solid-state buffer layer, wherein the single ion conducting, solid-state buffer layer comprises LSTPS, wherein LSTPS is an electrolyte material including Li, Si, P, Sn, and S chemical constituents, wherein the buffer layer has a thickness of greater than 1 μm to 15 μm;

(c) a borohydride bonding layer; and (d) a lithium-stuffed garnet layer, wherein the lithium-stuffed garnet layer comprises a lithium-stuffed garnet selected from $Li_xLa_yZr_zO_t \cdot qAl_2O_3$, wherein $4<x<10$, $1<y<4$, $1<z<3$, $6<t<14$, and $0 \leq q \leq 1$;

wherein:

the buffer layer is a layer in contact with the positive electrode layer;

wherein the borohydride bonding layer is between and in contact with the lithium-stuffed garnet layer and the buffer layer in contact with the positive electrode, wherein the borohydride bonding layer comprises a borohydride composition comprising:

$A \cdot (LiBH_4) \cdot B \cdot (LiX) \cdot C \cdot (LiNH_2)$, wherein X is fluorine, bromine, chlorine, iodine, or a combination thereof, and wherein $3 \leq A \leq 6$, $2 \leq B < 5$, and $0 \leq C \leq 9$.

2. The SSEC of any claim 1, further comprising a negative electrode.

3. The SSEC of 6, wherein the negative electrode is a lithium (Li) metal negative electrode.

4. The SSEC of any claim 2, wherein the lithium-stuffed garnet layer contacts the negative electrode.

5. The SSEC of claim 1, wherein the buffer layer comprises an organic polymer at 10% by volume or less.

6. The SSEC of claim 1, wherein the active material is coated.

7. The SSEC of claim 1, wherein the active material is uncoated.

8. The SSEC of claim 1, wherein the sulfide catholyte is selected from the group consisting of LSS, SLOPS, LSTPS, LSTPSCl, SLOBS, LATS, and LPS+X, wherein X is selected from the group consisting of Cl, I, Br, and combinations thereof.

9. The SSEC of claim 1, wherein the sulfide catholyte is characterized by one of the following formula:

$Li_aSi_bSn_cP_dS_e$, wherein $2 \leq a \leq 8$, $0 \leq b \leq 1$, $0 \leq c \leq 1$, $0.5 \leq d < 2.5$, and $2 \leq e \leq 12$;

$Li_aSi_bP_cS_dX_e$, wherein $8<a<12$, $1<b<3$, $1<c<3$, $8<d<14$, and $0<e<1$, wherein X is F, Cl, Br, or I;

$Li_gAs_hSn_jS_kO_l$, wherein $2 \leq g \leq 6$, $0 \leq h \leq 1$, $0 \leq j \leq 1$, $2<k \leq 6$, and $0 \leq l \leq 10$; or $Li_mP_nS_pI_q$, wherein $2 \leq m \leq 6$, $0 \leq n \leq 1$, $0 \leq p \leq 1$, $2 \leq q \leq 6$;

a mixture of $(Li_2S):(P_2S_5)$ having a molar ratio of $Li_2S:P_2S_5$ from about 10:1 to about 6:4 and LiI, wherein the ratio of $[(Li_2S):(P_2S_5)]$:LiI is from 95:5 to 50:50;

LPS+X, wherein X is selected from Cl, I, or Br;

$vLi_2S+wP_2S_5+yLiX$;

$vLi_2S+wSiS_2+yLiX$; or $vLi_2S+wB_2S_3+yLiX$, wherein X is selected from Cl, I, or Br, wherein $0 \leq v \leq 1$; $0 \leq w \leq 1$; and $0 \leq y \leq 1$.

10. The SSEC of claim 1, wherein the sulfide catholyte comprises LSTPS.

11. The SSEC of claim 10, wherein the sulfide catholyte is characterized by the following formula: $Li_aSi_bSn_cP_dS_e$, wherein $2 \leq a \leq 8$, $0 \leq b \leq 1$, $0 \leq c \leq 1$, $0 \leq d \leq 2.5$, and $2 \leq e \leq 12$.

12. The SSEC of claim 1, further comprising a positive electrode current collector layer.

13. The SSEC of claim 1, further comprising a negative electrode current collector layer.

14. A battery comprising the SSEC of claim 1.

* * * * *